United States Patent [19]

Check, Jr.

[11] Patent Number: 4,471,441

[45] Date of Patent: Sep. 11, 1984

[54] ELECTRONIC POSTAL METER SYSTEM

[75] Inventor: Frank T. Check, Jr., Orange, Conn.

[73] Assignee: Pitney Bowes Inc., Stamford, Conn.

[21] Appl. No.: 225,571

[22] Filed: Jan. 16, 1981

Related U.S. Application Data

[63] Continuation of Ser. No. 950,302, Oct. 16, 1978, Pat. No. 4,251,874, which is a continuation-in-part of Ser. No. 846,526, Oct. 28, 1977, abandoned.

[51] Int. Cl.[3] .............................................. G06F 11/00

[52] U.S. Cl. ...................................... 364/466; 371/20; 364/900

[58] Field of Search ............... 364/466, 900, 550, 518; 371/20, 16, 17

[56] References Cited

U.S. PATENT DOCUMENTS

| | | | |
|---|---|---|---|
| 3,873,819 | 3/1975 | Greenwald | 371/16 |
| 4,122,996 | 10/1978 | Wilczek | 371/20 |
| 4,302,821 | 11/1981 | Eckert et al. | 371/20 X |
| 4,334,308 | 6/1982 | Thinschmidt et al. | 371/17 X |
| 4,377,845 | 3/1983 | Markham et al. | 371/16 X |

FOREIGN PATENT DOCUMENTS

| | | | |
|---|---|---|---|
| 1370972 | 10/1974 | United Kingdom | 364/401 |
| 1383915 | 2/1975 | United Kingdom | 364/401 |
| 1417872 | 12/1975 | United Kingdom | 364/466 |
| 1486452 | 9/1977 | United Kingdom | 364/466 |
| 1492704 | 11/1977 | United Kingdom | 364/466 |
| 1508623 | 4/1978 | United Kingdom | 364/466 |
| 1520529 | 8/1978 | United Kingdom | 364/466 |

*Primary Examiner*—Edward J. Wise

*Attorney, Agent, or Firm*—David E. Pitchenik; William D. Soltow, Jr.; Albert W. Scribner

[57] ABSTRACT

An electronic postal meter system is separated into a meter unit and an input/output control unit. The two units are linked by a communications link which preferably uses light transmitting fibers to transmit data and instructions. The meter unit is used to process and store only that data which pertains to the critical accounting functions of the meter or to the control of the printer driven by the electronics control within the meter unit. Less critical functions, such as zip-to-zone conversions, are restricted to the less secure control unit. By restricting the meter unit to highly critical data and by enclosing only the meter unit in a secure housing, the overall security of the meter system is enhanced. Novel failure detect circuitry for a printer setting detector array and a novel event-indicating signal generator circuit are disclosed. The significant routines employed in the operation of the meter system are described.

11 Claims, 53 Drawing Figures

| | REG 0 | REG 1 | REG 2 | REG 3 |
|---|---|---|---|---|
| 0 | CHECKSUM | | | |
| 1 | | | | |
| 2 | OP CODE | | | |
| 3 | DATA MESSAGE BLOCK | | | |
| 4 | | | | |
| 5 | | | | |
| 6 | | | | |
| 7 | | | | |
| 8 | | | | |
| 9 | | | | |
| A | | | | |
| B | | | | |
| C | | | | |
| D | | DISPLAY AREA (SEE FIG. 16) | | |
| E | | | | |
| F | | | | |
| | | | | |
| SC0 | DIRECTION | DIRECTION | NVM & INTERRUPT TEST (SEE FIG. 19) | |
| SC1 | HALF/FULL | ENABLE | | |
| SC2 | ERROR | ERROR | | |
| SC3 | FIFTH STEP | LAST POS. | | |
| | DIGIT SELECT | BANK SELECT | | |

FIG. 15

| | BIT 3 | BIT 2 | BIT 1 | BIT 0 |
|---|---|---|---|---|
| 1D | RMRS TIME OUT | INIT TIME OUT | NOT USED | NOT USED |
| 1E | ASC+DESC ≠ CONTROL SUM | MEMORY ERROR | PHOTO CELLS (READ) | INTERRUPT ERROR |
| 1F | DESC < POST | DESC < $100 | ALWAYS ON | ALWAYS OFF |

FIG. 16

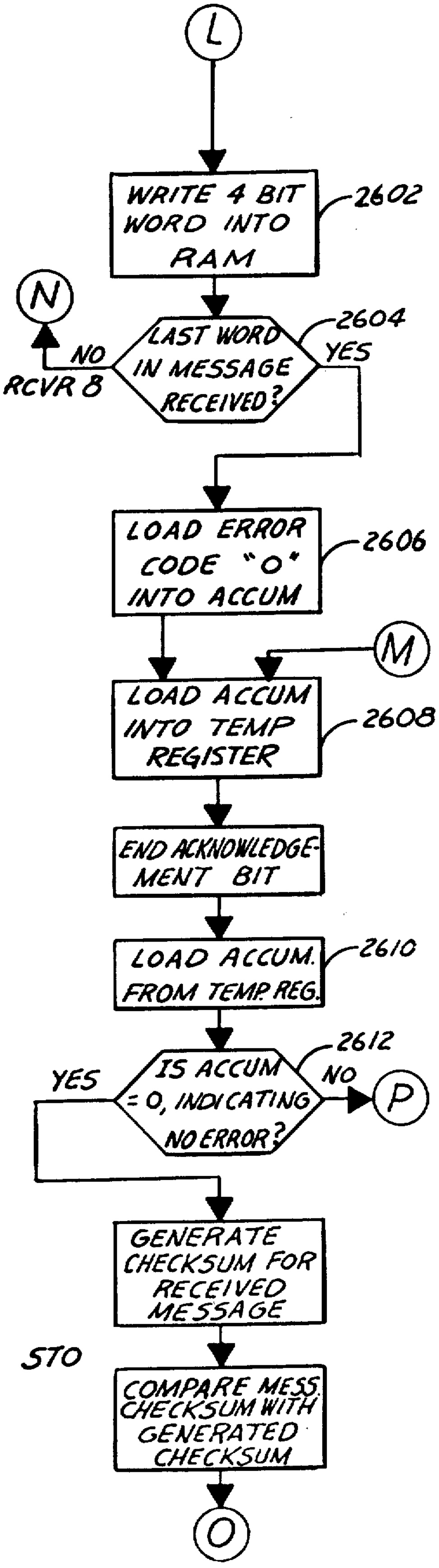
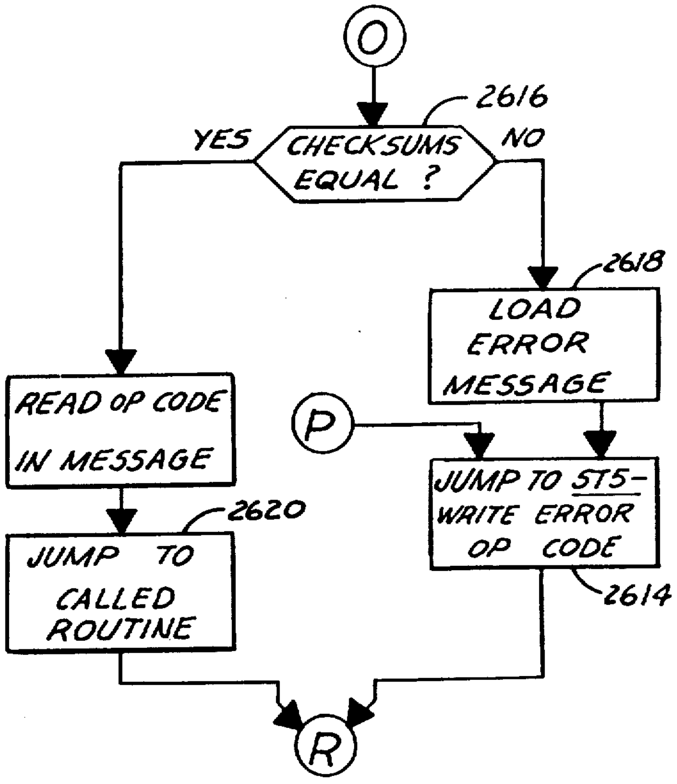
FIG. 26
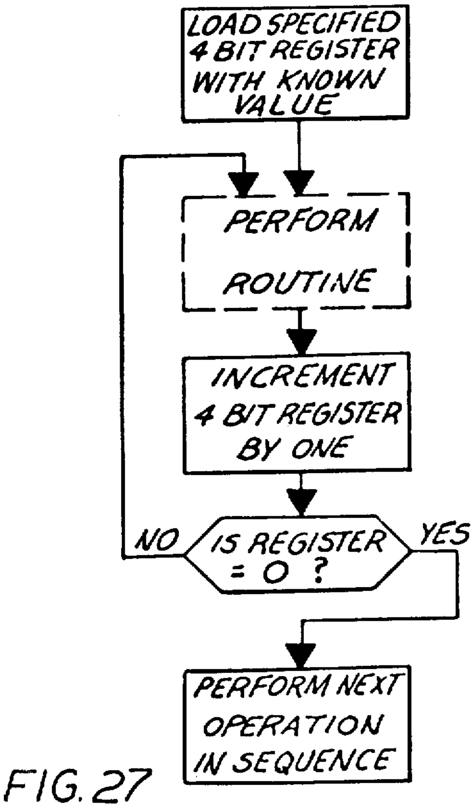
FIG. 27

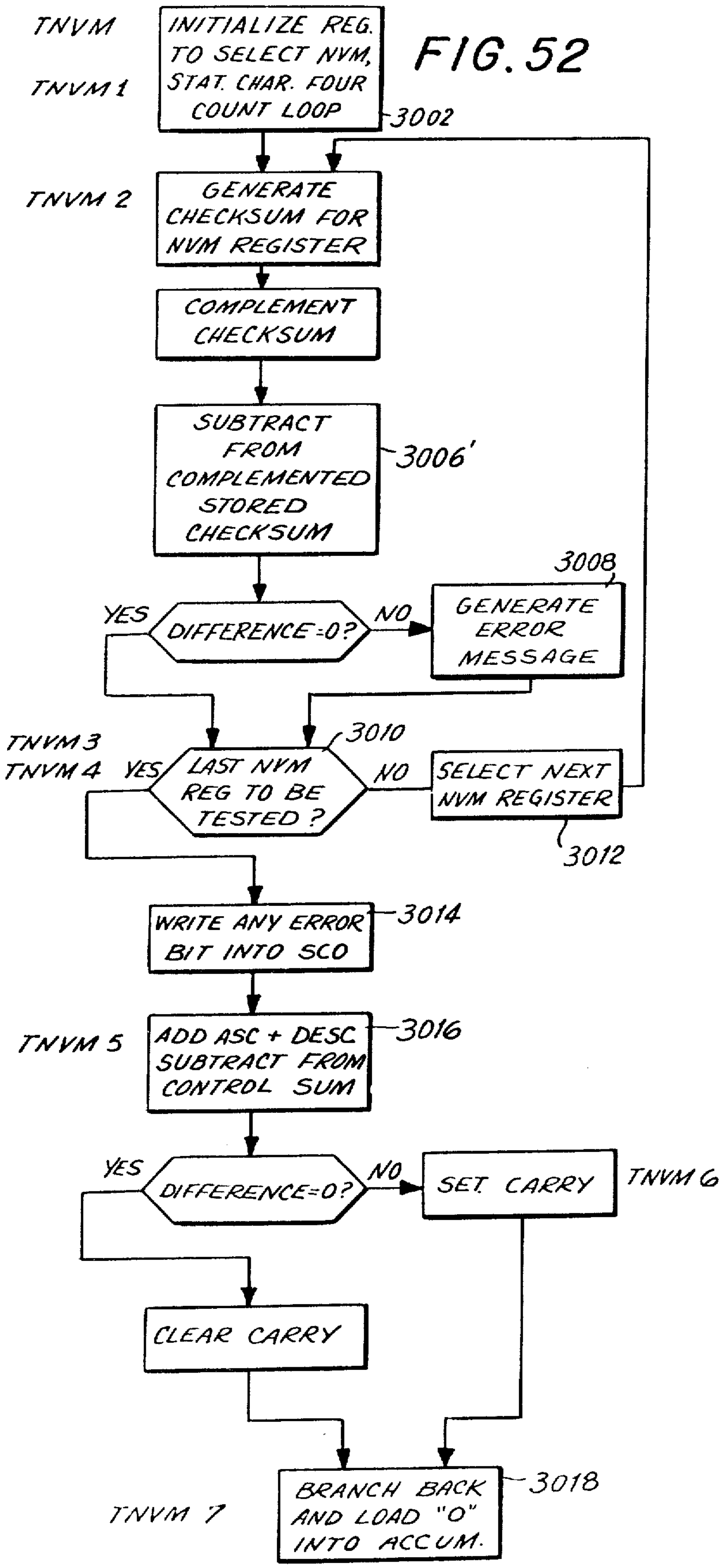
FIG. 52
FIG. 53
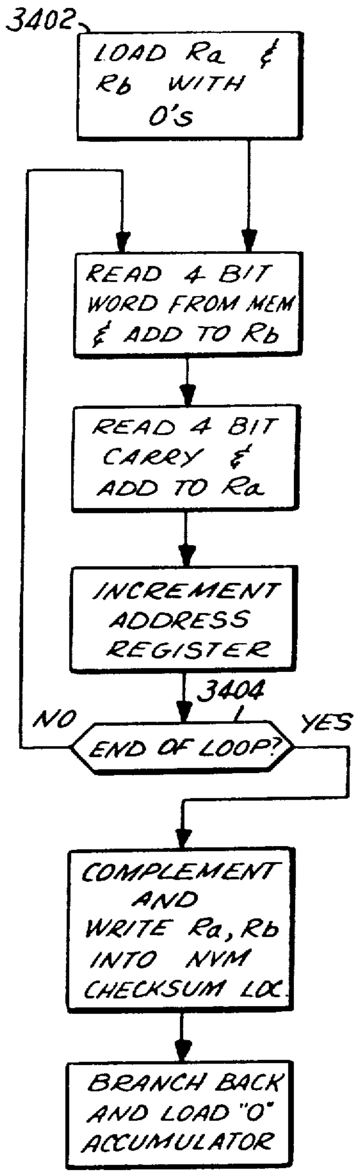

ELECTRONIC POSTAL METER SYSTEM

This application is a continuation of application Ser. No. 950,302, filed Oct. 16, 1978 now U.S. Pat. No. 4,251,874, which was a continuation in part of application Ser. No. 846,526 Nov. 28, 1977 now abandoned.

BACKGROUND OF THE INVENTION

The present invention relates to an electronic postal meter and more particularly to an electronic meter which is highly secure from tampering involving the data processing capabilities of the meter.

Postal meters in use today are, almost universally, mechanical devices in which postage values are set, printed, and accounted for by means of mechanical assemblies such as linkages and registers. Such meters include a mechanical ascending register which provides a record of the amount of postage printed over the life of the meter. The meter also includes a mechanical descending register which provides a record of the amount of postage remaining for use in the meter. To prevent tampering with the critical functions of such mechanical meters, a number of different mechanical interlocks have been used. Such interlocks prevent a user from printing postage amounts without changing the contents of the ascending and descending registers. Similarly, such interlocks make it nearly impossible for a user, without leaving telltale signs, to reset the descending register himself to "recharge" the postal meter.

Electronic postal meters have been developed. In such meters, a computer device such as a microprocessor may calculate postage amounts and cause an electrically driven printer to be set to the proper postage amount. All data, including critical accounting data, is stored in electrical format in memory units.

The advantages of electronic postal meters are known. Such meters, having fewer mechanical parts, should last longer and prove more reliable than mechanical meters. Furthermore, electronic postal meters are extremely versatile devices which may perform functions that cannot practically be performed in a purely mechanical meter. For example, an electronic postal meter may include logic circuitry for determining the destination zone of a package given the zip code of the point of origin and the zip code of the point of destination. Moreover, such meters can generally be more readily changed to accommodate changes in the postal regulations or rates. Also, such meters are generally capable of performing at high speeds, a necessity for high volume mailing operations.

While electronic postal meters have many advantages, they also present certain problems which had already been solved in the widely-used mechanical postal meters. The use of electronics to perform the necessary meter functions renders obsolete many of the mechanical interlocks formerly developed to prevent tempering with the meter contents. Naturally, this increases the risk that a user knowledgeable in the electronic technologies employed in a postal meter may find a way to print postage amounts without these amounts being registered in the descending or ascending registers. Similarly, a knowledgeable and unscrupulous user may attempt to develop a method for "recharging" the meter without the normally necessary payment to the Post Office.

Another problem which can arise with electronic postal meters is that their proper operation depends upon the proper functioning of many components which cannot be readily inspected. For the most part, these components are "binary" in nature; that is, their output is either on or off. A failed component may, unless noticed, provide an unchanging output which would be interpreted erroneously by the microprocessor.

Still another problem with electronic postal meters is that such meters will not necessarily be disabled upon a malfunction or failure in a particular section or upon the occurrence of certain events. The meter will continue to function, albeit perhaps improperly, until instructed to stop.

SUMMARY OF THE INVENTION

The present invention is an electronic postal meter which is highly secure from tampering. The system includes a meter section which has a postage printer and an electronic control unit for setting the postage printer and for processing and storing postal accounting and meter setting information. The meter section further includes a secure housing which encloses the postage printer and the electronic control unit to prevent tampering with either. The system also includes a control unit for processing and storing information other than postal accounting or meter setting information. A communications link is provided between the meter section and the control unit.

By isolating that section of the system including the printer and the critical accounting and meter setting functions from the remaining functions of the meter, the access to the critical accounting and meter setting circuitry can be severely restricted without restricting access to the less critical sections of the meter. The less critical sections may include such things as postage tables or the like, which can thus be more readily altered without affecting the accounting information or meter setting information isolated within the secured housing. Thus, a meter serviceman could update postage tables or computation sections without first having to call in a Postal Service representative.

In one embodiment, the meter verifies the proper operation of the detectors upon which it relies by temporarily driving parallel amplifier inputs to predetermined signal states while checking the outputs of the amplifiers for the presence of both of two possible signal states. Unless both signal states are detected, the meter operation will be inhibited.

In still another embodiment, an event-indicating signal generator circuit is incorporated into the meter. This circuit includes means for generating at least one event-indicating signal upon the occurrence of a predetermined physical event. Each different event-indicating signal is applied to a different data input terminal of the processor so that the processor can respond appropriately to the particular type of event.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 15 is a representation of the assignment of memory locations in random access memory unit 38;

FIG. 16 is a more detailed representation of the assignment of memory locations for display indicator bits within unit 38;

FIGS. 21-26, taken collectively, comprise a more detailed flow chart of the main program for the postal meter system;

FIG. 27 is a flow chart of a routine for establishing counter loops or, with slight modification, fixed time delays;

FIG. 52 is a flow chart showing a modification of the TNVM subroutine of FIG. 30; and FIG. 53 is a flow chart showing a modification of the CHKSM subroutine of FIG. 34.

DETAILED DESCRIPTION

Figure 1:
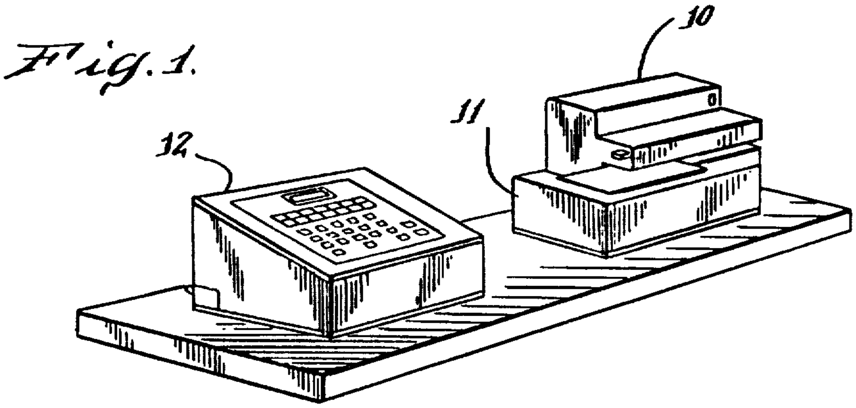
FIG. 1 is a perspective view of the housings for one embodiment of an electronic postal meter system into which the present invention may be incorporated.

Referring now to FIG. 1, the meter section of an electronic postal meter system may be a relatively small unit 10 which, in one embodiment, contains electronic circuitry for performing necessary postal calculations for storing critical accounting data and for controlling a postage printer. Meter unit 10 is controlled by a control unit 12 which preferably has a segmented numeral display, backlighted legend panels and a keyboard for entering data and commands into the meter unit. The meter unit 10 rests on a relatively larger base 11 which will, according to a preferred embodiment of the invention, include a power supply such as an AC to DC converter circuit for converting 110 volt alternating line voltage to a positive or negative DC voltage suitable as power supply voltage for the logic circuitry contained in meter unit 10. The connections between the AC to DC converter in base 11 and the meter unit 10 can be conventional, detachable connectors which permit the meter to be removed from the base for servicing. Preferably, a monitored mechanical interlock is used to secure the meter to the base. When such an interlock is released in order to remove the meter from the base, a signal is generated which can disable the meter (i.e., assure preservation of its contents) before the meter is actually separated from its base. This signal is generated within an event-indicating signal generator circuit described in detail later.

Figure 2:
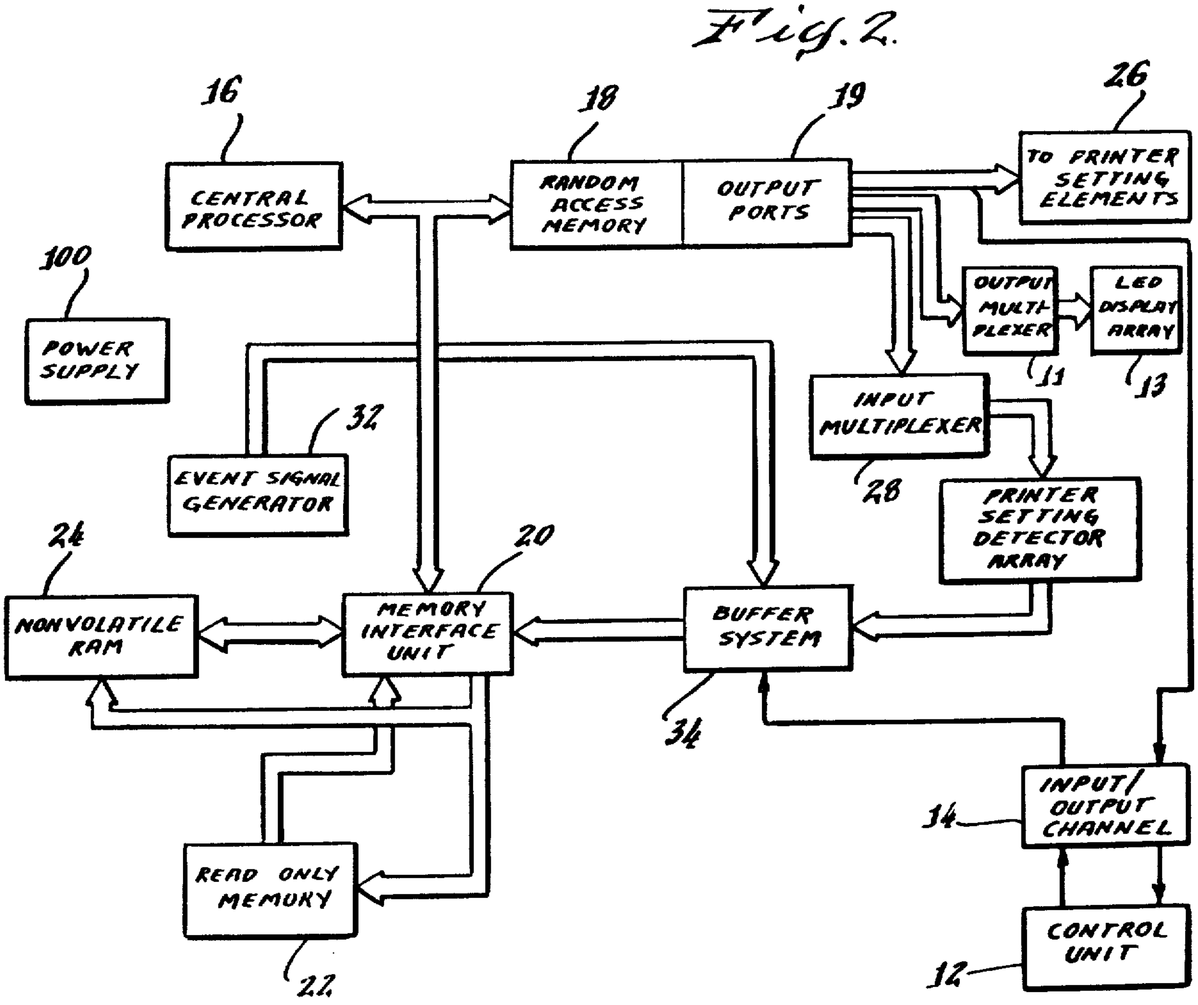
FIG. 2 is a basic block diagram of an electronic postal meter incorporating the present invention.

Referring to FIG. 2, circuitry for the meter unit 10 may be linked to the remote control unit 12 through a communications link consisting of input/output channel 14. The meter unit 10 accepts data and instructions sent to it through channel 14 from the control unit 12. In turn, the meter unit 10 provides signals to the control unit 12 through channel 14 representing the results of calculations, requests for instructions and error messages.

Control unit 12 may include a keyboard for remotely entering data and instructions into the system and a printer or display for presenting the results of calculations, instruction requests and error messages to an operator. While unit 12 is represented as a single device, the input and output sections of unit 12 obviously could be physically independent units. For example, the output section might be a printer or CRT display while the input section might be a keyboard terminal. Unit 12 might also be a larger host computer which would control meter unit 10 as one component of a more complex mail-handling system.

A central processing unit 16 in the meter communicates with random access memory 18, output ports 19 associated with the random access memory 18 and with a memory interface unit 20 which generally controls the flow of data and instructions between central processor unit 16, read-only memory 22 and a special purpose, non-volatile random access memory 24. A power supply circuit 100, to be described in detail later, provides power for these and other components. In a preferred embodiment of the invention, the components may be commercially-available solid state devices. For example, central processor unit 16, random access memory 18 and read-only memory 22 may be, respectively, 4040, 4002 and 4001 chips available in a MSC-40 Micro Computer Set from Intel Corporation of Santa Clara, Calif. These particular chips employ negative logic; that is, a binary "1" is represented by a negative voltage such as −15 volts whereas a binary "0" is represented by a more positive voltage such as zero voltage or ground.

Output signals from the central processor unit 16 are transmitted through output ports 19, which share input-/output data paths with random access memory 18, to printer setting elements 26, to an input multiplexer 28 which controls a printer setting detector array 30 to the input/output channel 14, and to an output multiplexer 11 which controls an LED display array 13.

Inputs to the meter unit include both internal and external inputs in a preferred embodiment. The external inputs are provided by control unit 12 through channel 14 to a buffer or input port system 34. Internal inputs representing the status of components of a printer setting device are provided by the printer setting detector array 30 under the control of multiplexer 28. Multiplexer 28 may be a conventional shift register multiplexer device such as a 4003 chip available from Intel Corporation. Additional internal inputs are provided by an event-indicating signal generator circuit 32. The outputs of signal generator circuit 32 are applied to buffer system 34. Outputs from buffer system 34 are applied to the memory interface unit 20.

The central processor unit 16 performs calculations using data provided through the input buffer system 34 and instructions stored in read-only memory 22. Read-only memory 22 serves as a program store for the routines and subroutines required within meter unit 10. Random access memory 18 provides a working memory for the central processor unit 16. The random access memory 18 is a volatile device; i.e., data stored in the memory is lost upon loss of power to the meter. To preserve critical accounting data, such as the contents of the ascending and descending registers, the non-volatile random access memory 24 has been provided. Non-volatile memory 24 is powered with a battery back-up unit to permit the contents of the memory 24 to be saved in the event of a loss of power in meter unit 10.

Figure 3:
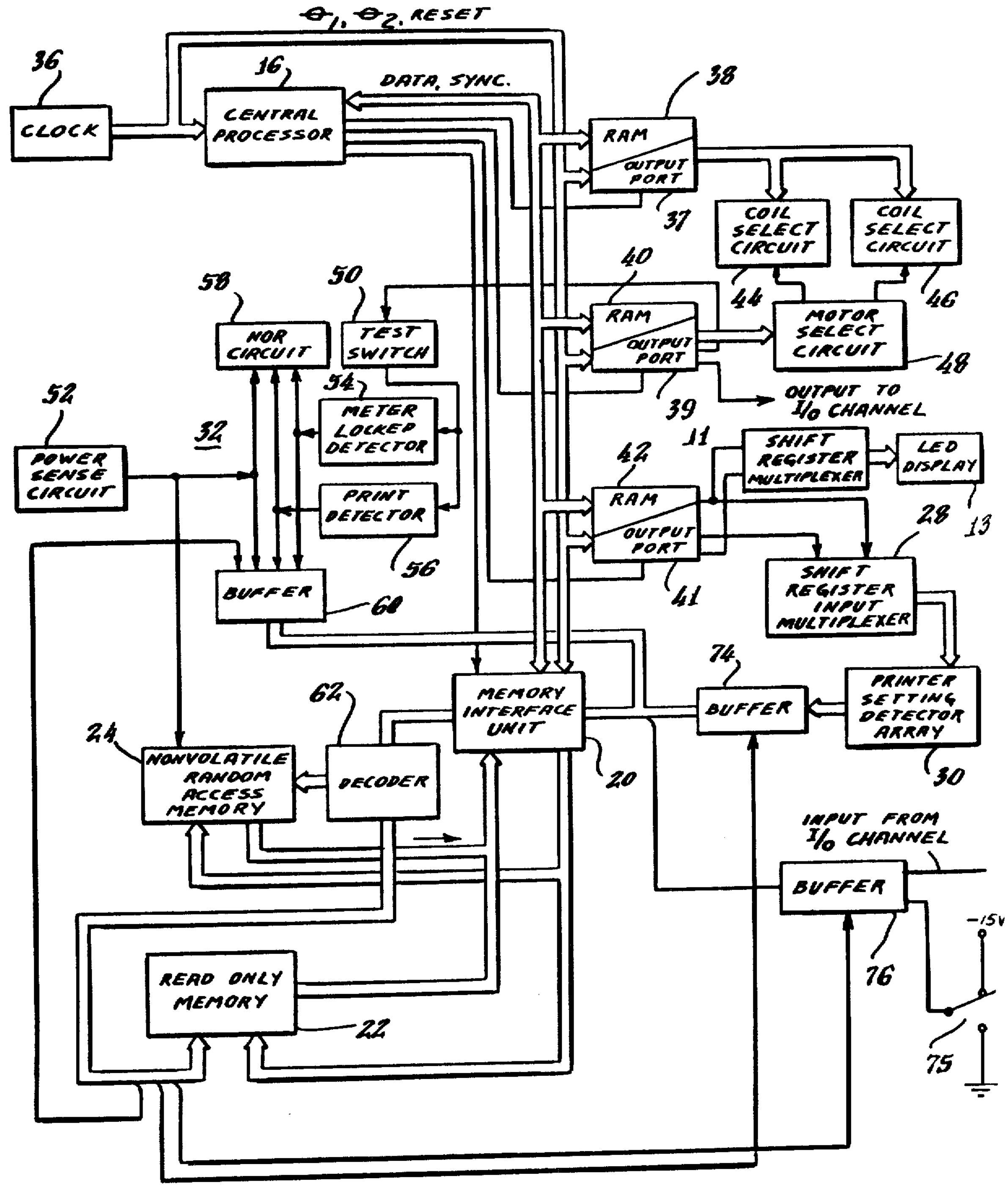
FIG. 3 is a more detailed block diagram of the meter unit of the electronic postal meter system.

Further details as to the organization of the meter unit 10 appear in the description relating to FIG. 3. The operations of central processor unit 16 are timed by a clock circuit 36 which supplies two trains of non-overlapping clock pulses $\theta 1$ and $\theta 2$ and a reset signal. These signals are applied to the central processor unit 16, to memory interface unit 20 and to a number of random access memory units 38, 40, 42, which collectively comprise random access memory 18.

Outputs from an output port 37 associated with random access memory unit 38 are applied to a pair of coil select circuits 44, 46, which are used in setting one type of postage printing device. The coil select circuits 44 and 46 are connected to a motor select circuit 48 which, under the control of outputs from an output port 39 associated with random access memory unit 40, determines which of the two motors will be energized. Details of the coil select circuits 44 and 46 and the motor select circuit 48 are provided in a following section of this specification. Another output from output port 39 controls a test switch 50, which is part of the signal generator circuit 32.

The signal generator circuit 32 includes a power level sensing circuit 52, a meter locked detector 54 and a print detector 56. The power level sensing circuit 52 monitors the output of the power supply for the postal meter and generates an interrupt signal whenever the onset of a power failure is detected. This interrupt signal triggers a computer routine in which the contents of the ascending and descending registers are updated in the non-volatile random access memory 24 before the meter shuts down.

The print detector circuit 56 includes a photoelectric device for sensing the start of a mechanical printing operation by the meter. This information is used for updating the ascending and descending registers of the meter by the amount of postage being printed. The meter locked detector 54 includes a photoelectric device which senses whether the meter, itself a relatively small unit, remains attached to its original, relatively large base. If mechanical latches are opened in anticipation of removing the meter from the base, an output from detector 54 causes a signal to be generated. This signal is employed to disable the meter.

The outputs of power level sensing circuit 52, meter locked detector circuit 54 and print detector circuit 56 are applied to a logic buffer 60. Since the response of the central processor unit 16 will be different for different ones of the event-indicating signals, the signals must be applied as separate internal inputs to the system through the logic buffer 60. A signal appearing on the output of buffer 60 is applied to memory interface unit 20 which, in response to a command from the central processor unit 16, transfers the signal to the processor for decoding.

The memory interface unit 20 provides outputs to a decoder circuit 62. The decoder circuit 62 is used to select whether non-volatile random access memory 24, read-only memory unit 22 or one of a number of input logic buffers 60, 74, 76 is to be enabled.

One input to buffer 76 is provided by a switch 75 which can cause either a binary 1 (−15 volts) or a binary 0 (0 volts) to be applied to the buffer 76. Another input to buffer 76 is provided from the input/output channel 14. Outputs to the input/output channel 14 are provided by output port 39 associated with random access memory 40. Logic buffer 74 receives signals from printer setting detector array 30. There are more detectors in the detector array than logic buffer 74 can accommodate at one time. A shift register input multiplexer 28, operating under the control of signals provided through the output port 41, multiplexes the inputs from detector array 30 to logic buffer 74. Multiplexer 28 may be a 4003 device available from Intel Corporation.

In accordance with the present invention, the entire meter unit disclosed in FIG. 3 is contained within a secure housing which cannot be entered other than by an authorized representative of the U.S. Postal Service. The meter unit stores and processes only critical accounting data and printer setting information. Since other information, such as postage rates or zip-zone conversion tables, are not stored within the meter unit 10 but rather within the control unit 12, critical financial or printing circuits can be highly secured. A lower degree of security may be accorded to information which is stored within the control unit 12 since a person who tampers with information other than accounting data or printer settng data cannot bring about improper operation of the meter printer. Moreover, because the information which is stored and processed within the meter unit is not changed simply because of a change in governmental regulations or rates, the lower degree of security accorded all other information makes it easier for the manufacturer or service technician to "update" postal rate tables or zip-zone calculations without the inconvenience and problems which attend entry into the high security sections of a meter.

Thus, by isolating the accounting data and calculations and the printer setting information in a highly secure unit and by excluding all less-critical data, the meter security and maintainability are enhanced.

Figure 4:
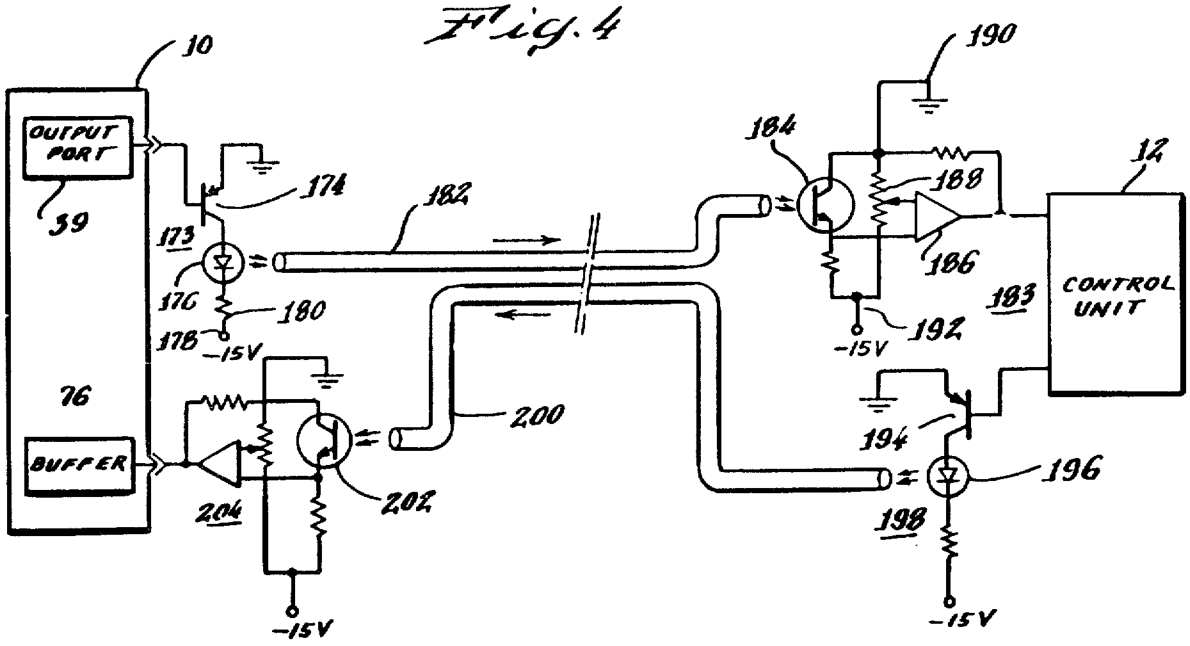
FIG. 4 is a schematic diagram of a preferred embodiment of a noise-rejecting input/output channel linking the meter unit to the control unit of the system.

The security of the meter unit 10 is enhanced by means of the input/output channel used. This input/output channel is described in detail with reference to FIG. 4. To simplify the drawing, meter unit 10 is shown as including only output port 39 and input buffer 76. Binary signals to be transmitted to the output section of control unit 12 from postal meter 10 are applied in serial fashion to an electrical-to-optical transducer 173. The signals are applied at the base terminal of a transistor 174 having a grounded emitter and a collector connected to the anode of a light-emitting diode 176. The cathode of diode 176 is connected to a −15 volt source 178 through a current-limiting resistor 180.

The light-emitting diode 176 is adjacent one end of a first light-transmitting fiber 182, the opposite end of which is adjacent a phototransistor 184 in a first optical-to-electrical transducer circuit 183.

The emitter of phototransistor 184 is connected to one input of a comparator amplifier 186, the second input to which is provided through a voltage divider 188 connecting a ground terminal to a −15 volt source 192. The input to the comparator amplifier 186 provided through the voltage divider 188 establishes a threshold voltage which the output of phototransistor 184 must exceed before the transistor output voltage will cause a change in the output of comparator amplifier 186. Thresholding reduces the chance that noise voltages generated within meter unit 10 or either of the transducers 173 or 183 will be wrongly interpreted as signal voltages.

Binary signals representing data or instructions to be input to the meter unit 10 from the input section of control unit 12 are applied to a second electrical-to-optical transducer circuit 198. The signals are applied at the base terminal of a transistor 194 in circuit with a light-emitting diode 196 adjacent one end of a second light transmitting fiber 200. The opposite end of fiber 200 is adjacent a phototransistor 202 in a second optical-to-electrical transducer 204. Transducer 204, which is identical in construction to transducer 183, converts the optical signals to electrical signals which are applied to one input of buffer circuit 76 of meter unit 10.

Since the input-output information transmitted through the channel 14 is transmitted in the form of optical signals and since extraneous electric fields cannot induce noise voltages in such optical fibers, the channel 14 effectively resists induction of such noise voltages. Of course, light-transmitting fibers 182 and 200 must be coated or otherwise shielded from extraneous light.

Moreover, because the maximum output of the light emitting diodes is limited, even a normally destructive voltage surge or static electrical discharge at the control unit 12 cannot be transmitted at destructive levels to the meter unit 10. Even a direct short circuit across one of the electrical-to-optical transducers will not be destructive, since the output of the optical-to-electrical transducer is also inherently limited regardless of the intensity of the optical input.

The information transmitted in either direction over channel 14 is transmitted one bit at a time. In one embodiment, a binary 0 is represented by short light pulse while a binary 1 is represented by a longer light pulse. Successive pulses are separated by periods of time during which the light-emitting diode is de-energized; i.e., produces no light.

Data is transmitted to and from the meter over channel 14 in 64-bit sequences consisting of 16–4 bit words. While some messages do not require all 16 words, the fixed message length was preferred over a variable message length because of the greater ease with which messages of fixed length could be handled and stored within the system.

Critical accounting data, such as the contents of the ascending and descending registers are updated and stored in the non-volatile random access memory 24. When the power supply voltage falls below a predetermined level, the signal provided by power level sensing circuit in signal generator circuit 32 will ultimately disable the meter while critical accounting data is preserved.

Figure 5:
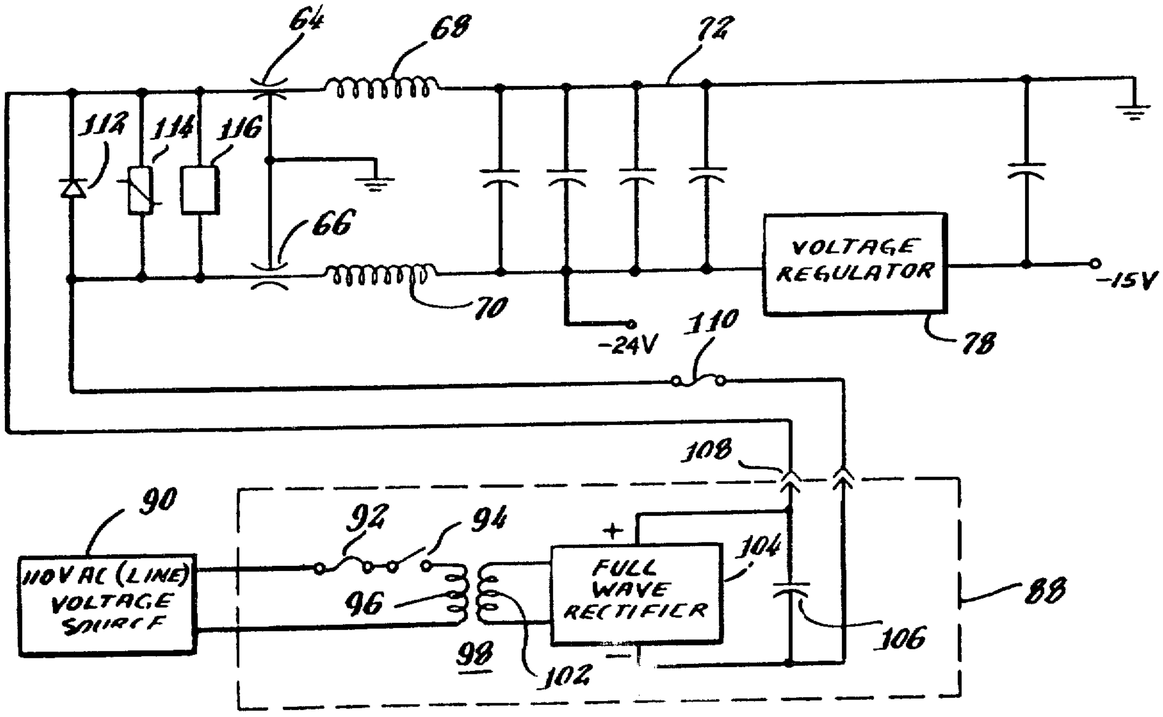
FIG. 5 is a detailed schematic diagram of a preferred circuit for protecting against abnormal variations of a supply voltage.

While the operation of power level sensing circuit 52 is normally adequate to preserve the critical accounting data in the typical loss of power situation, more complete protection against data loss or damage due to abnormal variations in the supply voltage is provided in the circuit described with reference to FIG. 5. The protective circuit to be described operates in combination with an AC to DC converter 88 which accepts an alternating current input from a line voltage source 90. A fuse 92, a switch 94 and the primary coil 96 of a step-down transformer 98 are connected in series across the terminals of the line voltage source 90. A secondary coil 102 of transformer 98 provides a stepped down alternating voltage to a full wave rectifier circuit 104 having a filter capacitor 106 connected across its output terminals. The AC to DC converter 88 is located in the base 11 of the meter and is connected to the protective circuitry within meter unit 10 through conventional, detachable connectors 108, referred to hereafter as power supply terminals.

A circuit interrupter 110, which may be a conventional fuse, is connected in series with one of the leads from the power supply terminals 108. A diode 112, a metal oxide varistor 114 and an overvoltage detector 116 are connected in parallel with one another across the terminals 108; that is, across the output terminals of the full wave rectifier 104 in AC to DC converter 88. Feed-through capacitors 64 and 66 are connected in series with the leads from terminals 108. A pair of inductances 68 and 70 are connected in series with the feed-through capacitors 64 and 66, respectively. A set 72 of filter capacitors is connected across the inductances 68 and 70.

A conventional voltage regulator circuit 78 on the output side of inductances 68 and 70 acts on the generated logic level voltage to establish a required, second logic level voltage. For example, the input to voltage regulator 78 may be −24 volts while its output may be −15 volts. Such voltages are commonly required to operate negative logic circuits.

The components described above act to block or suppress abnormal variations in the voltage provided at terminals 108. Such abnormal variations may result from variations in the line voltage, from failure of one or more components in the AC to DC converter 88, or from an attempt to operate the postal meter with an unauthorized power source connected across terminals 108. The latter situation might occur where a well-meaning user attempts to bypass a temporarily malfunctioning AC to DC converter 88 by attaching his own DC power supply at terminals 108. Potentially, the same situation may be caused by an illegal user who, having stolen a meter from its base, is trying to convert the remaining postage in the meter to his own use.

The diode 112 has no effect on the operation of the meter so long as the DC voltage applied across terminals 108 is of the correct polarity. However, if the polarity of the voltage applied across terminals 108 is reversed for any reason, the diode 112 short circuits the protective circuitry, causing a current to be applied through fuse 110 far in excess of the interrupt current required to blow the fuse. When fuse 110 is blown, the meter unit is disabled while the contents of the memory 24 are saved. The fuse 110 can be replaced relatively easily by a trained serviceman. However, replacement of the fuse requires that a meter unit seal be broken. Therefore, even successful attempts by unauthorized personnel will be readily detected by the postal authorities.

Metal oxide varistor 114 is a conventional circuit component having a voltage-dependent, nonlinear impedance characteristic which tends to suppress voltage spikes.

Overvoltage detector 116 is also a conventional circuit component which has a normally high impedance when the voltage applied across it is less than a predetermined value. If the applied voltage exceeds the predetermined value, however, a breakdown effect occurs, causing a high current to be applied through device 116 and interrupter 110. Thus, interrupter 110 will be blown whenever normal voltage of the wrong polarity or excessive voltage of the right polarity is applied across terminals 108.

The feed-through capacitors 64 and 66, inductances 68 and 70 and filter capacitor 72 provide quick suppression of rapidly occurring voltage spikes and thus prevent meter damage which might otherwise occur before the varistor 114 and detector 116 can function.

Filter capacitors 72 also provide temporary power storage which gives the meter additional time to shut down in an orderly fashion in the event of a power loss. Feedthrough capacitors 64 and 66 and inductors 68 and 70 also filter any high-frequency noise voltages which might be induced in the DC power lines.

The meter unit described above controls a postage printer, one embodiment of which is described with reference to FIGS. 6, 7 and 8. The printer is a modified Model 5300 postage meter manufactured by Pitney Bowes, Inc., Stamford, Conn. The basic Model 5300 postage meter is a mechanical device with mechanical registers and actuator assemblies. The modified meter contains only a print drum 80 and a set 82 of print wheel driving racks. Since the modified meter is intended to be used in an electronic system, the mechanical registers and actuator assemblies have been removed.

The print wheels (not shown) within drum 80 are set by a mechanism driven by a first stepping motor 84 and a second stepping motor 86. Signals for controlling the operation of the stepping motors 84 and 86 are provided by the meter unit described above. The stepping motor 84 drives the upper and lower set 82 of postage wheel driving racks (consisting of racks **82*a*, 82*b*, 82*c*, 82*d*) through a gearing assembly including upper and lower nested shafts 118*a*, 118*b*, 118*c* and 118*d*, respectively. The angular positions of the upper shafts 118*a*, 118*b* and the lower shafts 118*c*, 118*d* are controlled by a master gear 120 which may be driven in either a clockwise or a counterclockwise direction by the stepping motor 84**.

The print drum 80 has four independently-positioned print wheels (not shown) which provide a postage impression to the minimum sum of $99.99. Each print wheel provides a separate digit of this sum and can be set from "0" to "9". The print wheels are sequentially set by the meter setting mechanism by means of the four driving racks **82*a*, 82*b*, 82*c*, 82*d*. The driving racks are slidable within print drum shaft 122 in the directions indicated by the double-headed arrows 124**.

The settings of the upper racks, **82*a* and 82*b* are controlled by pinion gears 126*a* and 126*b*, respectively. The settings of the lower racks 82*c* and 82*d* are controlled by a similar set of pinion gears not shown in the drawings. The pinion gear 126*a* is attached to the inner shaft 118*a* while the pinion gear 126*b* is attached to the concentric outer shaft 118*b*. The pinion gears which control the settings of driving racks 82*c*, 82*d* are similarly attached to nested shafts 118*c* and 118*d*, shown only in FIG. 8. The angular positions of the nested shafts 118*a*, 118*b*, 118*c*, 118*d* are controlled by shaft-mounted spur gears 128*a*, 128*b*, 128*c*, 128*d*. The master gear 120 can be shifted laterally along an axis parallel to the axis of the spur gears 128a, 128b, 128c, 128d to intermesh with a single gear at a time. The master gear 120 is rotatably mounted within a slot 130 in a yoke 132 which slides along a splined shaft 134. The yoke 132 is held away from rotatable engagement with splined shaft 134 by an interposed sleeve bushing 136. The master gear 120 engages the gears 128a, 128b, 128c, 128d in the sequential order: 128b, 128a, 128d, 128c. In this order, gear 128b controls the setting of the "tens of dollars" print wheel, gear 128a controls the "dollars" print wheel, gear 128d controls the "tens of cents" print wheel and gear 128c** controls the "units cents" print wheel.

The yoke 132 includes a pair of upper and lower tooth trough walls 138 and 138' located on the upper and lower surfaces of the yoke 132. As the yoke 132 and master gear 120 slide laterally along the splined shaft 132, the upper and lower laterally-extending walls 138 and 138' slide along either side of one of the teeth in each of the spur gears. The tooth troughs prevent rotational movement of any of the spur gears other than a spur gear meshed with master gear 120.

The lateral position of yoke 132 and the master gear 120 is controlled by stepping motor 86, the output shaft of which carries a splined gear 140. The splined gear 140 meshes with a rack 142 attached to yoke 132 at an L-shaped, lower extension 144. The clockwise or counter-clockwise rotation of splined gear 140 upon energization of stepping motor 86 is translated into lateral movement of yoke 132 through the rack and pinion arrangement. The splined gear 140 prevents counter-clockwise rotation of yoke 132 about the axis of shaft 146 due to any friction between rotating sleeve bushing 136 and the yoke 132. A roller 148 mounted beneath the L-shaped extension 144 prevents any clockwise movement of the yoke 132 about the axis of shaft 146.

When the print wheels within print drum 80 have been set to the correct postage value position, drum 80 is rotated by shaft 122 in a direction indicated by arrow 150 to imprint the postage. The drum 80 is then returned to a home or rest position sensed by a slotted disk 152 mounted on shaft 122. When a slot 154 in disk 152 is interposed between the arms of an optical detector 156, the shaft 122 is at its home position.

All optical detectors in the setting mechanism are basically U-shaped structures having a light emitting diode located in one arm and a phototransistor located in the other arm. Light emanating from the light emitting diode is transmitted to the phototransistor only when a slot in an interposed disc is aligned with the arms of the detector.

The home or "0" positions of nested shafts 118a and 118b are similarly sensed by slotted discs and, respectively, in combination with optical detectors 160a and 160b. The home or "0" positions of the lower pair of nested shafts are sensed by similar slotted discs and optical detectors, none of which are shown in the drawing.

The shafts and gears are returned to the home position upon startup of the meter system. Subsequent setting is accomplished by stepping the motor 84 through a calculated number of steps using previously-established settings as a reference.

The angular movement of the stepping motor shaft 146 (and consequently splined shaft 134 and master gear 120) is monitored through an assembly including gears 162 and 164, slotted monitoring wheel 166 and optical detector 168. When the stepping motor shaft 146 turns, gear 162, which is mounted on shaft 146, must also turn through the same angle. Gear 162 intermeshes with gear 164 carried by the slotted monitoring wheel 166, causing the wheel to rotate in correspondence with rotation of shaft 146. Every fifth slot 170 on monitoring wheel 166 is extra long to provide a check on the monitoring wheel operation. Each slot on wheel 166 corresponds to a change of one unit of postage value. Optical detector 168 has two photosensors. One of the photosensors is mounted near the bight of the U-shaped detector structure; that is, near the periphery of monitoring wheel 166. This photosensor monitors every step of the stepping wheel 166. The other sensor is located near the ends of the arms of detector 168. This photosensor receives light from an associated light source on the opposite side of the monitoring wheel 166 only when the extra long slot 170 is aligned with the detector arms. Thus, this sensor monitors every fifth step of the monitoring wheel 166. The number of slots on wheel 166 which pass through detector 168 during rotation of motor 84 are counted in the electronic section of the meter unit. If the counter does not contain a count of five when the output from the second photosensor in detector 168 is sensed (indicating long slot 170 is aligned in the detector), an error condition exists.

The lateral position of yoke 132 and master gear 120 is monitored by a position indicator including a pair of spaced plates 206, 208 attached directly to yoke 132. Plates 206 and 208 include slot patterns which are binary-encoded representations of the position of the yoke relative to optical detectors 210, 212, 214 all of which are attached to an L-shaped bracket 216 on stepping motor 86. Each different slot pattern indentifies a particular position of yoke 132.

Figure 9:
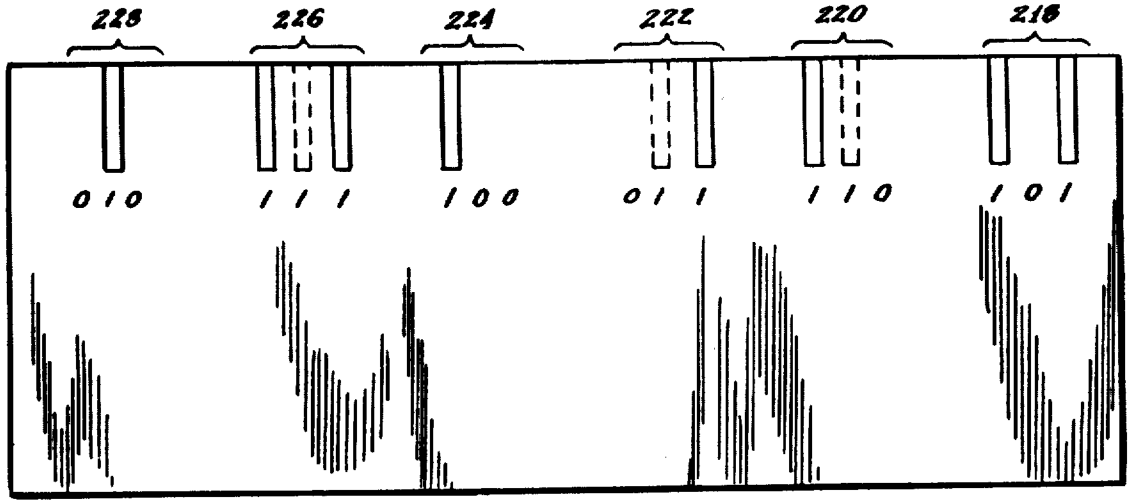
FIG. 9 is a top view of position encoder plates for a preferred form of postage printer.

The slot patterns may be seen more clearly with reference to FIG. 9, which is a plan view of plate 206. Slots appearing in plate 208, which is vertically aligned with plate 206 and therefore substantially hidden, are shown in dotted outline form.

In a preferred embodiment of the invention, plates 206 and 208 have six different binary slot patterns identifying six lateral positions for yoke 132. Each of the slot patterns consists of a unique triplet in which the presence of a slot in either plate 206 or plate 208 is interpreted as a binary one while the absence of a slot in any position where a slot might appear is interpreted as a binary zero. The binary indicia for the two outside positions in each triplet are included on plate 206. The binary indicia for the center position in each triplet is included on plate 208. The binary indicia are distributed between two vertically aligned plates only because optical detectors 210, 212, 214 are too bulky to permit three detectors to be placed side by side on a single plate of reasonable size. From a logic standpoint there is no significance to the fact the indicia are distributed between two plates. The indicia are read and interpreted as if they were contained on a single plate.

Position 218, identified by the binary slot pattern "101", is the detected slot pattern when master gear 120 is meshed with the spur gear for the "tens of dollars" bank of the postage meter. Position 220, identified by binary slot pattern "110", is detected when master gear 120 meshes with the spur gear for the "dollars" printing wheel. Position 222, identified by binary pattern "011", is detected when master gear 120 meshes with the spur gear which sets the "tens of cents" print wheel on the postage meter. The "cents" print wheel is set by master gear 120 in position 224, identified by the binary pattern "100".

Positions 226 and 228, identified by binary patterns "111" and "010", respectively, serve security purposes. After each of the print wheels has been set by the master gear 120, yoke 132 is shifted to an "enabled" position 228 which is the only position in which shaft 122 can rotate to imprint the set postage. A conventional mechanical interlock between the yoke 132 and a shutter bar (not shown) is released only in this position to assure that printing cannot occur if the meter is not ready due to any reason or if an error has occurred or if insufficient funds are available in the meter register.

Position 226, referred to as a disabled position, is a position wherein each of the spur gears 128a, 128b, 128c, 128d is mechanically locked by the projecting troughs 138 and 138'. In the "disabled" position, which is the position to which the yoke 132 is driven upon loss of power, the printer is mechanically locked and cannot be reset even by external force applied directly to the print wheels in print drum 80.

Figure 10:
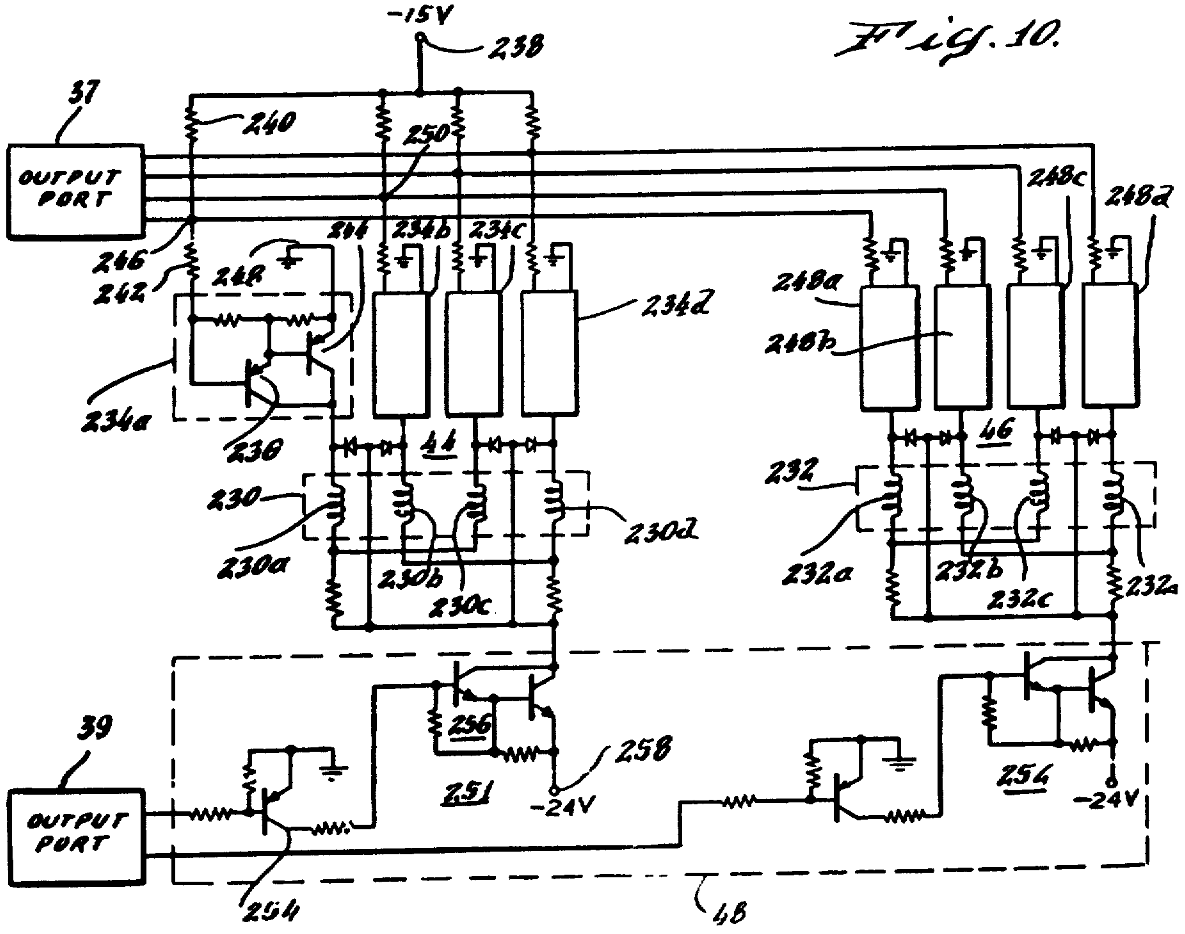
FIG. 10 is a detailed schematic diagram of the interface between the meter unit electronics and the drive motors for one embodiment of postage printer.

The electrical interconnections of the stepping motors 84 and 86 with the output ports 37 and 39 are described with reference to FIG. 10. The four parallel output leads from output port 37 are connected to the coil select circuits 44 and 46 for the stepping motors 84 and 86, respectively. Each of the stepping motors is a conventional eight-phase stepping motor, which is rotated in predetermined angular increments by energizing different combinations of four coils contained within the motor.

The coils for stepping motor 84, included within a coil system 230, are identified as coils 230a, 230b, 230c and 230d. Similarly, the coil system 232 for motor 86 includes coils 232a, 232b, 232c, 232d. Each of the individual coils in each motor is connected in series with a Darlington amplifier. For example, coil 230a is connected in series with Darlington amplifier 234a in which the base terminal of a first transistor 236 is connected to a −15 volt source 238 through series resistors 240 and 242. A second transistor 244 has a grounded emitter, a base terminal connection to the emitter of transistor 236 and a collector connected to the collector of transistor 236. Darlington amplifier 234a is off or nonconducting when the associated output 246 from output port 37 is at a binary 0 or ground potential. In this state, the Darlington amplifier prevents current flow from an associated ground terminal 248 through the second transistor 244 and thus through coil 230a. When the output 246 drops to a more negative or binary 1 level, the Darlington amplifier 234a is switched to an on or conducting state.

Darlington amplifiers 234b, 234c and 234d are identical to amplifier 234a except for the connections to different output leads and different motor coils.

The coils in coil system 232 are similarly connected in series with Darlington amplifiers 248a, 248b, 248c, 248d. Corresponding coils in each of the coil systems 230 and 232 are connected to the same output terminal of output port 37. For example, coils 230b and 232b are connected through respective Darlington amplifiers 234b and 248b to output 250. A binary 1 signal on output 250 switches both Darlington amplifiers 234b and 248b into their on or conducting state. However, coil current will be established in only the motor selected by operation of motor select circuit 48.

Motor select circuit 48 is connected to outputs from output port 39 and comprises switching circuits 251 and 252 connected in series with coil systems 230 and 232, respectively.

Switching circuit 251 includes an inverter amplifier 254 which provides an increased current at its collector terminal when the input to the amplifier 254 falls to the more-negative binary 1 level. The output of inverter amplifier 254 is applied to a Darlington amplifier 256 which, when conducting, provides a current path from a ground for each of the coils in coil system 230 to a −24 volt source 258.

Switching circuit 252 is identical in construction to switching circuit 251 but is energized in an alternative manner. When a binary 1 signal appears at the input to switching circuit 251, a binary 0 signal is applied to switching circuit 252 and vice versa. Thus, depending upon the inputs to the switching circuits 251 and 252, either coil system 230 or coil system 232 will be connected in a closed circuit loop. The other coil system will be open circuited. Since the coil system for only one of the two drive motors is complete at any one time, the output port 37 can be used to control the operation of both motors using the common output connections.

Figure 11:
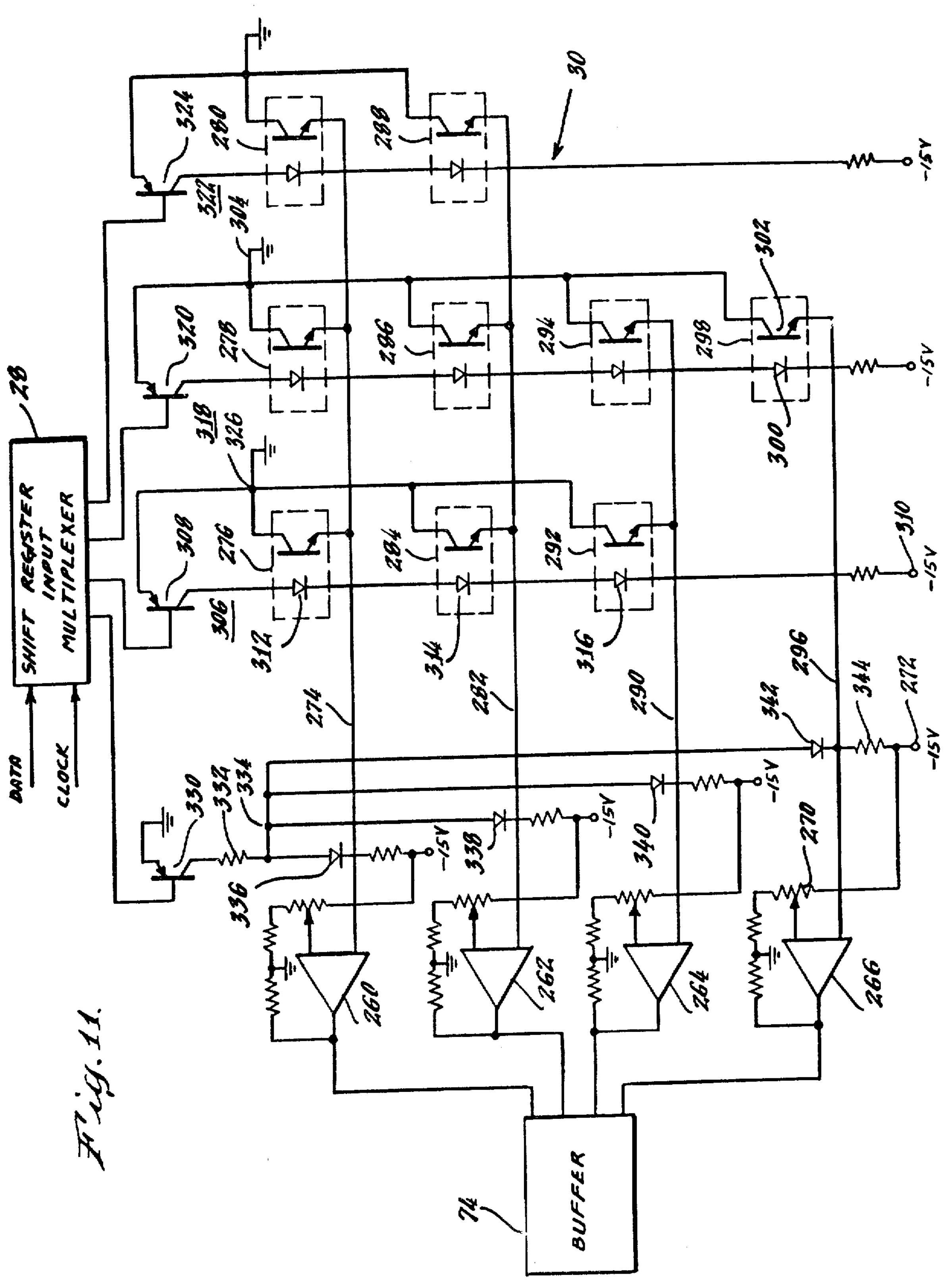
FIG. 11 is a detailed schematic diagram of a postage printer setting detector array, including the input connections to the meter section electronic control section.

Referring to FIG. 11, the states of the optical detectors which monitor the printer setting mechanism are inputted to the system through printer setting detector array 30 which includes a novel failure detect system. The inputs from the printer setting detector array 30 are applied to logic buffer 74 which may be a conventional 4-bit parallel input buffer circuit. Each of the inputs to buffer 74 is fed by one of four comparator amplifiers 260, 262, 264, 266. Each of these comparator amplifiers has one input connected through a voltage divider to a −15 volt reference source. For example, comparator amplifier 266 has an input 268 to which a predetermined negative voltage may be applied by means of a voltage divider 270 and a −15 volt source 272.

A second input to each of the comparator amplifiers is connected to a bus from the output side of one or more of the optical detectors. More particularly, input 274 to comparator amplifier 260 is connected to the output side of detectors 276, 278 and 280. Input 282 to comparator amplifier 262 is connected to the output sides of detectors 284, 286, 288. Input 290 to comparator amplifier 264 is connected to the output side of a pair of detectors 292 and 294 while input 296 to comparator amplifier 266 is connected to the output side of a single detector 298.

Each of the optical detectors is identical to detector 298 which includes a light emitting diode 300 and a phototransistor 302, which conducts only when its base area is illuminated by optical radiation from the light emitting diode 300. It will be recalled from the description of FIGS. 6–8 that a slotted disc is interposed between the light emitting diode and the phototransistor or light detector. The slotted disc rotates with one of the shafts of the printer setting mechanism. When the slot in the disc rotates into alignment with the light source and the light detector, the phototransistor is gated into conduction to provide a current path between a ground terminal, such as terminal 304 and the amplifier input.

The detectors are connected in what might be described as a column and row matrix with the rows consisting of buses 274, 282, 290 and 296. Each column consists of a single series circuit including a transistor having its base terminal connected to the shift register input multiplexer 28, a −15 volt source and two or more serially-connected light emitting diodes. For example, column 306 consists of transistor 308, −15 volt source 310 and three serially-connected light emitting diodes 312, 314, 316, which are components of optical detector circuits 276, 284 and 292, respectively. Column 318 consists of transistor 320 and serially-connected light emitting diodes in detector circuits 278, 286, 294 and 298. Column 322 consists of an identical transistor 324 and the light emitting diodes in the detector circuits 280 and 288.

The base terminals of the transistors 308, 320 and 324 are connected to the second, third and fourth stages, respectively, of the shift register 28. The first stage of shift register 28 is connected to an error detect circuit to be described in more detail later. Inputs to shift register 28 include a data input and a clock input. In operation, the optical detectors to be monitored are selected by loading a binary 1 into shift register 28. The binary 1 is then shifted upon successive clock pulses to the shift register stage connected to the column containing the detectors to be read. The example, if the detectors 276, 284 and 292 are to be read, the binary 1 is shifted to the second stage of shift register 28 to drive transistor 308 into a conductive state. When transistor 308 conducts, a current path is formed, permitting current to flow from ground terminal 326 through light emitting diodes 312, 314 and 316 to the −15 volt source 310. Under these conditions, output signals from comparator amplifiers 260, 262 and 264 are interpreted by the electronics control unit as outputs from optical detectors 276, 284 and 292.

Similarly, if the binary 1 had been shifted to the third stage of shift register 28, transistor 320 would have been energized to establish a current path through the light emitting diodes for the detectors in column 318. Changes in the inputs to the comparator amplifiers would have been interpreted as changes in the states of the detectors in column 318.

It is evident that shift register 28 and the array of detector connections provide a multiplexing function by which different sets of up to four detectors can be connected to the four parallel inputs to buffer circuit 74 at one time. Thus, while only nine detectors have been shown in columns 306, 318 and 322, up to 12 detectors could have been accommodated if necessary or desirable.

The error checking or failure detect feature referred to above simultaneously drives the inputs to all four comparator amplifiers from a binary 1 (−15 volt) level to a binary 0 (0 volts) level each time the printer setting detector array is called into operation. The failure detect circuit includes a transistor 330 having its base terminal connected to the first stage of shift register 28, its emitter terminal connected to a ground terminal and its collector connected through a resistor 332 to a common junction 334 of diodes 336, 338, 340 and 342. The opposite terminals of each of these diodes is connected through a resistor to a −15 volt source. For example, diode 342 is connected to −15 volt source 272 through resistor 344.

Before a binary 1 is loaded into the first stage of shift register 28, transistor 330 is non-conducting which means that the inputs 274, 282, 290 and 296 to the comparator amplifiers 260, 262, 264 and 266, respectively, should be at the binary 1 level. When the first stage of the shift register 28 goes negative (i.e., receives a binary 1 signal) transistor 330 is triggered into conduction to provide a current path from ground through each of the diodes 336, 338, 340 and 342 to the inputs of the respective comparator amplifiers. Thus, the second input to each of the amplifiers will change state immediately, causing the outputs of the amplifiers to simultaneously change state. Under the control of a routine described in more detail later, the electronics control unit of the meter unit will monitor the outputs of the comparator amplifiers to see whether all outputs have changed states simultaneously. If the outputs fail to change states as expected, an error signal is generated to inform a user of the system of a probable failure in one of the comparator amplifiers or associated circuit components. Thus, the operability of the comparator amplifiers is verified at the beginning of each printer setting detector operation.

Figure 12:
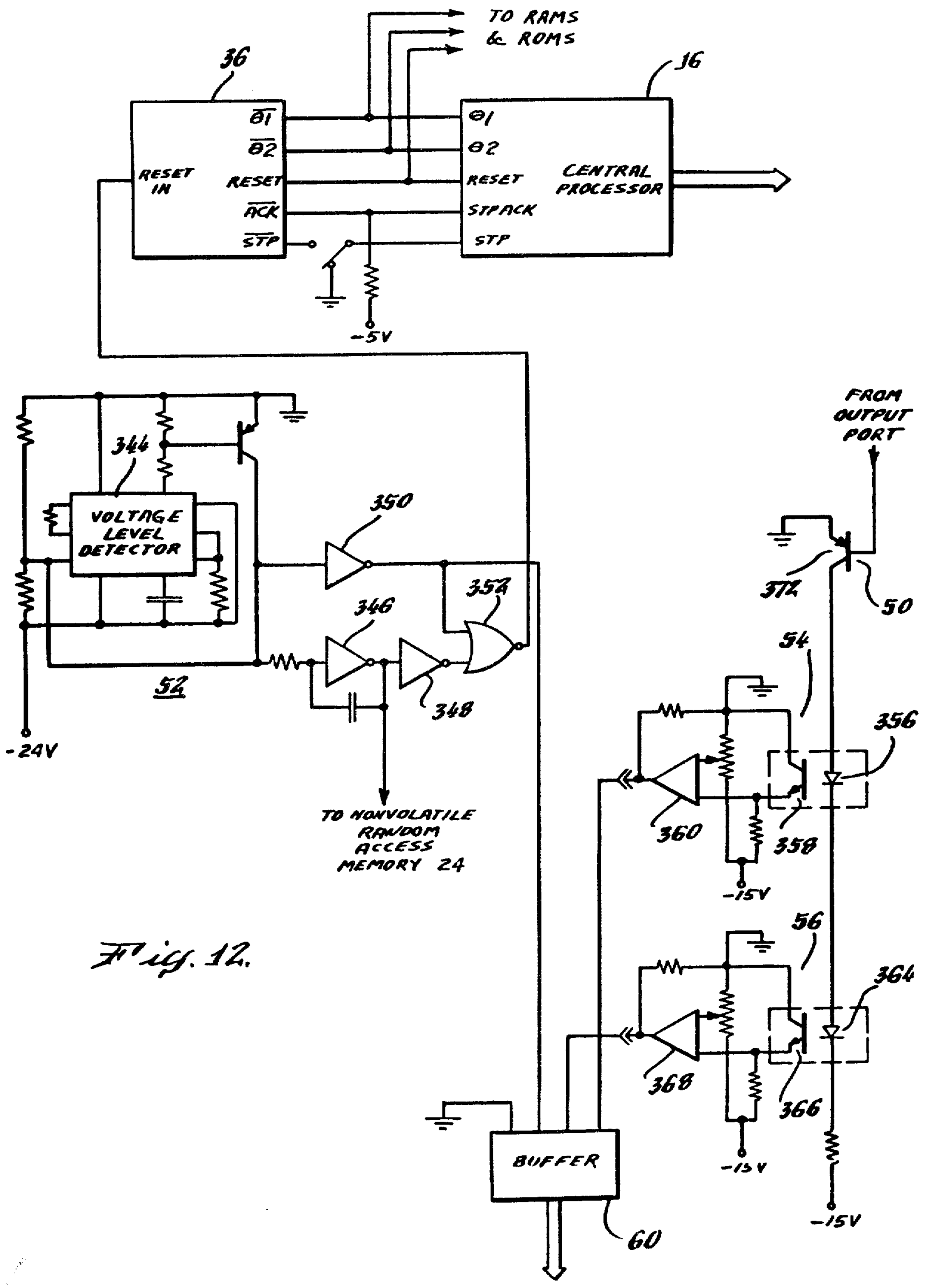
FIG. 12 is a detailed schematic diagram of an interrupt generator circuit for the electronic control of the meter section.

There are a number of conditions under which the operation of the meter unit 10 must be responsive to the occurrence of physical events, in order to preserve critical accounting data, disable the meter from further operation or optimize the meter operation. The necessary signals for triggering this response are provided by signal generator circuit 32 which will now be described in detail with reference to FIG. 12.

As was mentioned briefly with reference to FIG. 3, signal generator circuit 32 includes a test switch 50, a power sense circuit 52, a meter locked detector 54 and a print detector 56. The power sense circuit 52 is driven by the system −24 volt source. This source is connected to a conventional voltage regulator circuit 344, employed as a voltage level detector circuit. The output of inverter amplifier 346 is applied both to non-volatile random access memory 24 and to the input of a serially-connected inverter amplifier 348. The output of voltage regulator 344 is applied to an inverter amplifier 350 which, together with inverter amplifier 348, provides an input to input buffer 60.

The power sense circuit 52 does not affect the operation of the meter unit as long as the voltage remains at suitable levels. However, if the voltage begins to decrease, indicating an impending power failure, circuit 52 generates a signal which when detected by the central processor 16, causes the processor to enter a routine which cannot be exited other than by a complete shutdown and re-start of the meter.

Meter-locked detector circuit 54 includes a light emitting diode 356 adjacent a phototransistor 358. Components 356 and 358 are physically located adjacent the base of the meter unit and are normally optically linked. Thus, under normal conditions, phototransistor 358 conducts. If the meter unit is unlocked from the base, however, the optical link is broken, driving the lower input to a comparator amplifier 360 to a −15 volt or binary 1 level. When this occurs, the output of comparator amplifier 360 changes state. Comparator amplifier 360 provides an input to buffer circuit 60.

The print detector circuit 56 determines when a print operation has begun; that is, when the print drum 80 actually starts to rotate away from its home position to a printing position. Print detector 56 includes a light emitting diode 364 located on the opposite side of a slotted disk (not shown) on the print drum shaft 122 from a phototransistor 366. When the printer leaves the home position during a print operation, the slot moves out of alignment between diode 364 and phototransistor 366. Phototransistor 366 then turns off, causing the lower input of a comparator amplifier 368 to be driven to a binary 1 level. The output of comparator amplifier 368 is connected to buffer circuit 60.

In order to test the operation of the print detector 56 or the meter locked detector 54, a test interrupt switch 50 consisting of a transistor 372 is included in series with the light emitting diodes 356 and 364. The base terminal of transistor 372 is connected to output port 39, which can be seen in FIG. 3. Normally, the voltage on the base terminal of transistor 372 is kept at a binary 1 level to provide a current path from a ground terminal through the light emitting diodes 356 and 364 to a −15 volt source. To simulate an event, the base voltage on transistor 372 is temporarily driven to a binary 0 level to open the current path through the light emitting diodes 356 and 364. The interruption in current to the light emitting diodes has the same effect upon comparator amplifiers 360 and 368 as an event-indicating condition. The test condition is readily identified by the central processor since two inputs to buffer circuit 60 will have simultaneously changed state.

Figure 13:
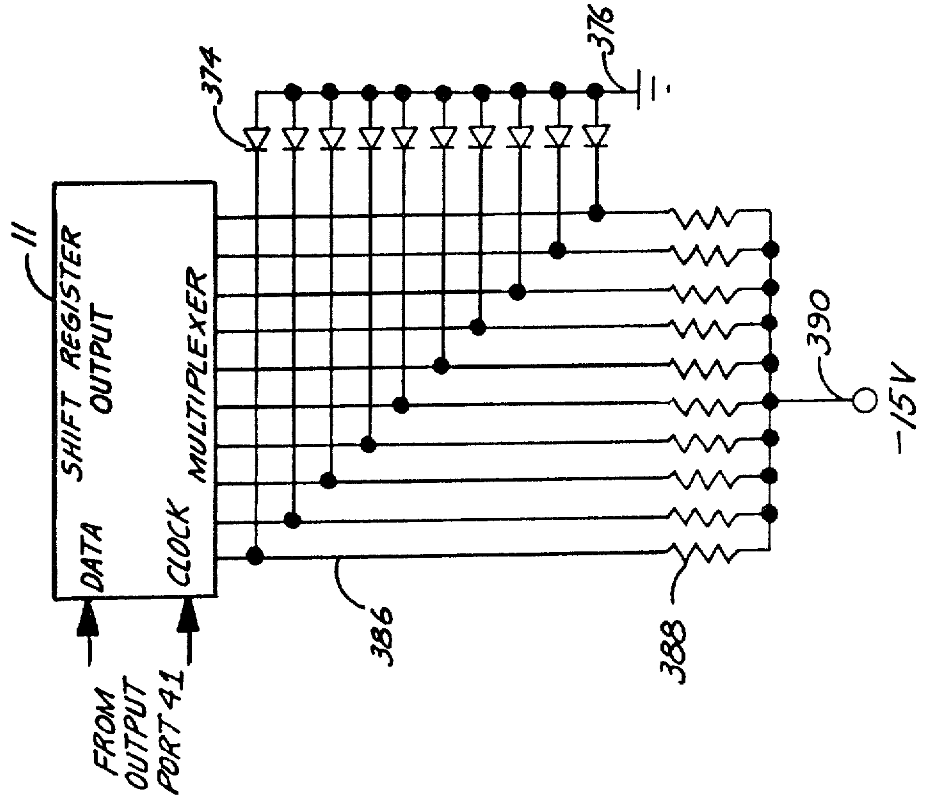
FIG. 13 is a detailed schematic diagram of a condition—indicating LED display.

Light emitting diode or LED display 13 is included to provide a user with a visual display of certain error conditions. Referring to FIG. 13, the LED display includes a number of light emitting diodes, such as LED 374 having a common anodic connection to a ground terminal 376. Each of the light emitting diodes has a cathode connection to a different output line from shift register output multiplexer 11. For example, the cathode of light emitting diode 374 is connected to output line 386, and each of the other output lines is connected to a −15 volt source 390 through identical pull-down resistors, such as resistor 388.

Depending upon the error conditions to be displayed, binary 1's or 0's are entered one bit at a time into shift register 11 through a data input terminal and are shifted through the register 11 by a series of clock pulses. Both the data and the clock pulses are provided through output port 41. When a binary zero appears at a particular stage of the shift register, both the anode and the cathode of the light emitting diode connected to that stage will be at the same potential; that is, ground. The light emitting diode produces no optical radiation under these conditions. However, when the shift register stage contains a binary 1 (−15 volts) the 15 volt potential across the light emitting diode connected to that stage causes the diode to emit light.

The particular error condition or status represented by each of the light emitting diodes is described in more detail with reference to a subsequent figure.

Figure 14:
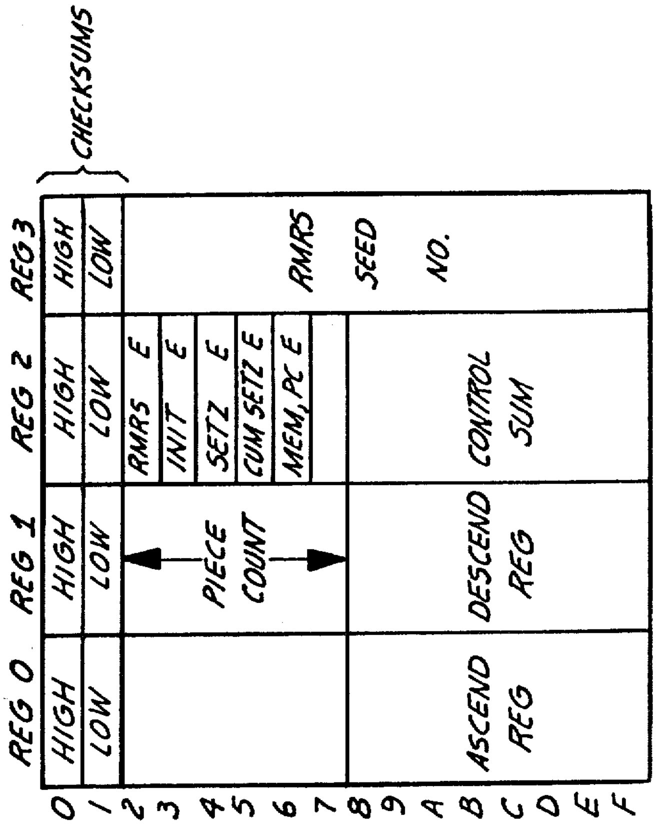
FIG. 14 is a representation of the assignment of memory locations in a nonvolatile memory.

Specific types of data are assigned to specific locations within the nonvolatile, random access memory 24 and the volatile random access memories 38, 40, 42. FIG. 14 illustrates the assignment of memory locations within nonvolatile random access memory 24.

Memory 24 is a 256-bit memory divided into four 64-bit registers. Each register contains 16 four-bit words. The memory locations and the data handled within the system are expressed in hexadecimal format. That is, the lowest numbered word in a particular register would be word 0 while the highest numbered word would be word /F, which is actually the 16th word of the register. Any particular word can be identified by two digits. The first digit represents the register containing the word while the second digit represents a particular level of word in the memory. For example, memory location 00 in nonvolatile memory 24 would be the four-bit word located in the extreme upper left-hand corner of FIG. 14 while memory location 3F would be the word appearing in the lower right-hand corner of FIG. 14.

The first two words of each of the nonvolatile memory registers are used to store the high and low order characters, respectively, of checksums which are used to check for read/write errors which might arise during the transfer of data. The checksums are generated by subroutines which are described in more detail later. Basically, however, these checksums are simply the summation of all binary digits of data stored in the remaining words of the register.

Nonvolatile memory locations 08–0F are assigned to an ascending register which contains a running total of all postage printed by the meter over its entire life cycle. Memory locations 18–1F contain the descending register, representing the total amount of postage available for metering operations before the meter must be refunded. Memory locations 28–2F contains a control sum obtained by adding the contents of the ascending register and the descending register. Since the ascending register should be incremented during each printing operation by the same amount by which the descending register is decremented, the control sum should remain a constant until the meter is re-funded. When more postage is added to the meter, the control sum (and the descending register) will be incremented by the amount of the added postage. The control sum will remain constant at the new higher level until a subsequent refunding operation occurs.

Memory locations 12–17 are reserved for a piece count total which represents the total number of metering operations performed by the meter over its lifetime. This information is significant in planning maintenance schedules. Locations 22–26 of the nonvolatile memory are used to store four-bit error indicators representing specific types of errors. Location 22 stores indications of error which occur during a RMRS or remote meter resetting routine which may be employed to re-fund the meter from a remote location. The RMRS will be described in general terms later. Location 23 is a storage area for error codes associated with the initialization of the meter. During initialization the meter is reset to 0. Errors occurring during the resetting are represented by 1's in the specified memory locations. Location 24 and 25 store error codes associated with the setting of the meter. Memory location 26 stores error codes relating to the operation of the memory units and the photocells of the meter. Most of register 3 of the nonvolatile memory 24 is used to store an RMRS seed number.

Referring to FIG. 15, random access memory 38 is also preferably a 256-bit memory register. Memory location 02 is used to store a message op code for a data message stored in location 03–0F. Memory locations 1D–1F store the information used to control the LED display while the remainder of registers 1 through 3 of random access memory 38 is given over to working memory in which intermediate results, etc. are stored.

Each of the registers of memory 38 includes four 4-bit status characters, labeled SC0 through SC3. These locations, while physically similar to the data storage locations of the memory, are accessed differently and are used to store status indications rather than data. Status characters SC0–SC3 of register 0 are used to store status indicators associated with the digit select stepping motor of the printer. Status character 0 indicates whether the motor is energized to step up (/F) or step down (1). Status character SC1 indicates whether the master gear of the printer is on a full step (0) or a half step (F). Status character 2 indicates an error condition occurring on a half step (bit 2=1), a full step (bit 1=1), or a fifth step (bit 0=1) while status character 3 indicates the contents of the fifth step counter. SC3 equals 0 indicates the 5th step counter is a multiple of five at the right time.

The status characters associated with register 1 provides status indications for the operation of the bank select stepping motor. SC0 indicates whether the motor is energized to step up (F) or step down (1). Status character 1 indicates whether the meter is in its disabled position (0) or an enabled position ($\neq 0$). Bit 0 of status character 2 equals 1 when the motor has failed to take one complete step on the specified direction and a bit 1=1 when not all 0's are observed during the stepping process. Status character 3 indicates the last position of the motor as read by the encoder.

Figure 19:
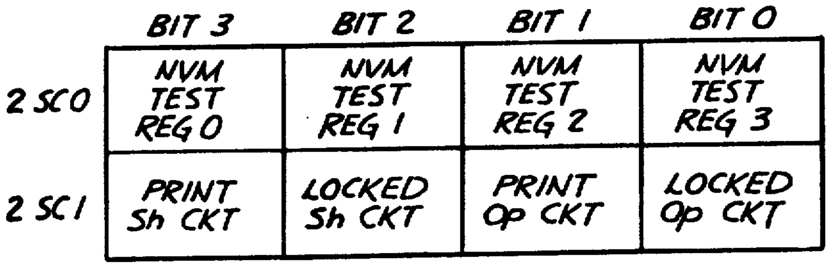
FIG. 19 is a more detailed representation of the assignment of memory locations for status character bits within unit 42.

Status characters SC0 and SC1 of register 2 contain information relating to the NVM and interrupt test routines. The individual bits of each of these status characters are described in more detail with reference to FIG. 19. Status character 0 contains one NVM test bit for each of the registers. The value of each bit indicates whether a nonvolatile memory test described in more detail in a description of a TNVM subroutine indicates proper memory operation. The individual bits associated with status character 1 indicate the results of open circuit and short circuit tests of the meter locked detector 54 and the print detector 56. The meaning of these bits is discussed in more detail in a description of a TINT subroutine.

The assignment of individual bits in words 1D-1F of memory 38 are shown in FIG. 16. The first two bits of word 1D are used to provide an RMRS time out error indication and an initialization time out error indication. A user is given a certain number of opportunities to carry out the tasks needed to perform remote resetting or to initialize the printer. If, for any reason, these tasks are not complete within a given number of attempts, the meter is disabled and these bits are set to 1.

With reference to word 1E, bit 3 is set to 1 when the contents of the ascending and descending register do not equal the control sum, bit 2 is set to 1 when a check sum error is indicated, bit 1 is set to 1 when an error associated with the reading of photocells is detected. Referring to word 1F, bit 3 is set to 1 when the amount of postage remaining in the descending register is less than the amount of postage to which the meter has been set.

Bit 2 is driven to 1 whenever the amount of postage indicated by the descending register falls below $100. This information is useful to a user since it provides notice that the meter will have to be re-funded in the not too distant future. Bit 1 of word 1F is always on while bit 0 is always off. These two bits simply provide an indication that the meter is on but that no short circuits have occurred which would cause the LEDS to become erroneously energized.

Figure 17:
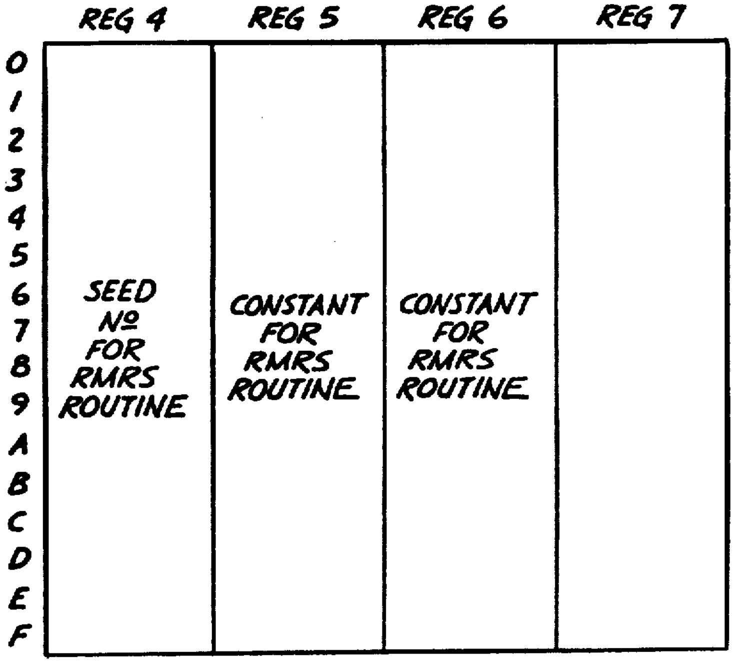
FIG. 17 is a representation of the assignment of memory locations in random access memory unit 40.

With reference to FIG. 17, random access memory 40 contains the same seed number for the RMRS routine as is also stored in register 3 of the non-volatile memory. Words 50-5F and 60-6F of random access memory 40 are used to store constants used in the RMRS routine while words 70-7F are reserved for intermediate calculations, temporary storage, etc.

Figure 18:
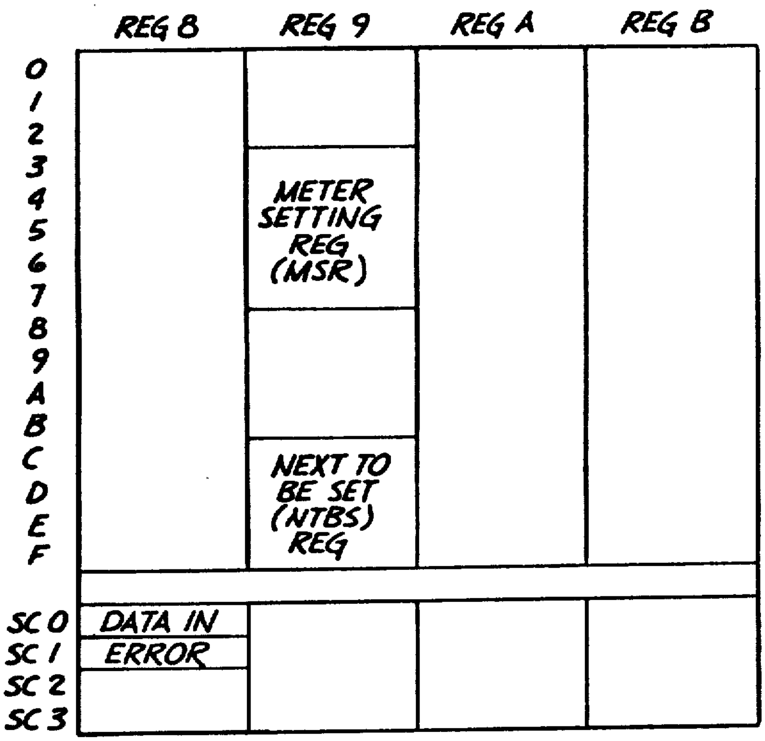
FIG. 18 is a representation of the assignment of memory locations in random access memory unit 42.

Referring to FIG. 18, locations 94-97 of random access memory 42 store the current setting of the meter in a meter setting register (MSR). The next postage amount to be set into the meter is stored in an NTBS register comprising words 9C-9F of the memory unit.

Status characters are stored at SC0 and SC1 of register 8. Status character SC0 contains the data currently being read at a specified input port, while status character SC1 is used to store an error code associated with the test of the printer setting detectors. The generation of these error codes and others are described in somewhat more detail in the discussion of the individual subroutines during which they are generated.

In the flow charts of the main program and the subroutines, references are often made either expressly or by implication to a postage meter program printout which appears in full as Appendium A in copending application Ser. No. 950,302 now U.S. Pat. No. 4,251,874 and the disclosure of this patent is incorporated in full herein.

The programming language of the printout is an assembly level language developed specifically for the MCS—40 components manufactured by Intel Corporation. While a comprehensive explanation of each of the instructions in this language may be found in the Intel 4004 and 4040 Assembly Language Programming Manual, copyright 1974, by Intel Corporation, 3065 Bowers Avenue, Santa Clara, Calif. 95051, all of the instructions used in the program are listed in Appendium B along with a brief explanation of each of the instructions.

Figure 20:
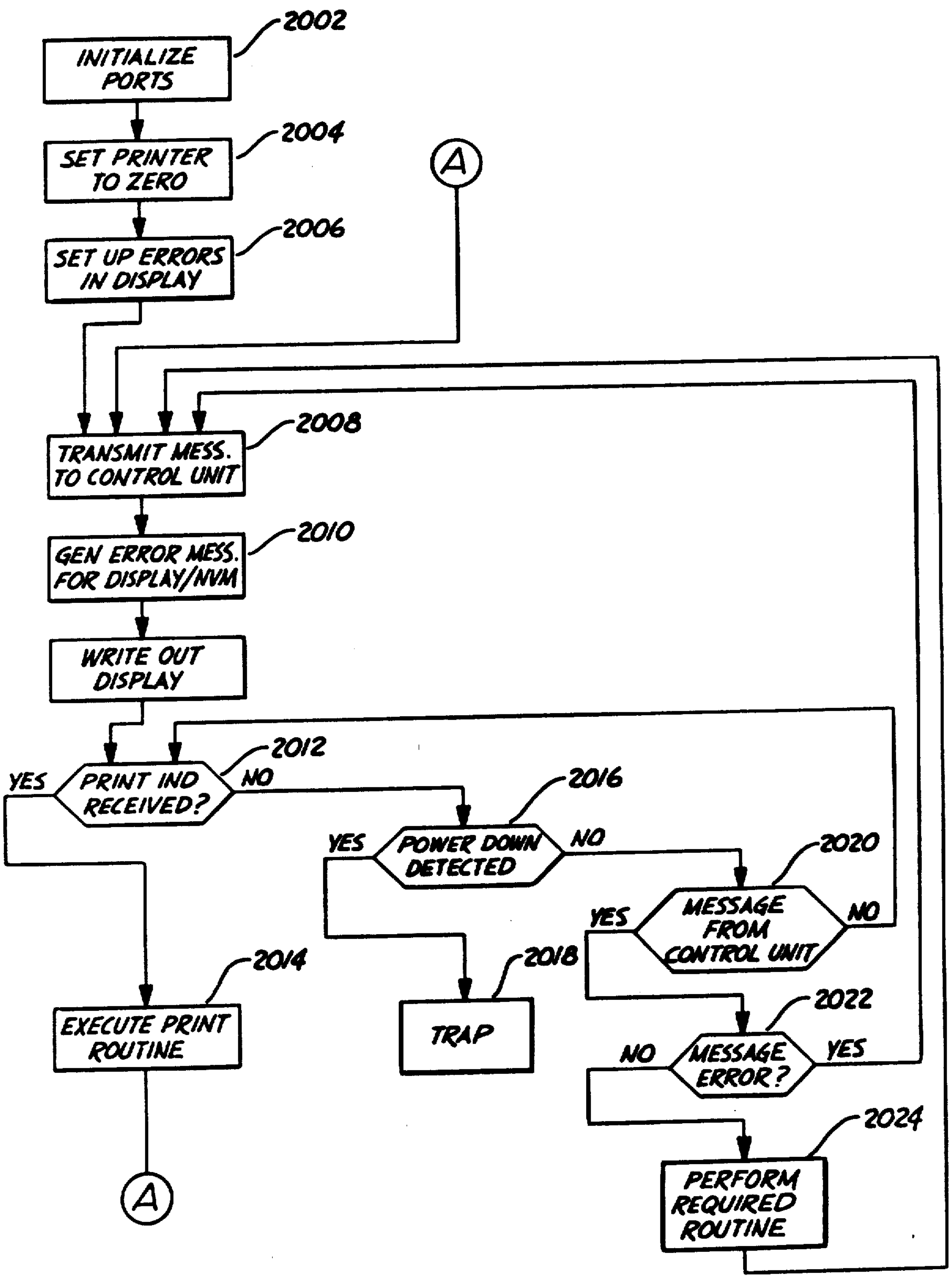
FIG. 20 is a simplified flow chart of the operation of the postal meter system.

In describing the flow charts, the following number convention shall be used. Those operations or decision blocks that are identified in a particular routine will be identified by a four-digit number. The first two digits identify the figure in which the particular block appears. The last two digits are unique to a particular block within that figure. For example, the first operation in FIG. 20 is identified as operation 2002. That figure is a greatly simplified flow chart of the overall operation of the meter. After the meter is powered up, the first step 2002 is to initialize output ports to the motors of the meter, the photocells in the printer setting detector array, the LED display and the event-indicating photocells. The printer is then set to zero (block 2004) and any error flags stored from the previous cycle of operation are written (block 2006) into the LED display. A ready-to-receive message or an error message is transmitted (block 2008) to the control unit for the meter. Error checks are made after the transmission routine and error messages are generated (block 2010). The error messages are written into the nonvolatile memory and out to the LED display. A check is then made as to whether a print command is being received from the control unit (block 2012). If it is, a print routine is executed (block 2014) after which control is returned to block 2008. If a print command is not being received, a check is made as to whether a power loss has been detected (block 2016). If a power loss has been detected, a jump is made to a trap routine (2018) from which control cannot be retrieved without completely shutting down and restarting the meter.

If no print command has been received, and if a power loss is not sensed, a check is then made (block 2020) as to whether a message is pending from the control unit. If no message is pending, control is returned to block 2012. If a message is pending, the input is decoded and a check is made (block 2022) for errors within the message. If errors have occurred, program execution continues at block 2008 which sends a responsive message to the control unit. Error messages are generated and written out to the LED display and into the nonvolatile memory. If the message was error free, the required routine is performed (block 2024) before the program control returns to block 2008.

As was mentioned earlier, the messages which are transmitted to and from the control unit 12 are organized into sixteen four-bit words for reasons of simplicity even though most messages do not require the full 16 words. Preferred formats for the various messages are set out in Appendium D. The first two words of any message, whether transmitted to or from the control unit, is a checksum obtained by adding the remaining words of the message. The third word of any message is an op code identifying the particular type of operation to be performed or which has been performed in response to the message. Words identified by a D are data words. Words identified by an E are error words while words identified by an S are specifier words. Words identified by R indicate the address of a register to be written into or read. A word identified by a B is a four-bit status word.

Figure 21:
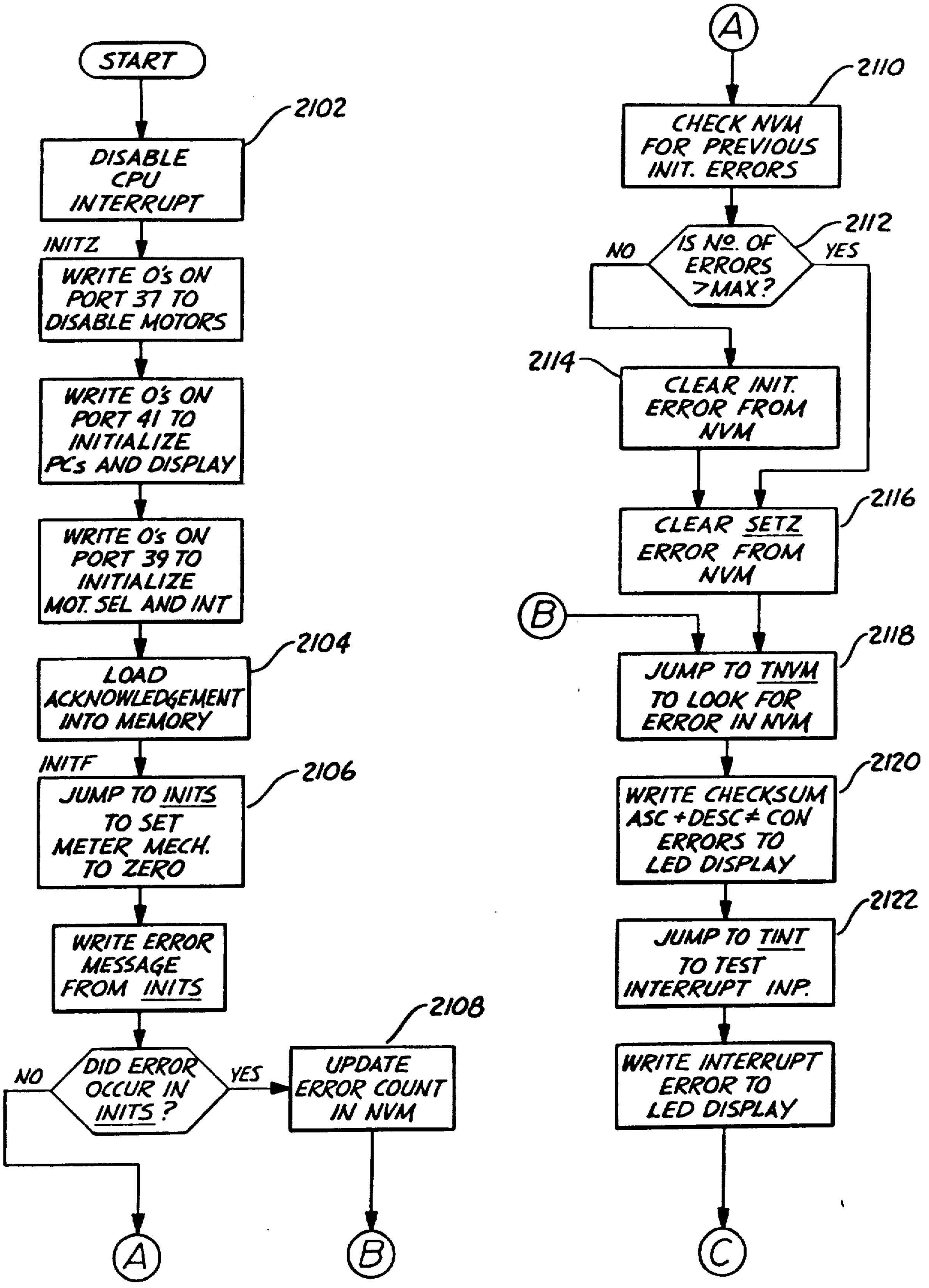
Figure 22:
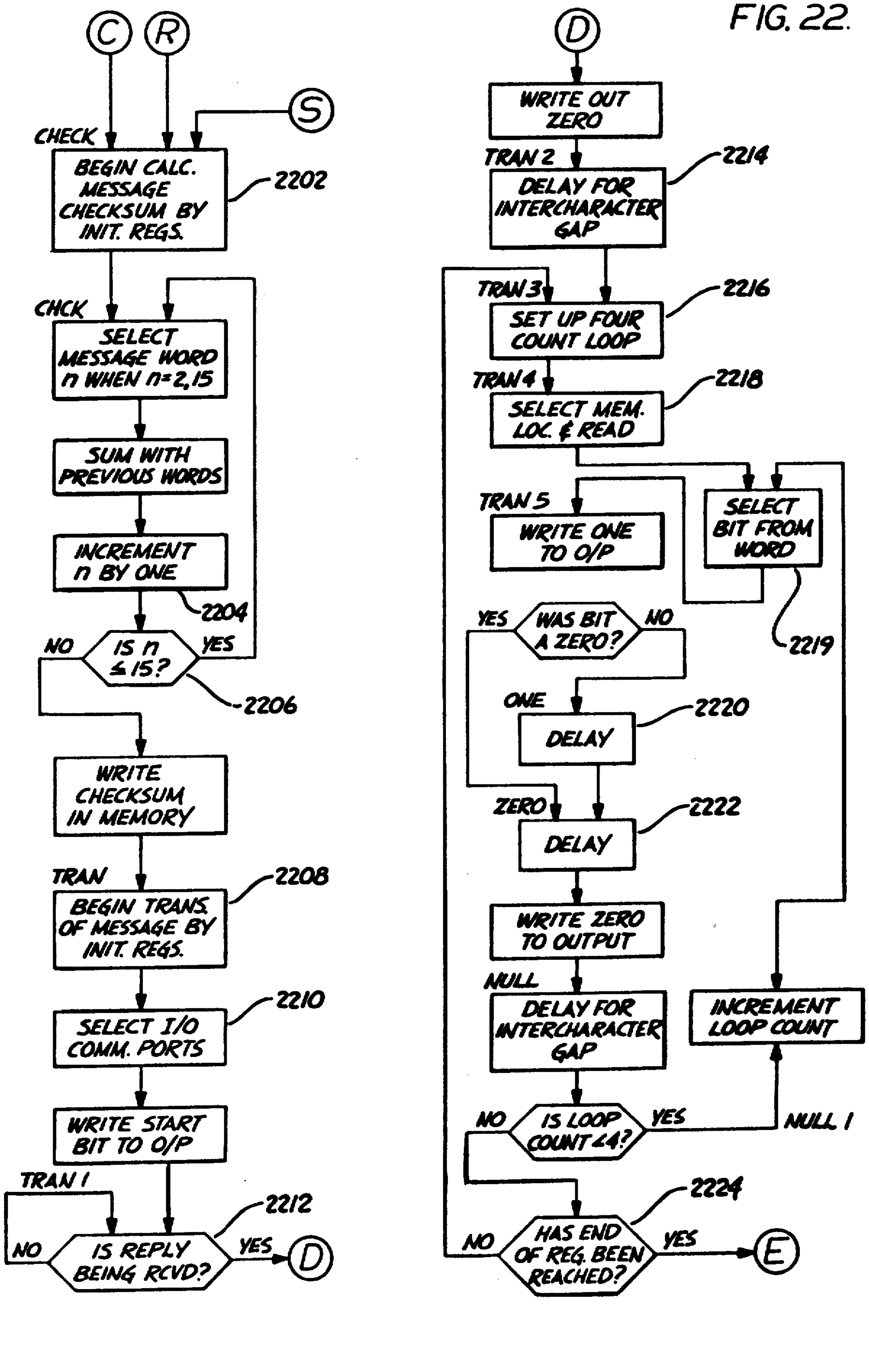
Figure 23:
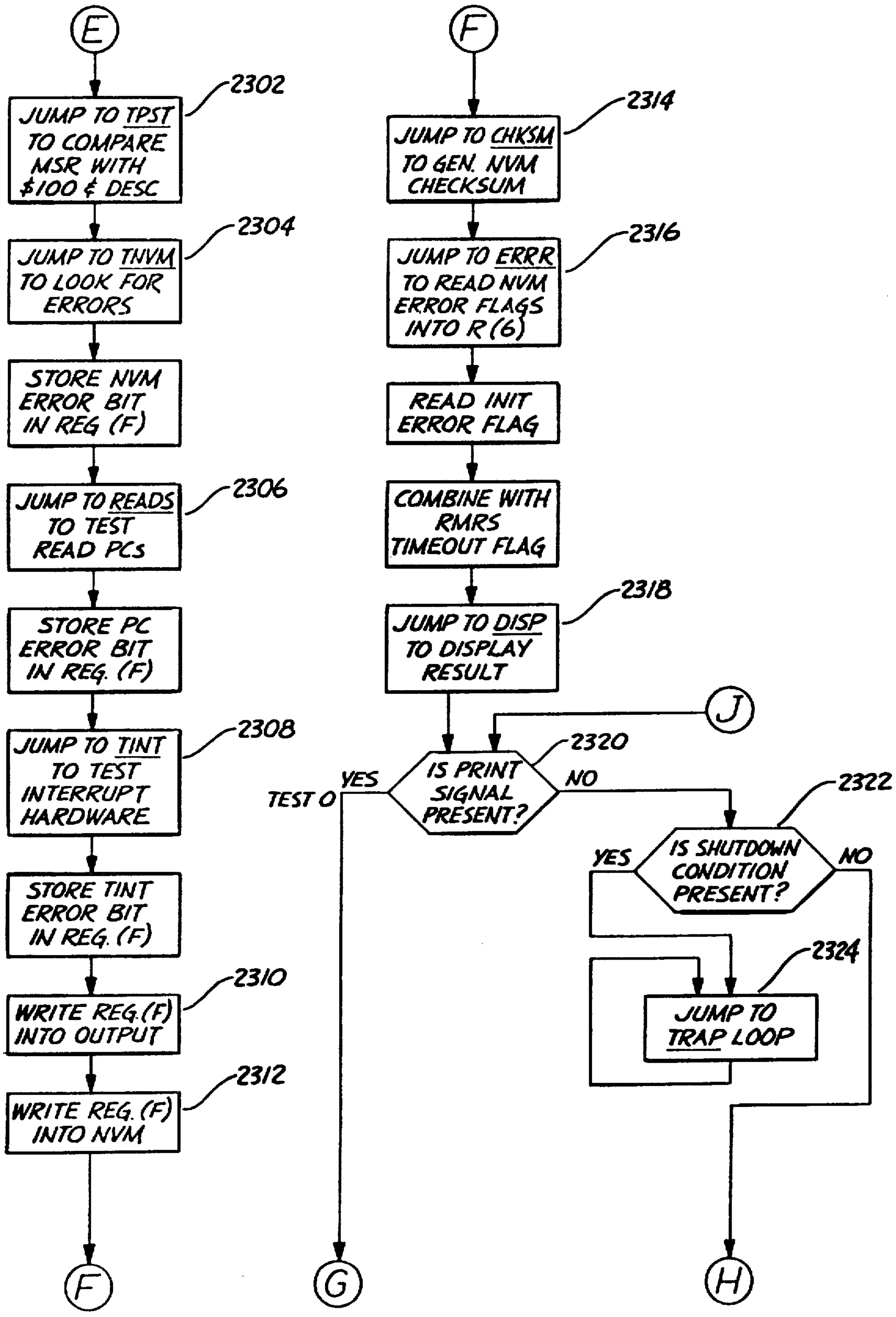
Figure 24:
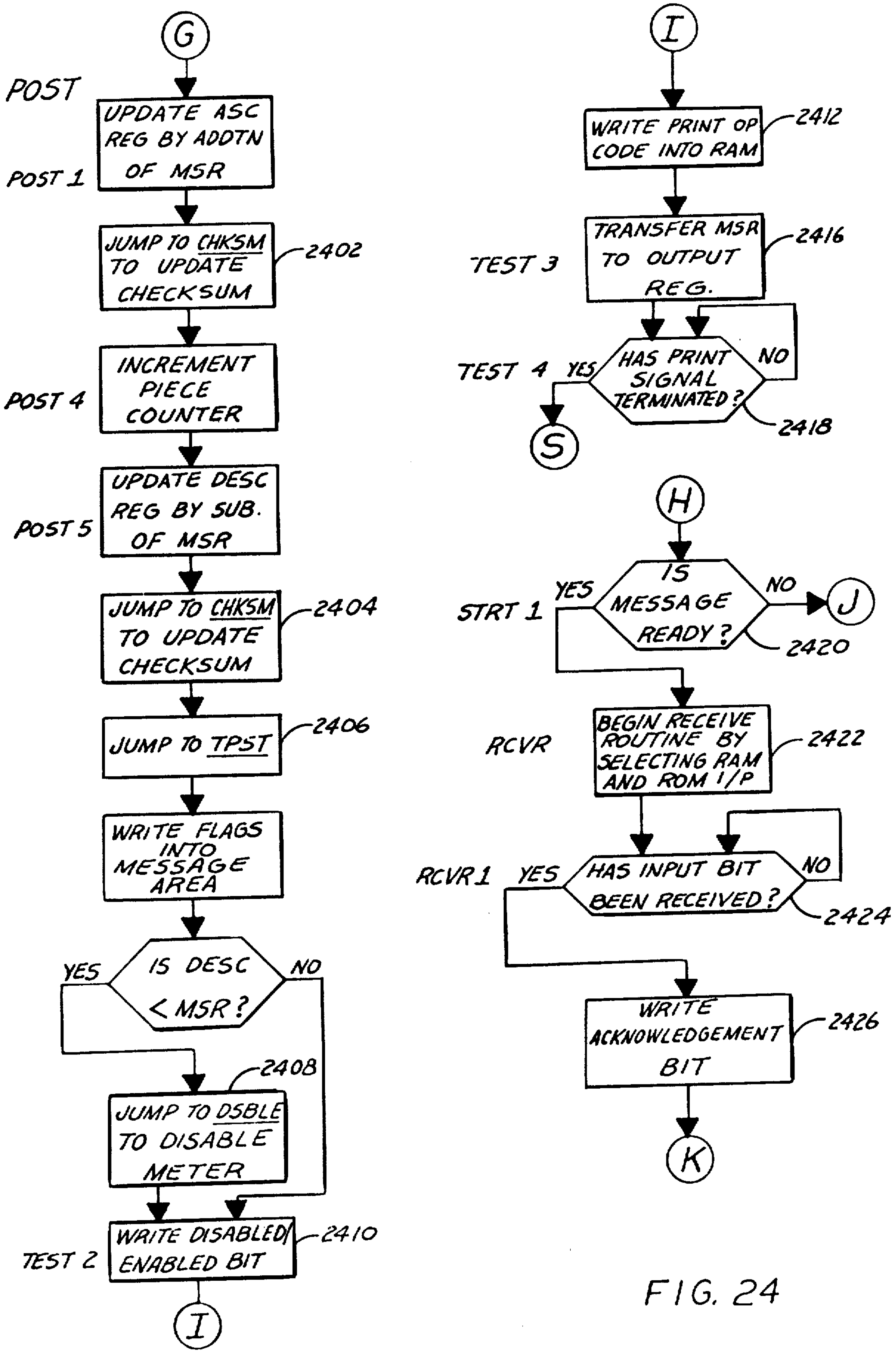
Figure 25:
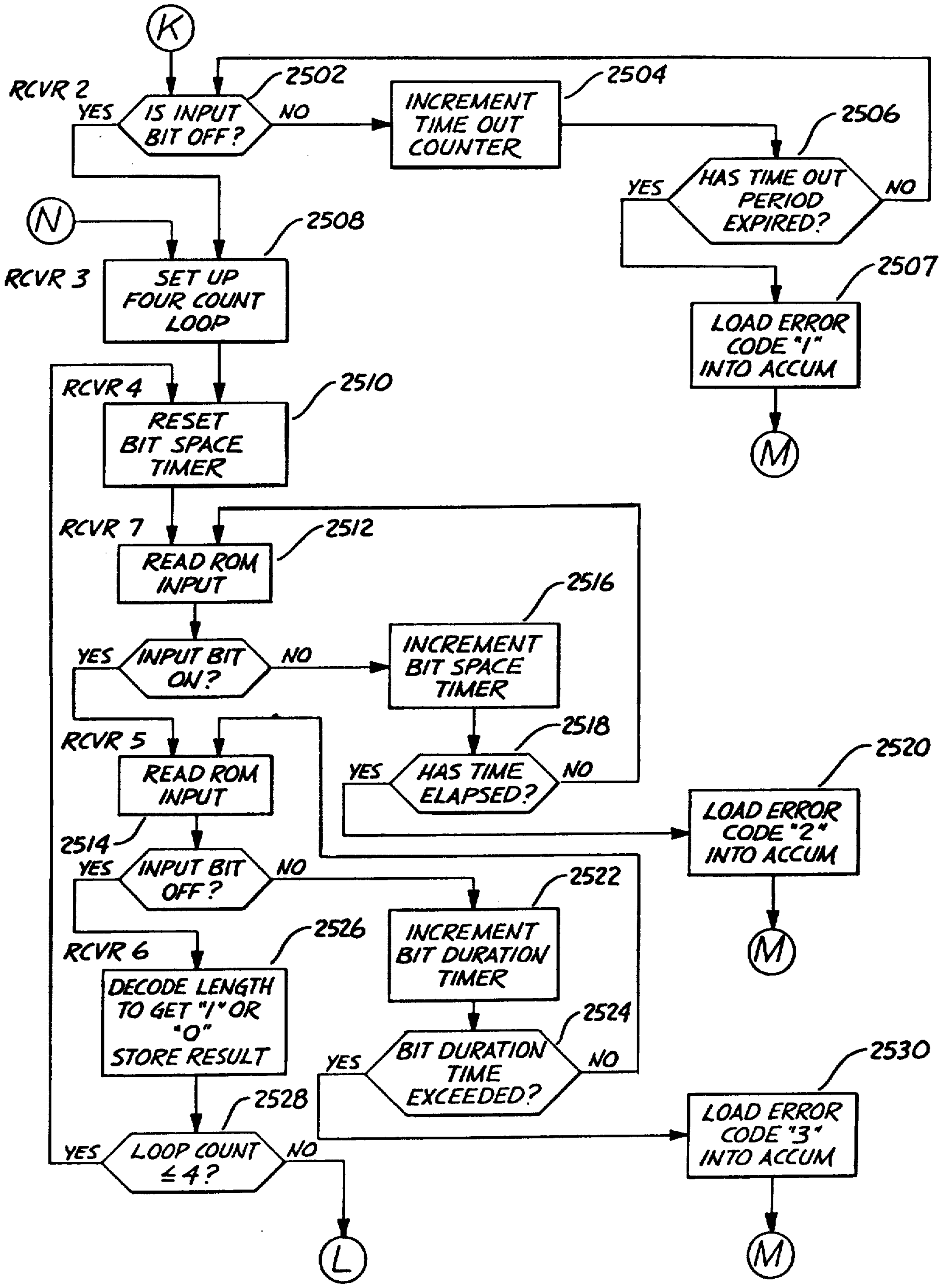

FIGS. 21-26, taken collectively, illustrate the main program for the postage meter. Interconnections between various blocks of the flow chart are shown either as direct arrow connections wherein the arrowhead indicates the direction of the program flow or as indirect connections linked through encircled alphabet characters. An example of an indirect connection is shown in FIG. 21 where an encircled A appears both at the bottom of the left-hand column of blocks and at the top of the right-hand column. The two points indicated by an encircled character are treated as being directly connected.

The particular CPU chip employed in one embodiment of this invention includes an interrupt input terminal which is disabled (block 2102) as the first step in the main program. Each of the output leads from the output ports 37 and 41 are loaded with 0's to disable the two stepping motors which drive the printer, to initialize the shift registers which control the photocells in the printer setting detector array and the LED display. A binary 4 is loaded into output port 39 to disable the motor select outputs while energizing the event-indicating photocells. The completion of these steps is followed by writing a predetermined code (block 2104) into random access memory. The code is later transmitted to the control unit.

Control of the meter then jumps (block 2106) to an INITS subroutine which sets the printer to 0. This subroutine and all other subroutines called by the main program are described in more detail with reference to later figures. After the INITS subroutine is performed, a check is made for any errors noted during execution of that subroutine. Error codes are written into nonvolatile memory (block 2108), after which a check is made (block 2110) for errors which occurred during previous initialization attempts. The initialization subroutine is described as an unconditional routine; that is, regardless of noted errors, it will continue to attempt to reset the meter to zero when called, until a check (block 2112) indicates that the number of unsuccessful initialization attempts has exceeded a predetermined number. If initialization is successfully completed before the predetermined number is reached, an initialization error flag is cleared (block 2114) from nonvolatile memory. Error flags which were generated during previous attempts to set the meter to a specified postage are cleared (block 2116) from non-volatile memory before control jumps to a TNVM subroutine (2118) which tests NVM memory, generates error flags and writes those flags into a specified index register in the central processor.

But if an error had occurred during execution of the INITS subroutine, these intermediate steps would have been skipped with control branching from block 2108 directly to block 2118. Checksum errors and control sum errors are retrieved from nonvolatile memory and written out to the LED display (block 2120) before TINT subroutine (block 2122) is called to test the interrupt input photocells. TINT error codes are written out to the LED display.

A checksum generation routine is performed as part of the main program. The first step in this routine is to initialize the registers (block 2202) to be used. One of the last fourteen words from a previously generated 14-word message (which excludes the checksum words of the message) is retrieved from memory and summed with previously retrieved words in the same message. After the addresses are incremented (block 2204), a check (block 2206) is made as to whether the last word in the message register has been read out of memory. If it has not, the cycle is repeated. If it has, the generated checksum is written into memory and the TRAN or transmission routine begins.

Registers to be used are initialized (block 2208), the input/output ports for the communication with the control unit 12 are selected (block 2210) and a start bit is written to the output port dedicated to communication with the control unit. After the start bit is written, a check (block 2212) is made whether an acknowledgement is received. The program continues to recycle through the checking step 2212 until an acknowledgement is received. Once a one is received, a 0 is written out to the control unit and a programmatical delay 2114 occurs to establish an intercharacter gap. A four-count loop is set up (block 2216) before a memory location is selected and read (block 2218). The first bit of the retrieved word is read in operation 2219. A binary one is written to the output port which communicates with the control unit and a decision is made as to whether the data bit retrieved from memory was a 0. If the bit was not a 0, (i.e., was a 1) control branches to a first delay routine 2220 which is followed in sequence by a second delay routine (block 2222). If however, the check shows that the bit retrieved from memory was a zero, delay routine 2222 is accessed directly. After delay routine 2222 is finished, a zero is written (block 2223) to the output.

Thus, where the bit being transmitted is a binary one, the output is maintained at a 1 level (light being generated by the LED) for a longer period of time than where the transmitted bit is a 0. After a delay for an intercharacter gap, a check is made as to whether the loop count is less than four; that is, whether all bits in the selected word have been read. If it is, the loop count is incremented to select the next bit of the word before control returns to block 2219. If the loop count equals four, a check is made (block 2224) as to whether the end of the message register has been reached. If not, control is returned to block 2216 at which a four-count loop is again set up to read the next word from the message register.

When the last word of the message register is transmitted, the main program continues at block 2302 which is a jump to a TPST subroutine which compares the contents of the meter setting register to the contents of the descending register and to the absolute amount of $100.00. After the TPST subroutine is executed, the TNVM subroutine is called (block 2304) to look for errors bits. Any error bit is stored in the specified register and a jump is made (block 2306) to a READS subroutine which tests the photocells monitoring the printer setting. Error codes generated as a result of the test are stored in the same register as the nonvolatile memory error codes and the jump is made (block 2308) to the TINT subroutine which tests the hardware associated with the interrupt circuitry. Any resulting error code is stored in the same register as error codes produced by the preceding steps. The contents of this register are written both into a specified random access memory (block 2310) and into nonvolatile memory (block 2312).

A CHKSM subroutine is then called (block 2314) to generate new checksums for the altered contents of the nonvolatile memory. An ERRR subroutine is called to retrieve the error flags from nonvolatile memory and to read them into a specified index register in the CPU. Initialization error flags and RMRS time out error flags are read and combined and written into a display area with a DISP subroutine which is called (block 2318) to display the results on LED display 13. A determination (block 2320) is made as to whether a print signal is present. As was mentioned earlier, this signal is generated only when the print drum of the printer has actually begun to move from its home position toward a postage imprinting position. If no print signal is sensed, a check 2322 is made as to whether a shut-down condition is present. A shut-down condition as defined in an underpower condition. If such a condition is sensed, a jump is made to a TRAP loop 2324 which cannot be exited until the meter is completely shut down and powered up again.

If a print signal is detected at block 2320, the main program enters a POST routine which updates the ascending and descending registers, the piece counter and the checksums for the nonvolatile memory registers. The contents of the ascending register are modified by adding the contents of the meter setting register and the CHKSM routine is called (block 2404) to update the checksums associated with those registers. The piece counter is incremented by one and the descending register is decremented by subtracting the contents of the meter setting register. The CHKSM subroutine is again called (block 2404) to update the checksums associated with those registers.

A jump is made to the TPST subroutine (block 2406) to compare the contents of the meter setting register both with $100.00 and with the contents of the descending register. Flags indicating whether the meter setting register exceeds either or both of these levels are written into the message area. If the contents of the descending register are less than the contents of the meter setting register, indicating there is insufficient postage to perform the print operation, a jump is made to a DSBLE routine (block 2408) to disable the meter. A disabled bit is then written (block 2410) into memory. If, however, the amount of postage in the descending register is sufficient, the step 2408 is bypassed and an enabled bit is written in the memory. The print op code is written into random access memory (block 2412) and the meter setting register contents are transferred to an output register (block 2416). An inquiry 2418 is made as to whether the print signal has terminated. Until the print signal does terminate, program control remains at this inquiry. When the print signal has terminated, control is returned to block 2202.

Where no print signal had been sensed at block 2320 and no shut-down condition was sensed at block 2322, program control is transferred directly from block 2322 to a block 2420 at which a check is made as to whether the control unit is ready to send a message. The first step in the message receiving routine (block 2422) is the selection of the input port which receives signals from the control unit 12 and of the random access memory registers into which data messages are written. The processor then waits (2424) until an input bit is received to write out an acknowledgment bit (2426). A check is made (2502) as to whether the input bit has terminated. If it has not, a timer is incremented (block 2504) and a check is made (block 2506) as to whether a predetermined period of time has expired. This timing loop is repeated until the input bit is terminated or until the predetermined time has elapsed. In the latter instance, an error code 1 is loaded in the accumulator to indicate that too much time was required to remove the acknowledgment bit. If the time out period has not expired, program control continues at a block 2508 in which a four-count loop is set up.

A bit spacer timer, which checks the interval between incoming bits, is reset in operation 2510 before the input port from the communications channel is read in block 2512. A check is then made as to whether the input bit is on. If it is, the input is again read in block 2514. If if is not, the bit spacing timer is incremented (block 2516) and a check is made (block 2518) as to whether the maximum allowed space between bits has been exceeded. If the time interval between bits is too great, an error code 2 is written (block 2520) into the accumulator. If the input bit is on at the time of operation 2514, a second decision is made as to whether the input bit has returned to zero. If the input bit has not returned to a zero level, a bit duration timer is incremented (block 2522) and a determination 2524 is made as to whether a maximum bit duration has been exceeded. If the maximum bit duration is exceeded, an error code "3" is loaded into the accumulator. If the maximum bit duration has not been exceeded, the input read cycle is repeated until it is determined that the input has returned to a zero level. Since the only difference between a binary 1 and a binary 0 in a message being received is the length of time during which the LED remains energized, it is necessary to decode the length or duration of LED energization (block 2526) to determine whether a 1 or a 0 is being received. The result is stored and a determination (block 2528) is made as to whether the loop count is less than or equal to four. If it is, program control is looped back to block 2510. If the loop count equals four, program control continues with the four-bit word being written (block 2602) into random access memory.

If the last word in the message has not yet been received (block 2604), program control returns to block 2508 to read the next four-bit word in the message. If the last word has been received, an error code 0 is loaded into the accumulator in block 2606. The contents of the accumulator, whether they are a zero from block 2606 or a nonzero error code from one of blocks 2507, 2520, or 2530, are loaded into a temporary register (block 2608) before the acknowledgment bit is ended. The contents of the temporary register are then reloaded into the accumulator (block 2610) and a determination is made as to whether the accumulator content equals zero (block 2612). A zero accumulator indicates that no errors have occurred during receipt of the message from the control unit. A nonzero accumulator indicates that an error has occurred. Under the latter conditions, a jump 2614 is made to ST5, to write an error op code. If, however, there were no errors, a checksum is generated for the received message and is compared with the message transmitted checksum. A determination is then made (block 2616) as to whether the two checksums are equal. Any inequality indicates that a discrepancy exists between the message as transmitted by the control unit and as received by the meter. An error message indicating a discrepancy is loaded (block 2618) into the accumulator and the error op code is written (block 2614).

If the two check sums are equal, the op code (which is the third word of the message) is read and a jump is made (block 2620) to the routine called by the message. Thereafter, program control returns to block 2202 for another complete cycle of the post-initialization portion of the main program.

The main program and the subroutines use a number of multi-count loops and fixed time delays for reading words, for writing words, for establishing delays for stepping motor operation, and for similar purposes. The programmatical technique for establishing the multi-count loops and fixed time delays is shown in FIG. 27.

A specified four-bit register is loaded with a known value less than the maximum capacity of the register. Where the technique is being used to establish a multi-count loop, the routine into which the loop is incorporated is performed once before the four-bit register is incremented. A check is then made as to whether the register contents are equal to 0 (maximum register capacity plus 1). If the register does not equal 0, the routine is again performed and the register is again incremented. This loop repeats itself until the check reveals that the register contents equal 0. At this point, the loop is exited and the next operation in the sequence performed.

The only difference between the use of this technique to establish multi-count loops and its use to establish a fixed time delay is that no routine is performed within the time delay loop; i.e., the "perform routine" block shown in dotted outlines is completely omitted where only a fixed time delay during program execution is desired.

In the instruction set used with the Intel 4040 central processor, a single ISZ instruction performs both the incrementing step and the zero equality check.

Figure 28:
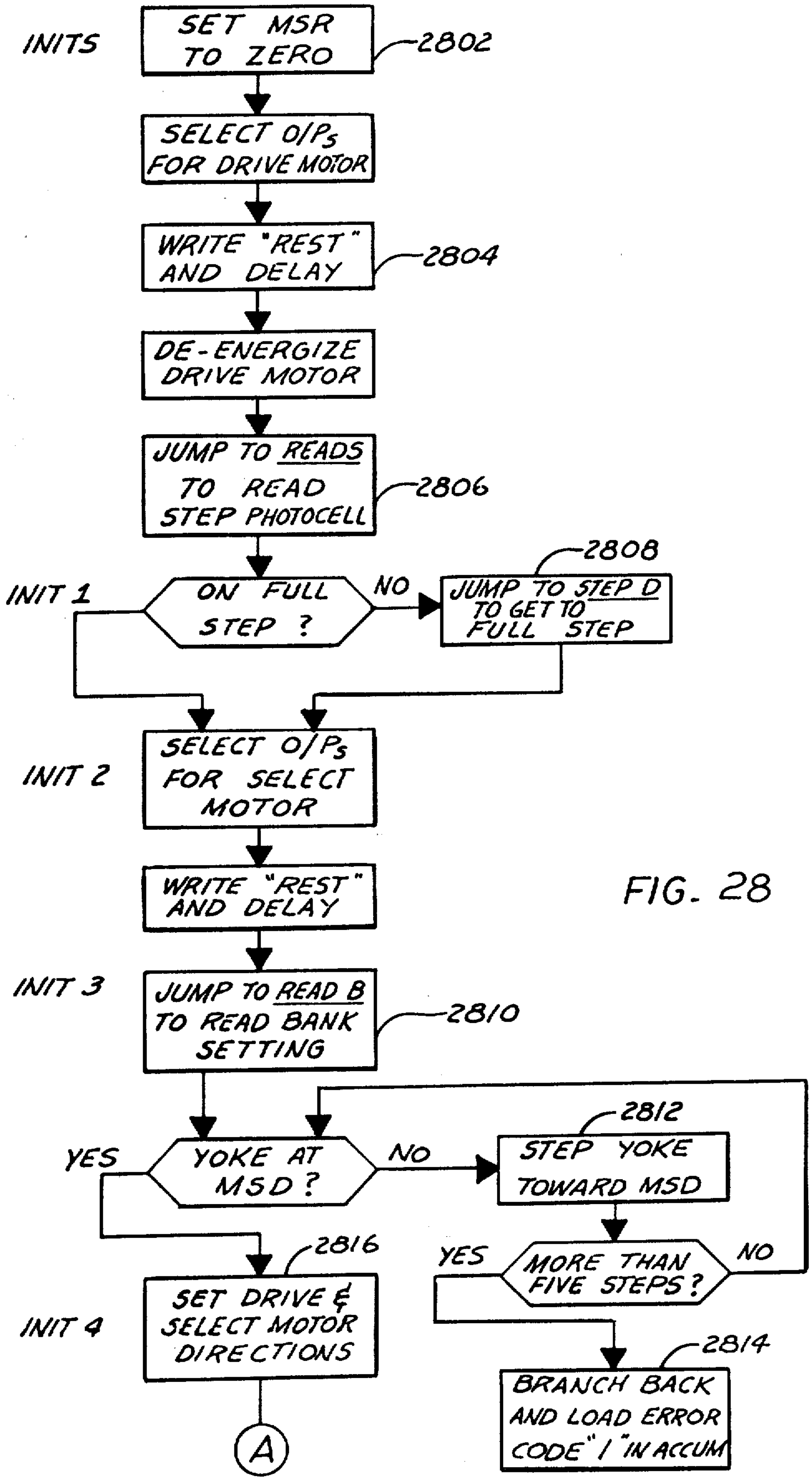
FIGS. 28-29, taken collectively, comprise a flow chart of an INITS subroutine which resets the postage printer to zero.
Figure 29:
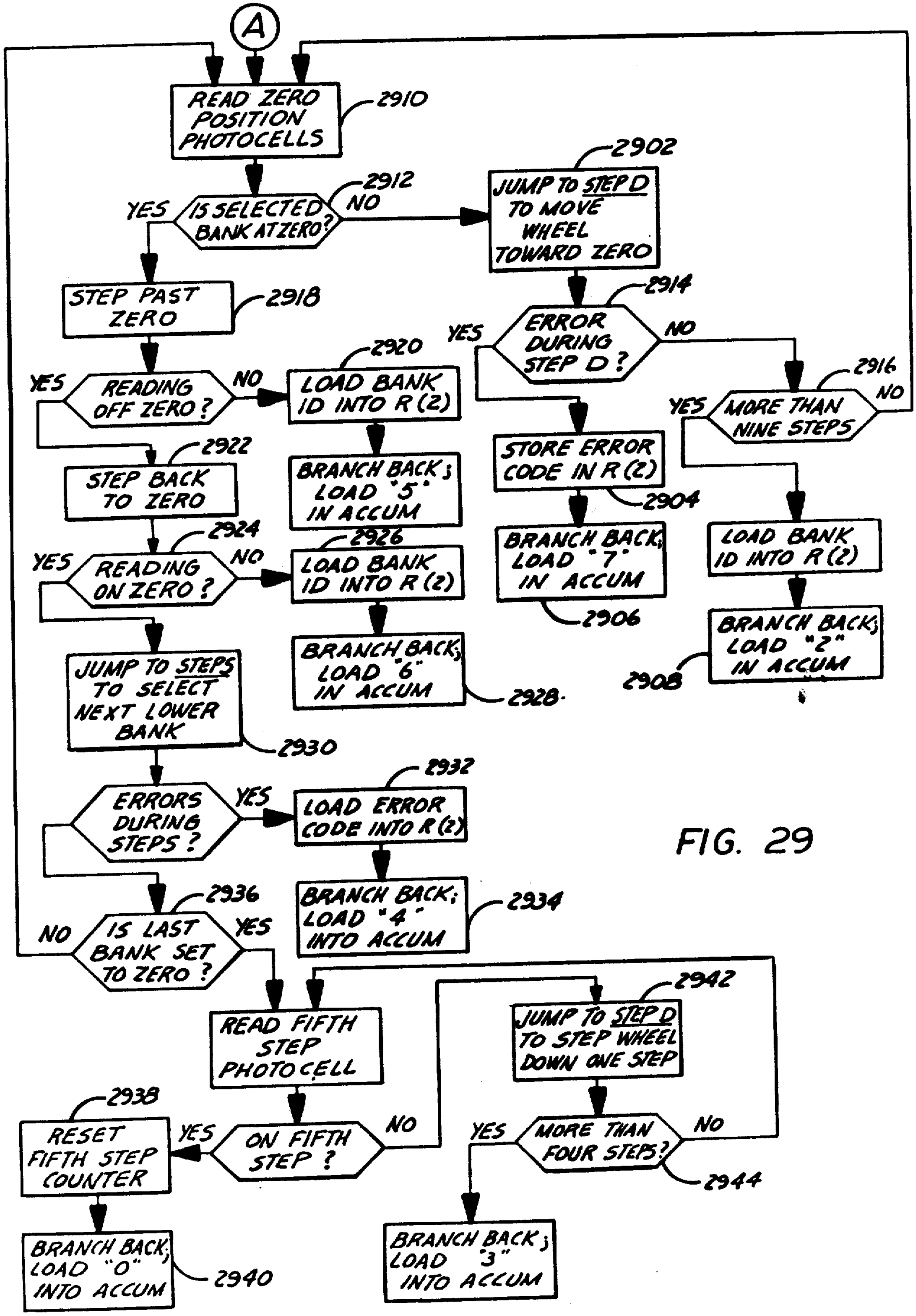

FIGS. 28 and 29, taken collectively, describe an initialization subroutine INITS which is used in setting the meter to zero as part of the initialization subroutine. The meter setting register or MSR in memory 42 is set to zero (block 2802). The output ports for controlling the digit select motor are selected. The rest position is written out (block 2804) and the delay loop is entered to give the motor time to reach that position. The digit select motor is then deenergized and a jump is made to READS subroutine (block 2806) to read the current setting of the photocell which senses whether monitoring wheel 166 is on a half or a full step. If the monitoring wheel is on the half step, a jump is made to the STEPD subroutine (block 2808) to drive the wheel to a full step. If the monitoring wheel is already on a full step, the output ports for the bank select motor are selected, the rest position for that motor is written out and a fixed delay occurs to permit motor to reach that setting.

A jump has been made to the READB subroutine (block 2810) to determine whether the printer yoke is at the most significant digit. If it is not, the yoke is stepped towards the most significant digit (block 2812) position with a check being made after each step as to whether or not more than five steps have occurred. If less than five steps have occurred and the yoke has not yet arrived at the most significant digit position, this loop is reiterated. If more than five steps have occurred, an error condition exists since a maximum of five steps should have been required to move the yoke from one extreme to the other. Under these conditions, control is returned to the main program (block 2814) and an error code 1 is loaded into the accumulator. If the yoke reaches the most significant position without exceeding the maximum number of permissible steps, the digit select and bank select motor directions are set (block 2816), after which the zero digit position photocell for the selected bank is read. The first bank to be read is, of course, the most significant digit bank. If the selected bank is not at zero, a jump is made (block 2902) to the STEPD subroutine to drive the print wheel towards zero. If an error occurs during the execution of the STEPD subroutine, an error code is stored (block 2904) in a predetermined index register, control is returned to the main program and an error code 7 (block 2906) is loaded into the accumulator. If no error occurs during the execution of the STEPD subroutine but more than nine steps are required to zero the selected print wheel, the identification of the bank being reset to zero is loaded into the index register before control is returned (block 2908) to the main program with an error code 2 being loaded into the accumulator.

In the absence of errors, the loop including blocks 2910, 2912, 2902, 2914 and 2916 is repeated as the wheel is stepped digit by digit toward the zero position. Once the reading of the photocell indicates that the selected bank is at zero, the print wheel is stepped from zero (block 2918) and a reading made to determine whether the photocell output reflects this. If the photocell output does not change when the print wheel is stepped past zero, there is clearly a malfunction in the system. The identification of the bank being set is loaded into the selected index register (block 2920) before control is returned to the main program. Under these conditions, an error code 5 is loaded into the accumulator.

If the photocell output does change when the print wheel is stepped from zero, the print wheel is stepped back to zero (block 2922) and a second check is made (block 2924) as to whether the photocell again shows the wheel at its zero position. If the photocell does not correctly show the wheel at the zero position, the bank identification is loaded into the specified index register (block 2926). Control is returned to the main program (block 2928) and an error code 6 is loaded into the accumulator.

If the photocells are operating properly during this step-past, step-back error check, a jump (block 2930) is made to the STEPS subroutine to select the next lower bank. Any errors occurring during execution of the STEPS subroutine are identified and the proper error code is loaded into the specified index register (block 2932). Control is returned to the main program (block 2934) with an error code 4 being loaded into the accumulator. If no errors occurred during the execution of the STEPS subroutine, a check (block 2936) is made as to whether the last bank has been set to zero. If it has not, program operation continues at block 2910 which repeats the same bank setting steps and error checking steps for each of the banks.

When the last bank has been set to zero, the fifth step photocell adjacent the monitoring wheel 166 is read and a check is made as to whether there is a match between the contents of the fifth step counter and the location of the extra long slot on the monitoring wheel. If a match is detected, the fifth step counter is reset (block 2938), after which control branches back to the main program (block 2940). If the check does not indicate a match between the position of the monitoring wheel and the contents of the fifth step counter, a jump (block 2942) is made to a STEPD subroutine to step the monitoring wheel down one step. A check (block 2944) is made as to whether or not four such steps have occurred. If they have not, control is returned to the block in which the fifth step photocell is read.

In summary, the INITS subroutine resets the print wheel associated with each bank from its last setting to a zero setting while simultaneously checking to make sure the photocell associated with that bank is providing proper zero position reading. The INITS subroutine also zeros the fifth step counter when the extra long slot on the monitoring wheel is lined up with the photocell which detects the slot.

Figure 30:
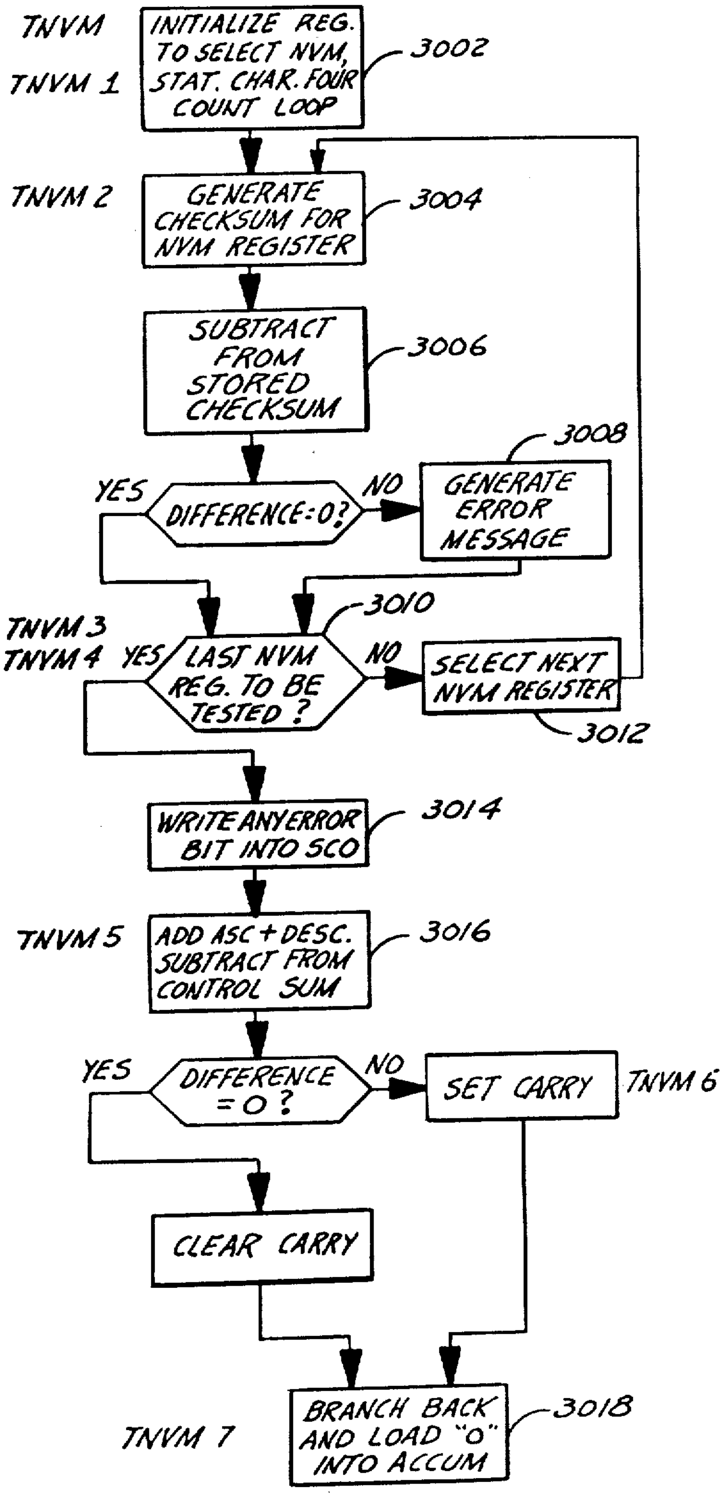
FIG. 30 is a flow chart of a TNVM subroutine which checks for the presence of error indicators stored in the nonvolatile memory.

FIG. 30 is a flow chart of a TNVM subroutine which checks for correspondence between checksums and data stored in the nonvolatile memory. The subroutine also checks whether the sum of the contents of the ascending and descending registers equals the control sum.

The first step (block 3002) of the subroutine is to initialize registers to select the first register in the non-volatile memory, to select a status character location into which an error code can be written and to set up a four-count loop. Data stored in the selected register of the non-volatile memory, excluding stored checksum words, is summed to generate a checksum for the register contents in an operation 3004. The checksum already stored in the register is retrieved and the generated clock sum is subtracted therefrom (block 3006). If the difference between the stored checksum and the generated checksum are not equal to zero, indicating that errors have occured either in writing data into or reading data from the nonvolatile memory, an error message is generated (block 3008) for that particular register. If the stored checksum does equal the generated checksum, a determination (block 3010) is made as to whether the last nonvolatile memory register has been tested. If the last register has yet to be tested, the next register is selected (block 3012) and control is looped back to block 3004, to repeat the checksum generation and comparison process. When the last nonvolatile register has been tested, any resulting error bits are written (block 3014) into status character 0 (OSCO) of register two in random access memory 38.

Referring again briefly to FIG. 19, a status character is a four-bit memory location. A 1 in any bit of that word indicates a checksum error in the particular register associated with that bit.

The TNVM subroutine retrieves and adds the contents of the ascending register and descending register (block 3016), after which the sum is subtracted from the retrieved control sum. If a difference other than zero is noted, as it should be during proper operation, the accumulator carry bit is cleared. The last step in the subroutine (block 3018) is a branch back to the main program.

Figure 31:
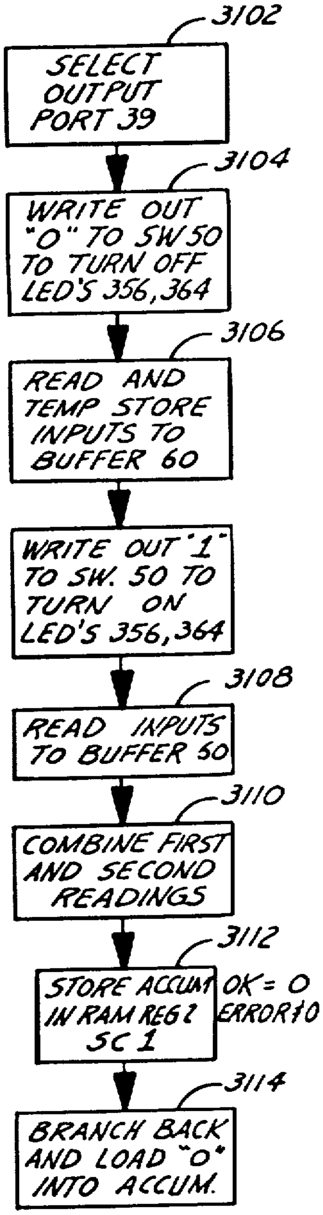
FIG. 31 is a flow chart of a TINT subroutine used to test the operation of interrupt photocells.

FIG. 31 is a flow chart of a TINT subroutine called to test the photocells in the event-indicating signal generator circuit 32. One photocell indicates whether the meter has been removed from its base. The other photocell indicates whether a print operation has begun. The first step in the subroutine (block 3102) is to select the ouput port which controls the test switch 50 in the signal generator circuit. A zero is written (block 3104) at this output port to turn off the light emitting diodes 356, 364. The inputs from the meter locked detector 54 and print detector 56, which include the referenced LEDs, are read to input buffer 60 (block 3106) and temporarily stored. A binary 1 is then written at the selected output port to switch 50 to turn on the LEDs. The detector inputs are again read (block 3108) and the two readings combined (block 3110). If the circuits are operating properly, the accumulator should equal zero. If an error has occurred, the accumulator contents will not be equal to zero. The accumulator are stored in status character 1 of register two of random access 38 (block 3112). Control is returned to the main program (block 3114).

Figure 32:
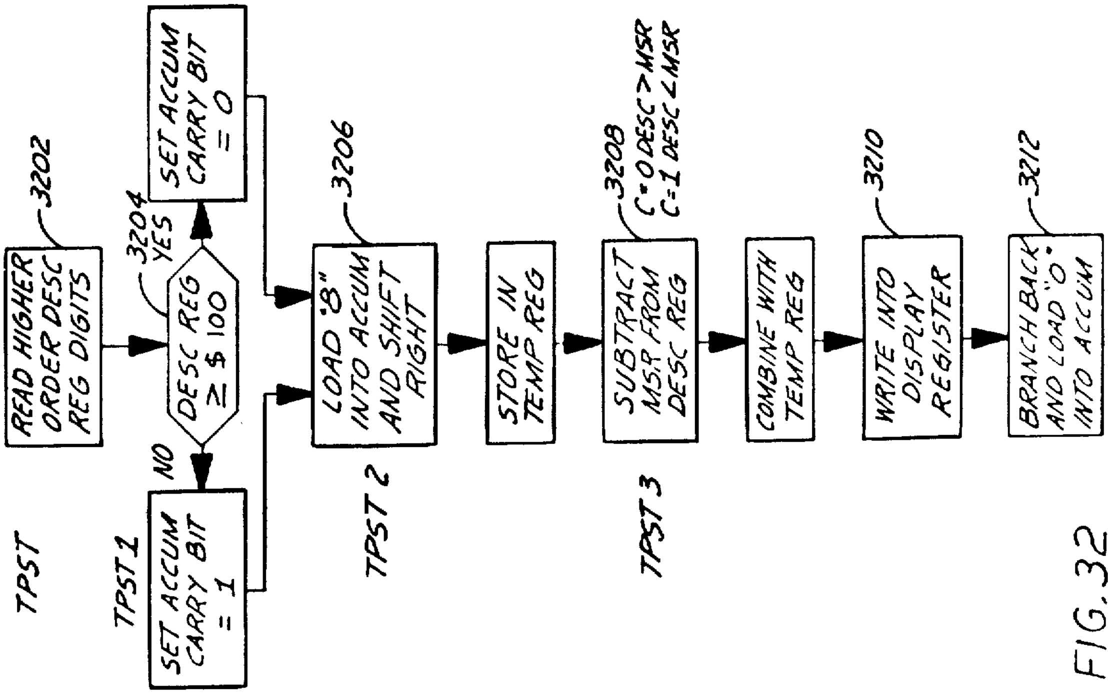
FIG. 32 is a flow chart of a TPST subroutine which compares the contents of a meter setting register with the contents of the descending register.

FIG. 32 is a flow chart of a TPST subroutine called to compare the contents of the descending register to the contents of the meter setting register and to an absolute amount of $100.00. The higher order digits of the descending register are read (block 3202) and a determination is made (block 3204) as to whether the contents of the descending register are greater than or equal to $100.00. Whenever the contents of the descending register fall below this arbitrarily selected $100.00 limit, an LED display lamp reminds the user that the postal meter will need to be recharged soon. The accumulator carry bit is set to 1 if the amount stored in the descending register is less than $100.00 but is reset to zero where the contents of the descending register exceed or are equal to $100.00. A hexadecimal representation (1000) of the number eight is loaded (block 3206) into the accumulator and shifted right. The accumulator contents are then stored in the temporary register.

The contents of the meter setting register are retrieved and subtracted (block 3208) from the contents of the descending register. If the descending register contents are greater than the meter setting register contents, the accmumulator carry bit is reset to 0. Otherwise it is set to 1. The accumulator contents are then combined with the contents of the temporary register and the result is written (block 3210) into a display register. A zero is written into the accumulator (block 3212) upon return to the main program.

The end result of the TPST subroutine is a four bit word which is stored in random access memory location 1F which is the last register for the LED display bit. The leftmost bit of this word is a one if the contents of the descending register are less than the contents of the meter setting register. The next less significant bit is a one if the contents of the descending register are less than $100.00. The next bit is an unconditional "on" bit which gives the user an indication that the meter is on. The least significant bit of the four-bit word should always be a zero.

Figure 33:
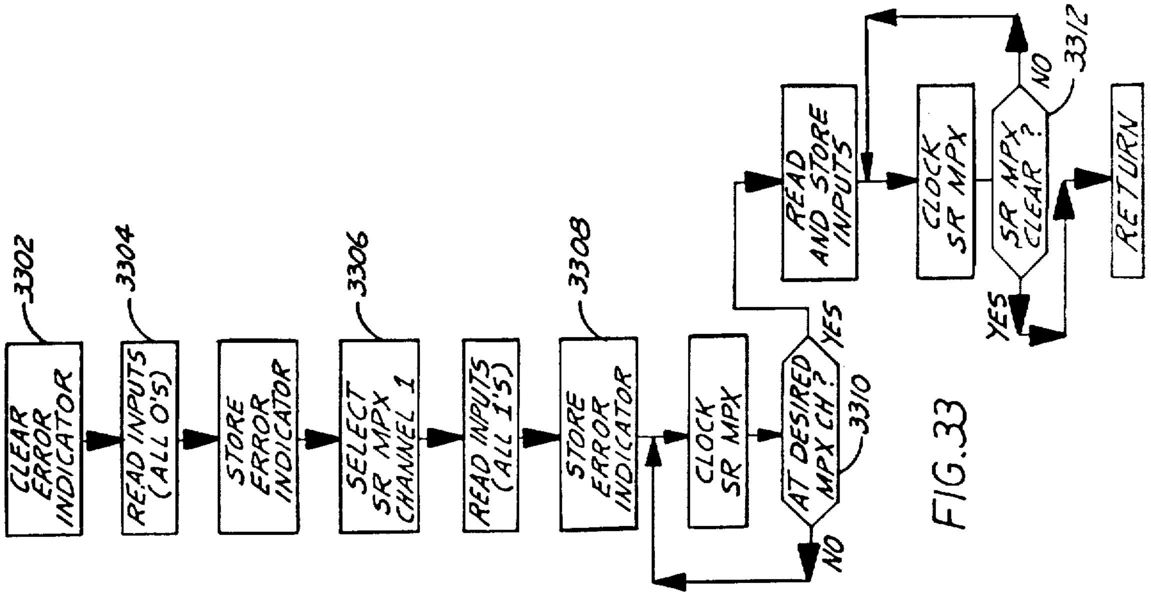
FIG. 33 is a flow chart of a READS subroutine for reading printer setting detectors and for checking for detector failure.

Referring to FIG. 33, the illustrated READS subroutine is used in controlling the printer setting detector array 30.

The subroutine includes preliminary steps (not shown) for selecting which of the three detector-containing columns of the printer setting detector array are to be selected. After the preliminary steps have been carried out, the error indicator for the array output is cleared (block 3302) and all inputs from the array are read (block 3304) before any data is shifted into the shift register 28. At this point, the detector array should produce all zeros. If it does not, an error condition is indicated and stored. Then, under the control of the electronic control unit, a binary 1 is shifted (block 3306) to the first stage of the shift register multiplexer. The signals on the outputs of the comparator amplifiers are again read. At this point, the amplifiers should have binary 1 outputs for the reasons stated in the description of FIG 11. If not, all of the signals are binary 1's, an error indication is stored (block 3308) and the shift register 28 is clocked by the single clock pulse. A check is then made at decision block 3310 as to whether the binary 1 is at the preselected stage of the shift register. The clock pulses are repeatedly applied to the shift register until the binary 1 is shifted into the desired stage.

When the binary 1 has been shifted into the desired multiplexer stage, the inputs from the associated detectors are read and stored. After the read operation is complete, the shift register 28 is again clocked and a check made at decision block 3312 to see whether the binary 1 has cleared the last stage of the shift register. The shifting operation is repeated until the shift register is clear, after which the control is returned to the main meter program.

Figure 34:
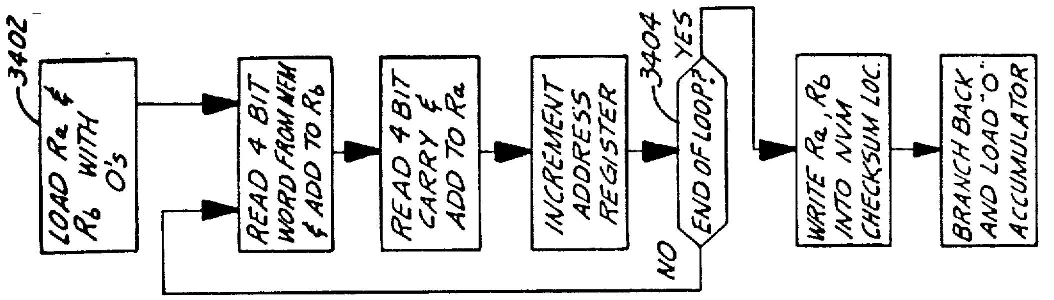
FIG. 34 is a flow chart of a CHKSM subroutine which generates error-detecting checksums for stored information.

FIG. 34 is a full chart of a CHKSM subroutine which is called to generate new checksums for selected registers in the nonvolatile memory when the contents of those registers have been changed. The starting address of the NVM register to be accessed is set in the calling routine. Once that register has been selected, a pair of temporary registers are initialized (block 3402) by loading them with zeros. A four-bit word from the selected nonvolatile memory register is then read and added to the contents of one of these registers, arbitrarily designated as register $R_b$. Carry bits are accumulated in an adjacent register $R_a$. During the first cycle of the CHKSM subroutine, there is of course no carry bit. The address register which indicates the nonvolatile memory word being read is incremented and a determination (block 3404) is made as to whether the last word in the register has been read. The decision 3404 is made using a count loop of the type previously discussed. The count loop is not expressly illustrated in the CHKSM flow chart.

If the end of the selected NVM register has not been reached, the cycle is repeated with a new four-bit word being read from memory and added to the previously accumulated words in register $R_b$. The carry (if any) which results from this step is added to the contents of register $R_a$. When the end of the loop is reached, the contents of registers $R_a$ and $R_b$ are written into checksum locations for the selected NVM register. The high order or carry is written into word 0 of the register while the low order is written into word 1. Control is returned to the main program.

Figure 35:
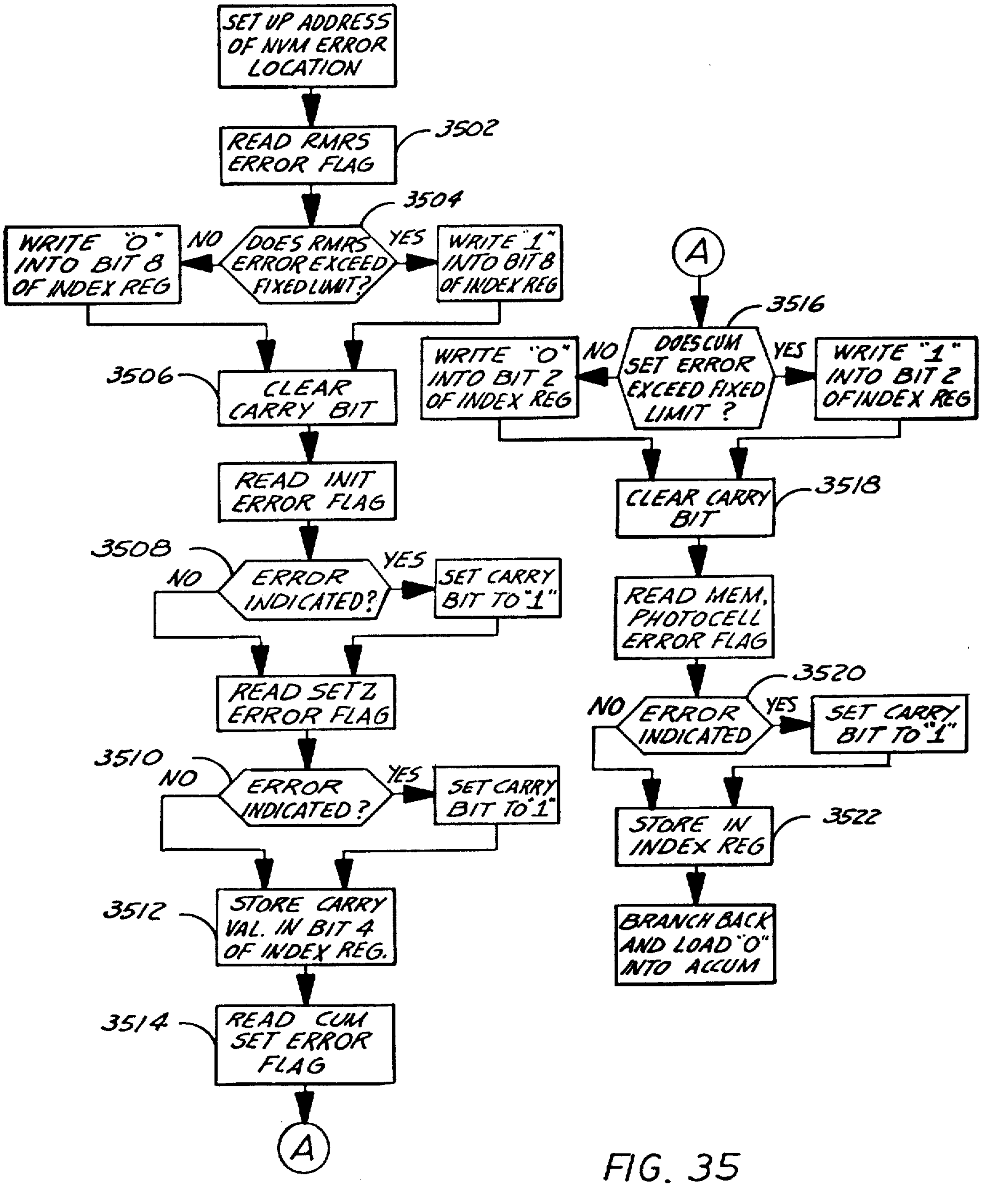
FIG. 35 is a flow chart of an ERRR subroutine which retrieves error indications stored in nonvolatile memory for use in deciding whether certain subroutines should be called.

FIG. 35 is a flow chart of an ERRR subroutine called to read error registers in the nonvolatile memory and to set up error indications in an index register of the central processor in a form which permits determination as to whether certain operations or subroutines should be performed or aborted. Error indications are stored in Register 2, words 2-6 of the nonvolatile memory. The first step in the ERRR is to set up the address of the first of these error registers; i.e., the error register containing error codes for the RMRS subroutines. Any error code stored at this location is read (block 3502) and a check is made (block 3504) as to whether the RMRS error exceeds a fixed limit. As was mentioned earlier, the user is given a certain number of opportunities to carry out required steps at the beginning of the RMRS subroutine. If he does enter the correct combination within a certain number of attemps, a zero is written to the most significant bit or bit 8 of a specified index register. If the user fails to enter the correct combination within the allowed number of attempts, a 1 is written into the same location. The central processor is instructed (block 3506) to clear the accumulator carry bit as a precaution, since the bit might have been sent during the performance of earlier subroutines.

The nonvolatile memory location containing the error flags associated with the initialization process is read and a determination (block 3508) is made as to whether any initialization errors are indicated. If such errors are indicated, the accumulator carry bit is set to 1. If no errors are indicated, the carry bit remains at the zero level. The nonvolatile memory register containing error flags associated with the meter setting subroutine is read and another determination (block 3510) is made as to whether setting errors have been recorded. If so, the carry bit of the accumulator is set to 1. The value of the carry bit is stored (block 3512) in the second most significant bit of the specified index register.

A binary 1 loaded into this location in the specified index register will indicate that an initialization error and/or a setting error has occurred but will not specify exactly which kind of error has occurred. A binary 0 loaded into this location in the specified index register indicates that no errors have been recorded during the execution of either the initialization or meter setting subroutines.

The nonvolatile memory register which stores error codes related to the cumulative number of sequentially occurring setting errors is read (block 3514) and a determination is made (block 3516) as to whether the cumulative number exceeds a predetermined limit. If it has, a binary 1 is written into the second least significant bit of the specified index register. Otherwise, a binary 0 is written into that location in the register. The accumulator carry bit is cleared (block 3518), assuming it was set during the reading of the initialization error flags and setting error flags. The nonvolatile memory register which stores error flags relating to memory or photocell errors is read and a determination made (block 3520) as to whether any errors are indicated. If errors are indicated, the accumulator carry bit is set to one. The carry bit value, whether a 1 or a 0, is stored (block 3522) in the least significant bit position of the index register. Meter control branches back to the main program at this point.

The error-indicating bits which are loaded into the specified index register remain there after the ERRR subroutine is exited. The contents of this register are accessed during the execution of other subroutines.

Figure 36:
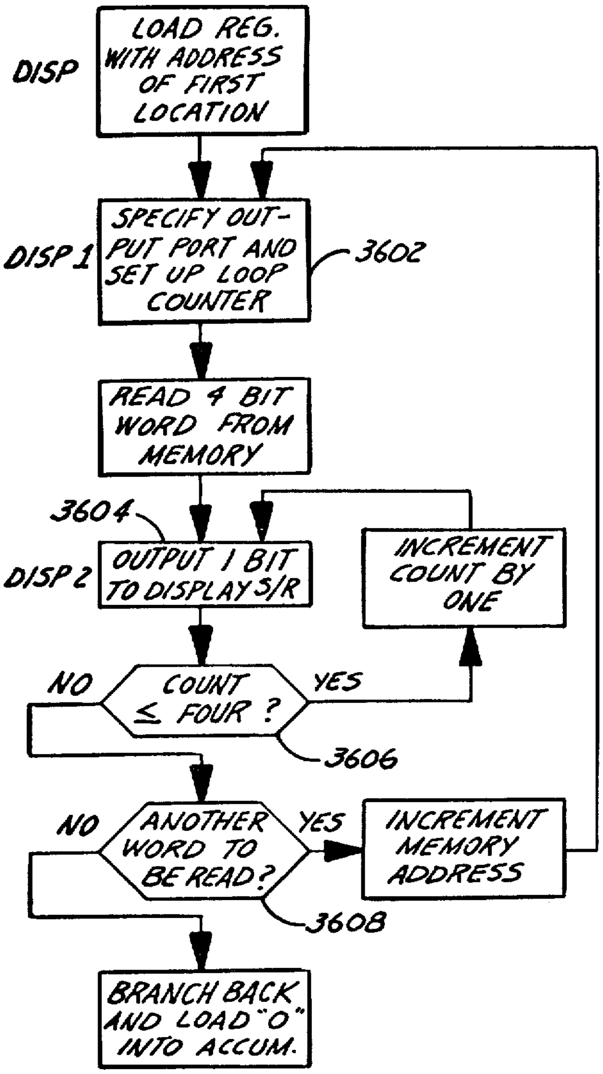
FIG. 36 is a flow chart of a DISP subroutine which outputs condition-indicating data from memory to the LED display.

FIG. 36 is a flow chart of a DISP subroutine used to retrieve LED display indicator bits from random access memory 38 and to write those indicators to the outputs of the shift register multiplexer 11, which drives the LED display 13. A specified index register is loaded with the address of the first word (word 1D) of the display area in random access memory 38. The output port connected to the shift register multiplexer 11 is specified (block 3602) and a four-count loop counter is set up.

The first four-bit word is read from memory into the accumulator. One bit of this word is written out (block 3604) to shift register multiplexer 11, after which a check (block 3606) is made as to whether the count in the loop counter is less than or equal to four. If it is, the count is incremented by one and another bit from the same word is written out to the shift register multiplexer. When the loop-count exceeds four, the program branches to block 3608 which determines whether another word in the display area registers and random access memory remains to be read. If another word is to be read, the memory address is incremented before program control returns to block 3602 to repeat the read/write cycle for the newly addressed word. When all three words in the display area of the random access memory have been read out, control is returned to the main program.

Figure 37:
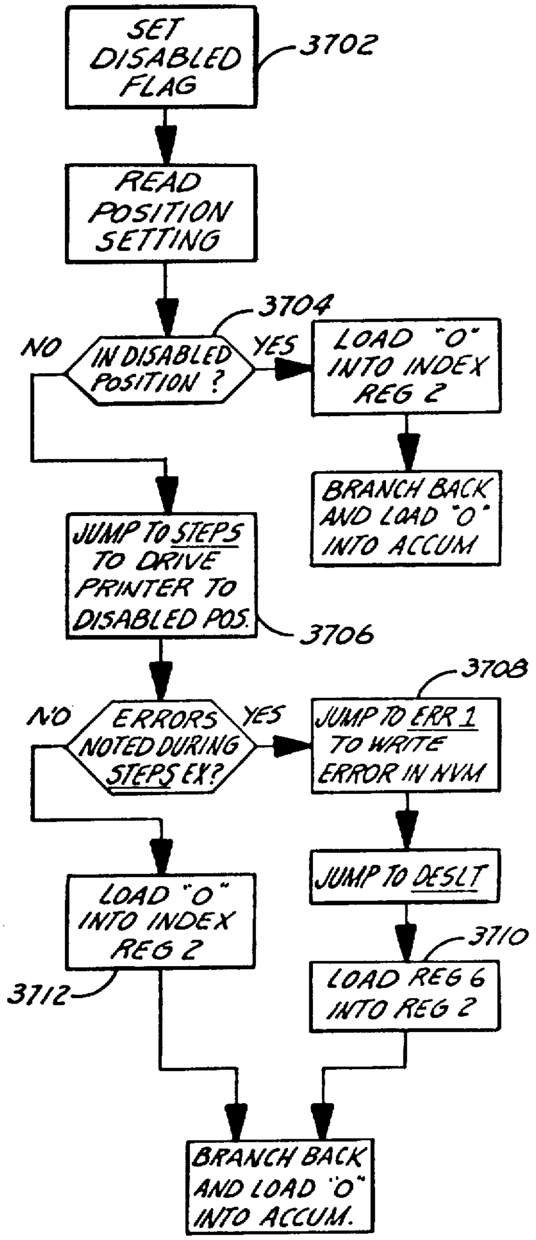
FIG. 37 is a flow chart of a DSBLE subroutine which is used to drive the printer to a disabled position.

FIG. 37 is a flow chart of a DSBLE subroutine which is used to disable the printer; i.e., to drive the yoke to a position in which all of the print wheels are mechanically locked up by the troughs on the yoke surface. When control of the meter jumps to the DSBLE subroutine, a disable flag is initially written (block 3702) into SC1 of register 1 in random access memory 38.

The last bank setting of the printer is read from SC3 of the same register and a determination is made (block 3704) whether the printer was already sitting in the disabled position when the DSBLE subroutine was called. If the printer was already disabled, a 0 is loaded into a specified index register and control returns to the main program. But, if the printer is not disabled, a jump is made (block 3706) to the STEPS subroutine to drive the printer to the disabled position. Any errors which are noted during the execution of the STEPS subroutine are written (block 3708) into nonvolatile memory before a jump is made to a DESLT subroutine.

The DESLT subroutine is called only when setting problems or photocell reading problems occur. This subroutine is described in more detail with reference to a later figure. If the DESLT subroutine is called, the contents of the error flag index register are loaded into the index register specified earlier in the DSBLE subroutine (block 3710) before control is returned to the main program.

If, however, the STEPS subroutine is called and executed without errors, only a 0 is loaded (block 3712) into the specified index register before control is returned to the main program.

Figure 38:
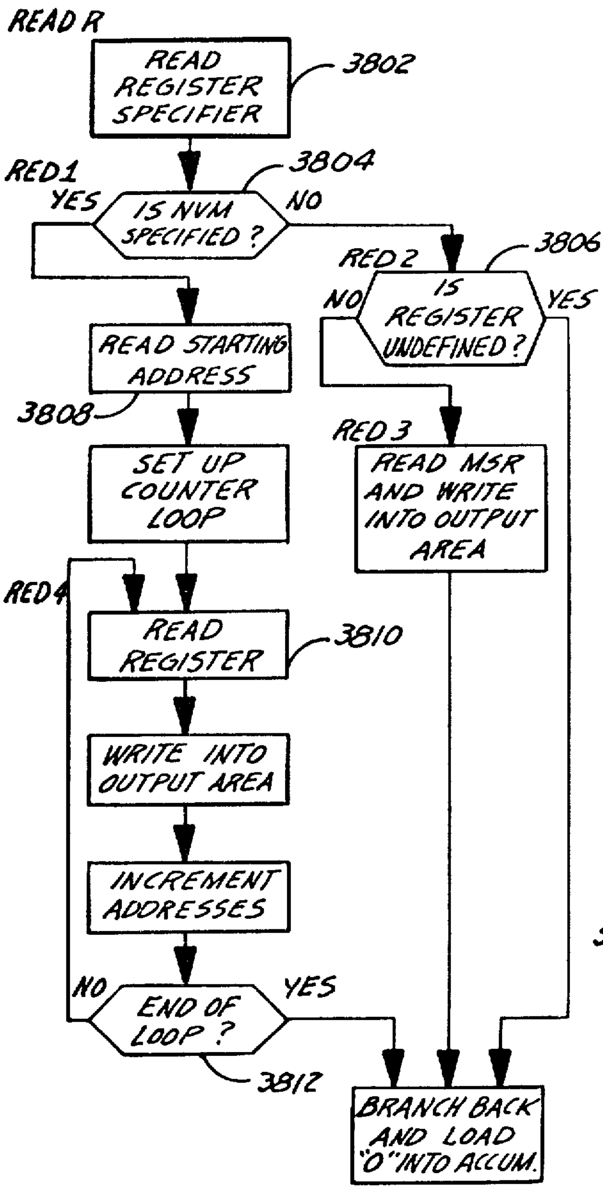
FIG. 38 is a flow chart of a READR subroutine for reading selected memory registers.

FIG. 38 is a flow chart of a READR subroutine which gives a user unrestricted access to certain registers in the nonvolatile and volatile memories. The register to be read is specified in the data message block in register 0 of memory 38. The first data word (word 03) in this register is read (block 3802) to specify the memory location to be accessed by the user. A check is made (block 3804) to determine whether the user has specified a location within the nonvolatile memory. If a memory location other than the nonvolatile memory is specified, a further check (block 3806) is made as to whether the specified register is undefined; i.e., whether it is a register other than the meter setting register. If the block 3806 indicates the meter setting register is specified, that register is read and the contents written into and output area from which they can be sent to the control unit. After the register is read and written out, control is returned to the main program. But if the check 3806 determines that the register sought to be accessed is undefined, control is returned immediately to the main program.

If the earlier check 3804 shows that a register within nonvolatile memory has been specified, the first location in the specified area is read (block 3808) before a counter loop is set up. The specified register is read (block 3810) and written into a specified output area. The addresses for the registers to be read and for the output area into which the data is to be written are incremented and a check 3812 is made as to whether the end of the specified register has been reached. If it has not, program control is returned to block 3810. If it has, control is returned to the main program.

Figure 39:
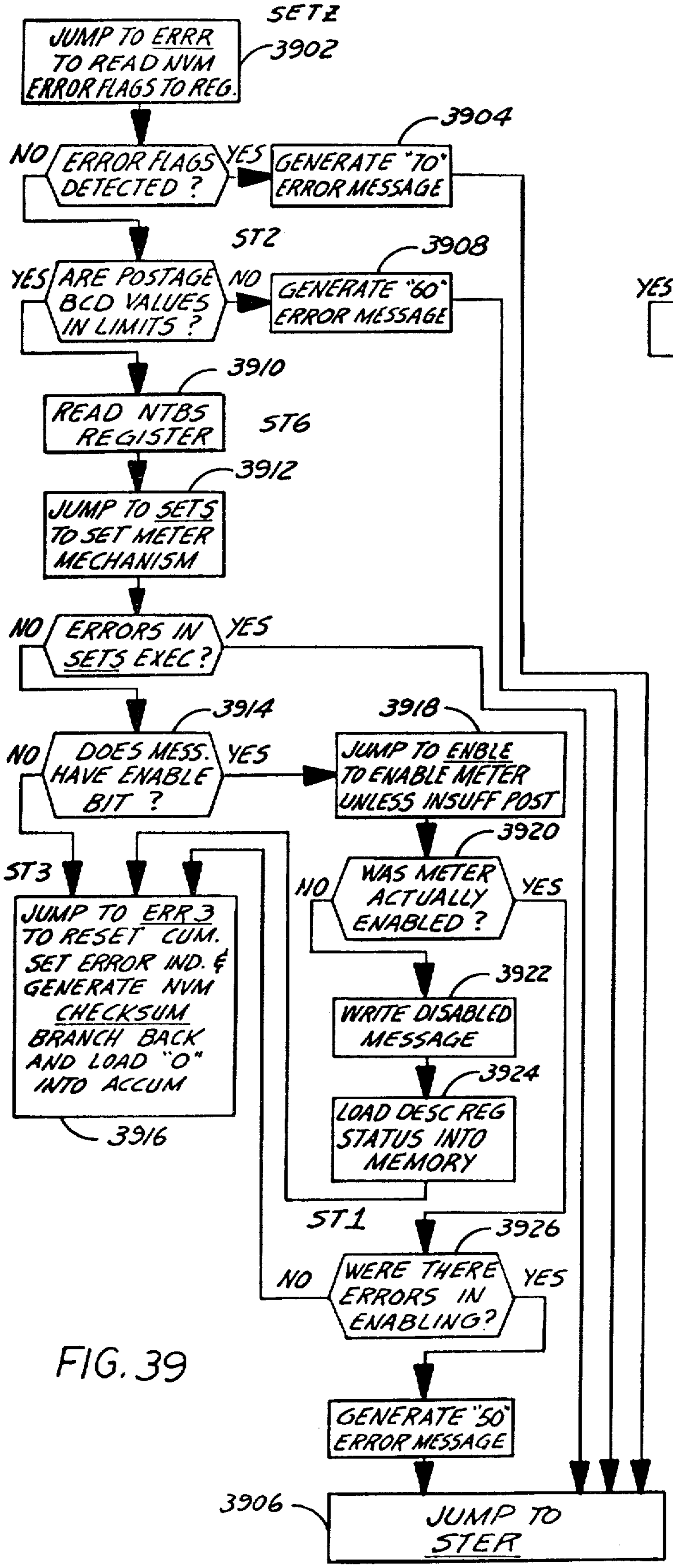
FIG. 39 is a flow chart of a SETZ subroutine which performs preliminary and final operations during setting of the postage printer.

FIG. 39 is a flow chart of a SETZ subroutine which is used to set the printer to a specified postage amount. The first operation in the subroutine (block 3902) is a jump to the ERRR subroutine described previously to permit any error flags stored in nonvolatile memory to be retrieved and loaded into a specified index register. If any flags are detected after the return from the ERRR subroutine, a "70" error message is generated (block 3904) and a direct jump is made (block 3906) to an error writing STER subroutine. But if no error flags are detected, a check is made as to whether the BCD representations of the postage to be set are within limits; i.e. 0–9. If a postage value is found to fall outside the limits, a "60" error message is generated (block 3908) and a direct jump made to the STER subroutine. If the postage values are within limits, the NTBS register is read (block 3910). The SETS subroutine, described in more detail later, is called in operation 3912 to set the printer mechanism to the postage values specified in the NTBS register. If any errors are noted during the execution of the SETS subroutine, a direct jump is made to the STER subroutine. If no errors are noted, a decision (block 3914) is made as to whether the message has an enable bit. If the message lacks an enable bit, a jump is made to an ERR3 subroutine (block 3916) to reset the cumulative set error indicator and to generate a new NVM checksum. After that, control is returned to the main program.

If, however, the message has the enable bit, a jump is made (block 3918) to an ENBLE subroutine to enable the meter, assuming there is sufficient postage remaining in the descending register to actually print the specified postage. After execution of the ENBL subroutine, a decision 3920 is made as to whether the meter was actually enabled. If it was not, a disabled flag is written (block 3922) into random access memory. The status of the descending register (whether less than $100.00 and/or less than the meter setting register) is loaded into memory (block 3924) before a jump is made to block 3916.

If the decision block 3920 shows the meter was actually enabled as requested, a check 3926 is made as to whether any errors occurred in the enabling process. If they did, a "50" error message is generated before control jumps to the STER subroutine. If there were no errors during the enabling, control branches to the block 3916 which ultimately returns control to the main program.

Figure 40:
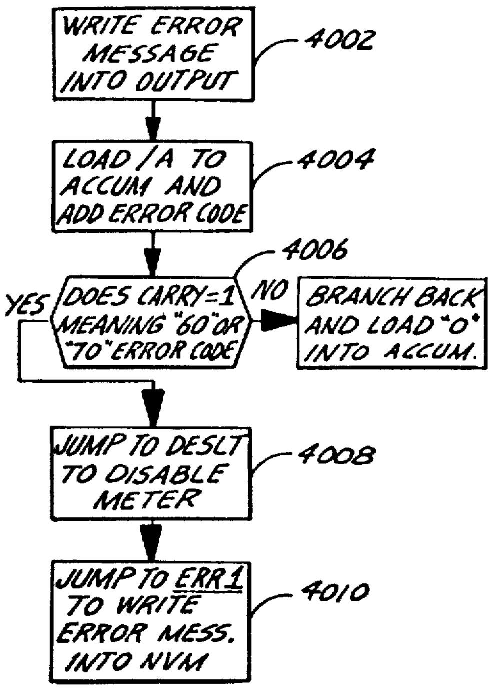
FIG. 40 is a flow chart of a STER subroutine which handles error messages and calls a disabling routine.

FIG. 40 is a flow chart of the STER subroutine which can be called at several points during the execution of the meter setting or SETZ subroutine. When the STER subroutine is called, a specific error message has already been loaded into the accumulator. The first operation in the STER subroutine (block 4002) is to write this error message into a specified word of the data message register of memory 38. A hexadecimal A is loaded into the accumulator (block 4004) and the generated error code is added to the accumulator contents. If a decision 4006 shows that the carry bit has been set to 1, this means either that error flags were originally read from the nonvolatile memory at the start of the SETZ subroutine or that the postage values are not within BCD limits. In the event of either type of error, a jump (block 4008) is made to the DSLT subroutine to disable the meter. Thereafter, control is jumped (block 4010) to ERR1 to cause an error message to be written in the nonvolatile memory.

If decision block 4006 shows that no error or that an error code other than a "60" or "70" error code was generated during the execution of the SETZ subroutine, control is returned immediately to the main program.

Figure 41:
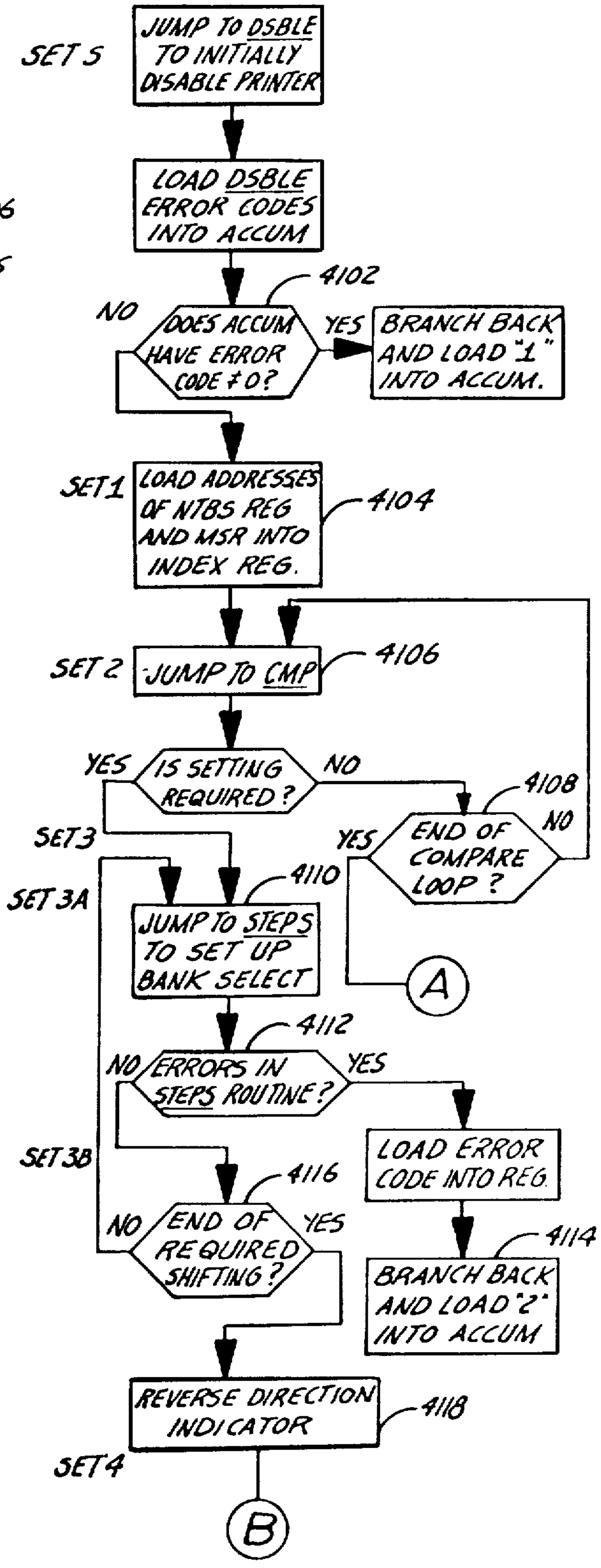
FIGS. 41-42, taken collectively, comprise a flow chart of a SETS routine used to set the printer to a desired postage.
Figure 42:
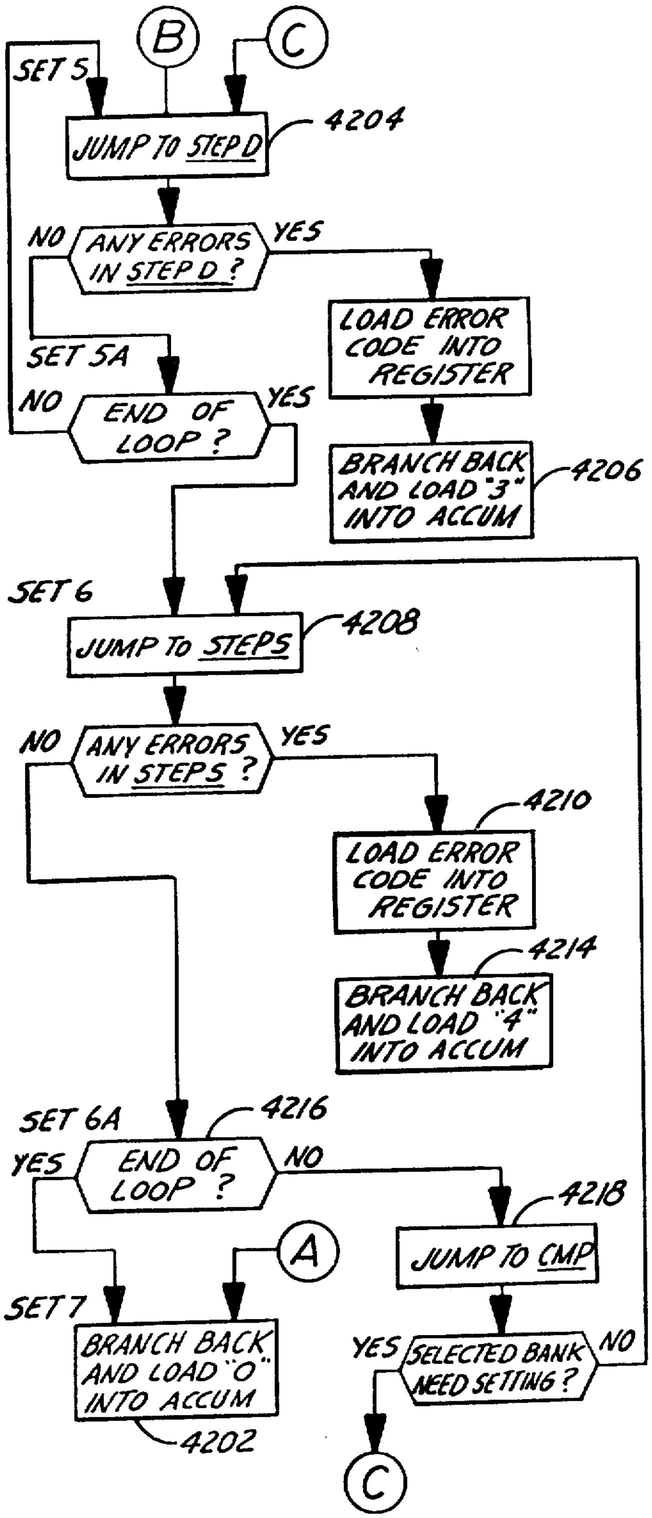

FIGS. 41 and 42, taken collectively, are a flow chart of the SETS subroutine which is called during execution of the SETZ subroutine to actually set the printer to the postage values specified in the NTBS register.

The first operation in the SETS subroutine is a jump to the DSBLE subroutine described previously to initially disable the printer. Any error code associated with the execution of the DSBLE subroutine is loaded into the accumulator and a decision 4102 is made as to whether the accumulator contents are equal to zero. A non-zero accumulator indicates that an error has occurred during the execution of the DSBLE subroutine. Under such conditions, control is returned to the main program with a 1 being loaded into the accumulator. If no errors occur during execution of the DSBLE subroutine, the addresses of the NTBS register and MSR register are loaded (block 4104) into a specified index register and jump (block 4106) is made to a CM subroutine, to be described in more detail later. Basically, the CMP subroutine compares the contents of the two registers and provides the data which indicates how far and in which direction each of the print wheels of the printer must be moved. If the CMP subroutine shows that no setting is required at a particular bank, a determination is made (block 4108) as to whether all banks have been checked. The digit-by-digit comparisons of the contents of the NTBS register and meter setting register continue through the loop including blocks 4106 and 4108 as long as no setting is required, at least until the end of the loop is reached. If the end of the loop is reached without any setting being required, control is returned to the main program (block 4202) with a 0 being loaded into the accumulator.

If the comparison of the NTBS and MSR registers for particular banks show that setting is required, control jumps to the STEPS subroutine (block 4110) to drive the main gear into engagement with the spur gear for the particular bank. The STEPS subroutine is described in more detail with reference to a later figure. After execution of the STEPS subroutine, a decision (block 4112) is made as to whether any errors have occurred. If errors have occurred, an error code is loaded into a specified index register, control is returned to the main program (block 4114) and a 2 is loaded into the accumulator. If no errors occur during the execution of the STEP subroutine, another decision 4116 is made as to whether the printer yoke has been driven to the last bank to be set. If it has not, the loop beginning with block 4110 and ending with block 4116 is repeated until the printer reaches the last bank to be set.

At that point, the motor direction indicator for the banks select motor is reversed (block 4118) and control jumps to the STEPD subroutine (block 4204) to actually set the print wheels to the desired digit. This subroutine is described in more detail later. Errors, if any, occurring during execution of the STEP subroutine are loaded into a specified index register before control returns (block 4206) to the main program. When control is returned to the main program under these conditions, a 3 is loaded into the accumulator.

Each execution of the STEPD subroutine causes the print wheel to be moved from one digit to the adjacent digit. Therefore, the STEP subroutine must be repeated as many times as is necessary to alter the print wheel position from the original position to the position specified in the NTBS register. When the STEPD subroutine has been repeated the necessary number of times, program control branches to the STEPS subroutine (block 4208) which drives the printer yoke to the next less significant digit position. Errors, if any, occurring during the execution of the STEPS subroutine are loaded (block 4210) into a specified index register. Program control returns to the main program (block 4212) with a 4 being loaded into the accumulator.

If no errors occur during the execution of the STEPS subroutine, a decision 4216 is made as to whether all banks of the printer have been set. If not all banks of the printer have been set, program control jumps (block 4218) to the CMP subroutine to determine whether the currently selected bank needs setting. If it does, the subroutine is repeated beginning with block 4204. If the currently selected bank does not need setting, control is returned to block 4208 to select the next lower bank. When the decision block 4216 shows that the last bank has been set or at least has been checked to determine whether setting is required, program control is returned to the main program with a zero being loaded into the accumulator.

When the SETS subroutine is exited, the contents of the specified index register identify any error which has occurred.

Figure 43:
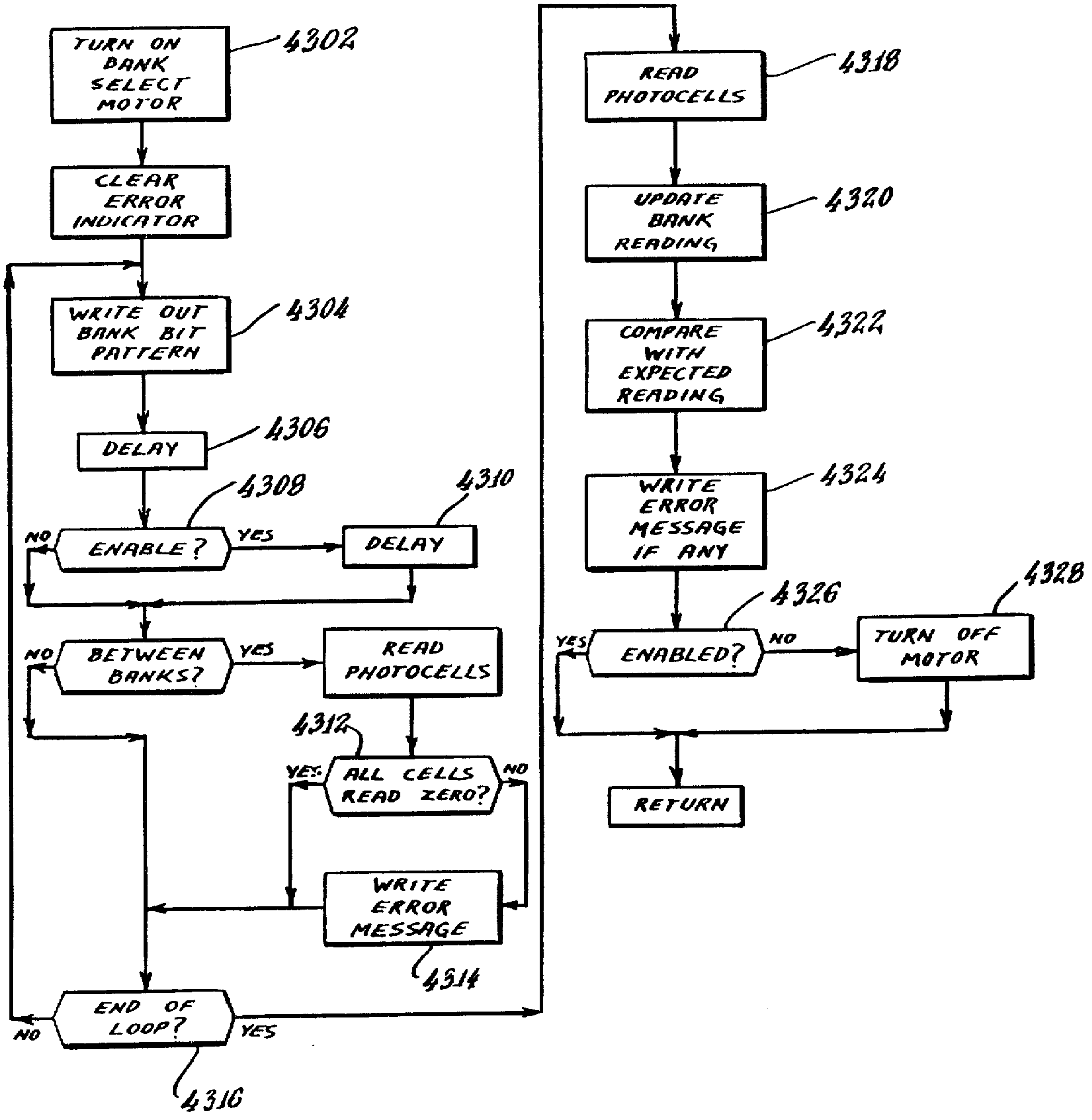
FIG. 43 is a flow chart of a STEPS subroutine used to control the bank select motor of the printer.

FIG. 43 is a flow chart of the STEPS subroutine for controlling the bank select motor in the printer. The first step 4302 in this subroutine is energization of the bank select motor, which drives the yoke and main gear between the enabled position, the disabled position and the various banks of print wheels. Error indicators are cleared and the bank bit pattern for an adjacent bank to which the yoke is to be driven is written out in a step 4304. To give the motor time to respond, a delay loop 4306 is incorporated into the routine. A check 4308 is then made to determine whether the yoke is being driven into the enabling position against the force of a spring or other resilient member which normally tends to bias the yoke out of that position. If the bank select motor is acting against the force of the spring, an extra delay 4310 is built into the program.

The first of two error checks is then made. In a preferred embodiment of the invention, the yoke position encoder consisting of the parallel plates 206 and 208 and associated optical detectors described with reference to FIGS. 6-8 should read all binary zeros at any intermediate position of the yoke. If a check 4312 indicates otherwise, an error message is written into an error register in operation 4814. If the readings are zeros, the program goes directly to an end of loop decision 4316. The loop, which begins with block 4304 and ends with block 4316, is repeated for as many motor steps as are necessary to drive the yoke from one bank position to the next. When the necessary number of motor stepping operations have been completed, the yoke position detectors are again read in an operation 4318 to obtain an updated bank reading 4320 which is compared with the anticipated reading for the selected bank in an operation 4322. Any mismatch between the anticipated bank reading and the detected bank reading causes an error message to be written in an operation 4324. At this point, a check 4326 is made as to whether the motor has driven the yoke into the enabled position in which it must be maintained against the force of a biasing spring. If the yoke has been driven into the enabled position, the motor remains energized. If the yoke has been driven to any other position, the bank select motor is turned off in step 4328. Control is then returned to the main program.

The STEPS routine is executed each time the yoke is driven from one bank position to an adjacent bank position.

Figure 44:
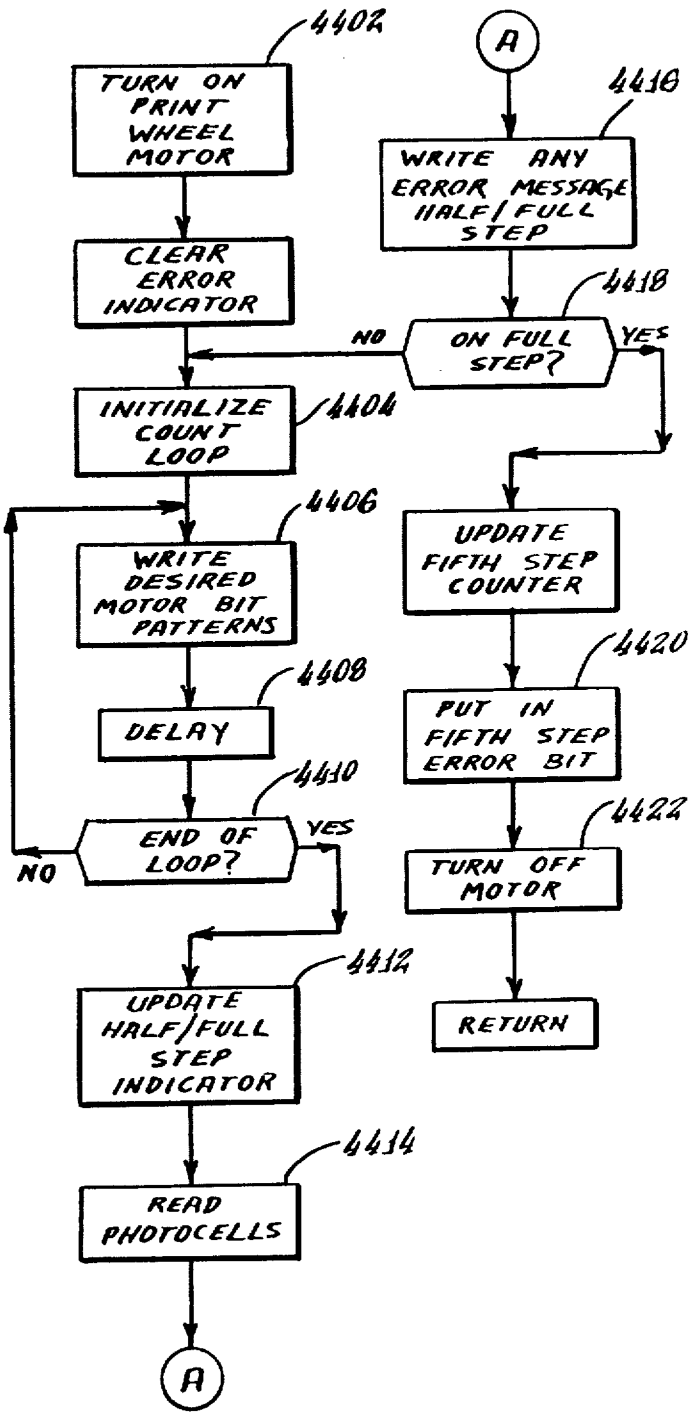
FIG. 44 is a flow chart of a STEPD subroutine used to control the digit select motor of the printer.

The routine which controls the print wheel setting motors is the STEPD routine referred in several places above and described now in detail with reference to FIG. 44. The print wheel or digit select motor 84 is energized in the initial step 4402 and the error indicators are cleared. A count loop (block 4404) is initialized. This count loop provides an indication of the number of different motor coil energization patterns required in order to drive the print wheel through a half step or halfway to the adjacent digit position. After the count loop is initialized, the signals required to energize the motor coils employing each pattern in sequence are generated in an operation 4406. A programmatic delay 4408 permits the motor time to respond.

After the motor coil pattern has been changed, a check 4410 is made as to whether the necessary number of counts have occurred in the count loop. If less than the anticipated number have occurred, the bit pattern for the next coil energization pattern in the sequence is written in an iterated operation 4406 and the motor is driven through another angular increment. The process involving operations 4406, 4408 and 4410 is repeated until the end of the loop count is sensed. An indicator is updated in an operation 4412 to indicate that the print wheel has advanced from a full step or digit position through a half step or midway position. The optical detectors associated with the print wheel setting gears are read (block 4414) and an error check is made to determine whether a gear slot or a gear tooth can be seen. In the half step or midway position, a gear tooth should always be interposed between the light source and the phototransistor of an optical detector. Therefore, the presence of a gear slot in what is believed to be a half step position will cause a half/full step error message to be written (block 4416) into random access memory. A check 4418 is made as to whether the motor is on a full step. If not, the program returns to block 4404 in which the count loop needed to move the motor through a half step is again initialized. If necessary, the motor is driven to another half step by means of the operations 4404 through 4418.

Figure 6:
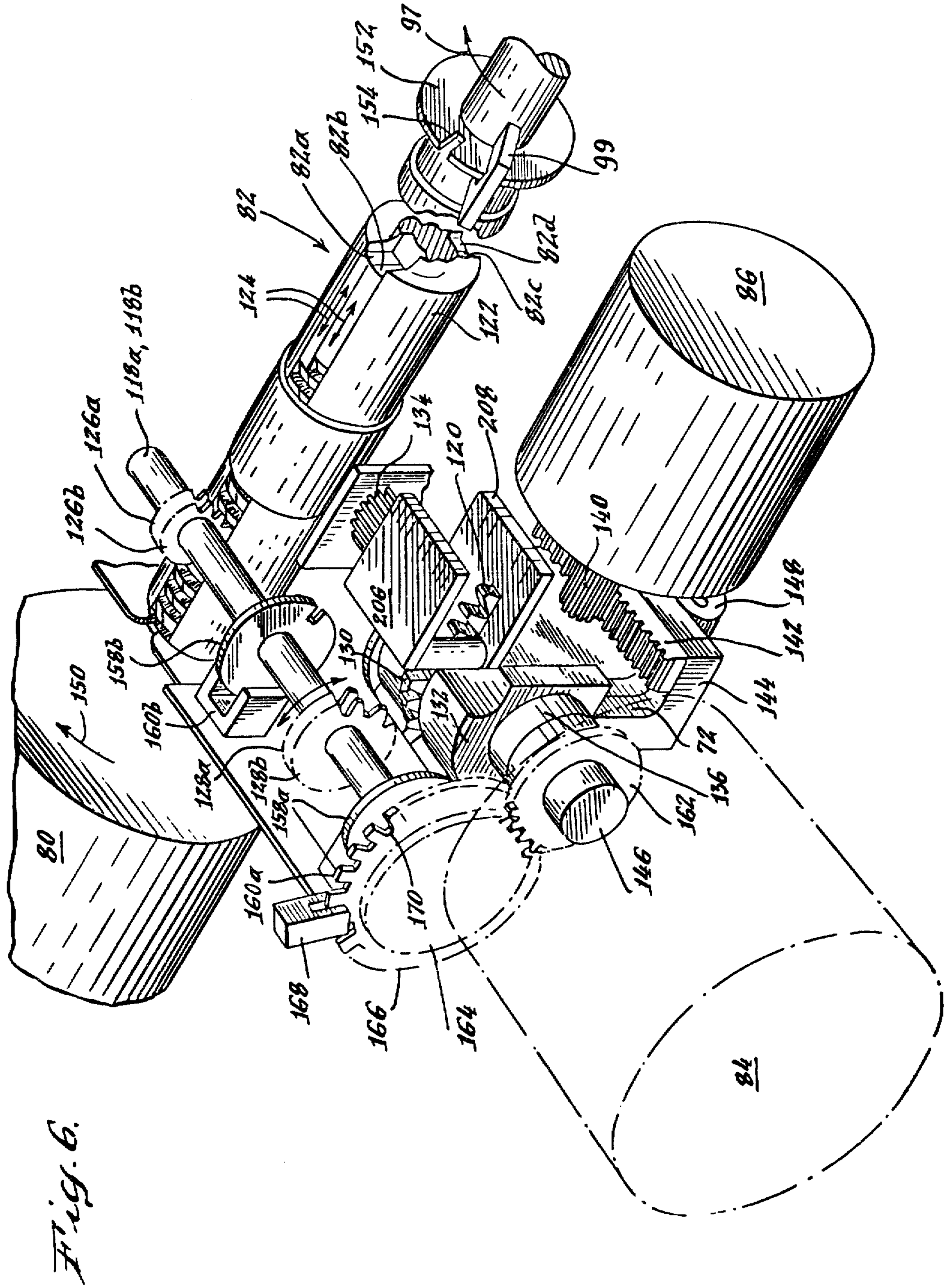
FIG. 6 is a perspective view of a portion of one embodiment of a postage printer for the meter system.
Figure 7:
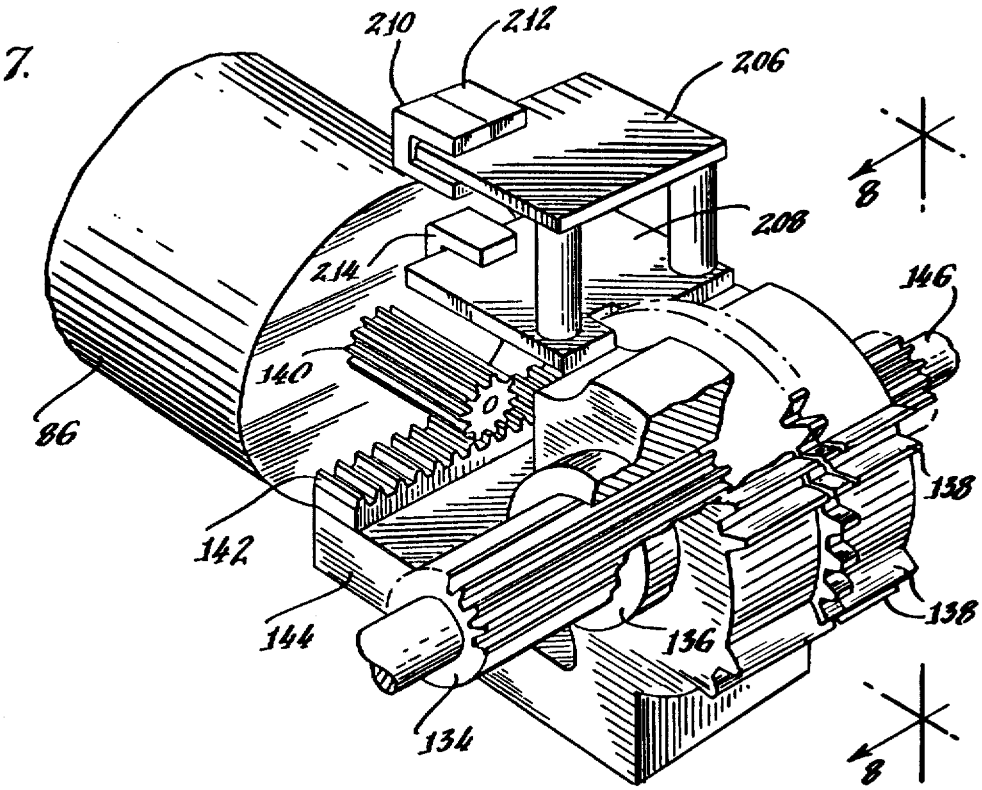
FIG. 7 is a perspective view of selected parts of the mechanism of FIG. 6.
Figure 8:
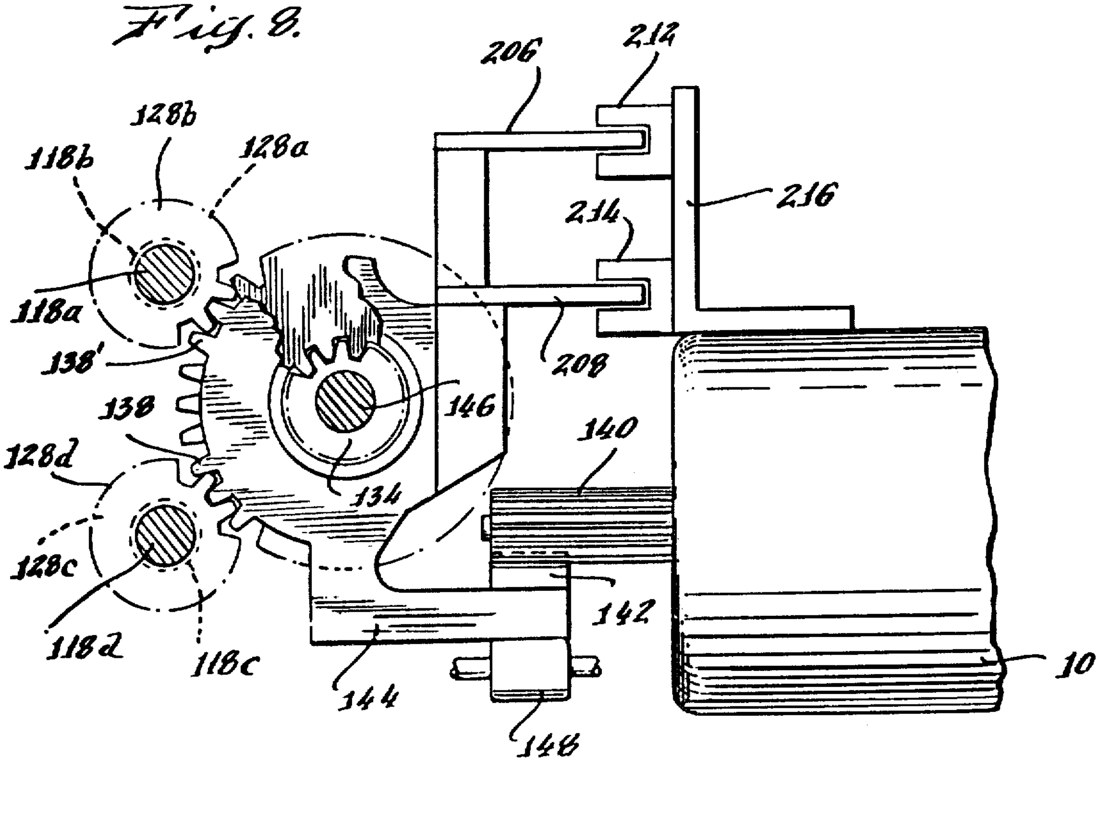
FIG. 8 is an elevation view taken along lines 8—8 of FIG. 7.

If check 4418 reveals that the motor has been driven to a full step position, the fifth step counter referred to in the description of FIGS. 6–8 is updated by one digit. A check is then made as to whether the extra deep slot on the monitoring wheel 166 is detected when the count in the fifth step counter is other than a multiple of 5. If the extra long slot is aligned with the optical detector 168 while the fifth step counter is other than a multiple of 5, an error condition exists. Conversely, if the extra long slot is not aligned with the optical detector when the fifth step counter does contain a multiple of 5, an error condition also exists. Under either of these conditions, a "fifth step error" bit is written into an error indicator in the operation 4420. The print wheel motor is turned off in an operation 4422 and control is returned to the main program. The main program responds to the error indications generated when the STEPD routine has been called.

Figure 45:
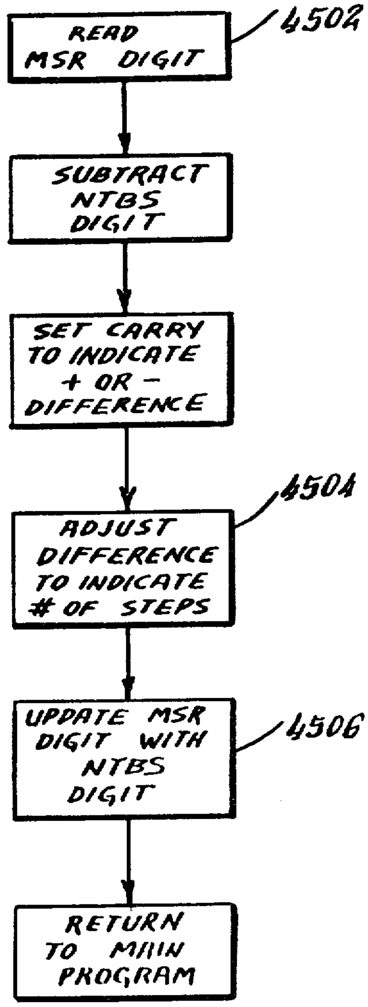
FIG. 45 is a CMP subroutine called during setting of the printer to a desired postage value.

The CMP subroutine, which is used to determine the number of steps through which a print wheel must be driven from its previous setting to a new setting, is now described in more detail with reference to FIG. 45. The first step (block 4502) is to read the MSR or Meter Setting Register digit which is the current setting of the print wheel. The NTBS of Next To Be Set digit is subtracted and the accumulator carry is set or cleared to indicate a positive or negative difference. The difference must then be adjusted (block 4504) to indicate the number of actual motor energization changes.

The energization pattern for the coils of the stepping motor which drives the print wheels must be changed more than once in order to span one digit difference. For example, to provide a one digit change in the position of the print wheel might require 16 changes in the motor energization pattern. If the number of pattern changes per digit is 16, and the difference between the previous wheel setting and the desired setting is two digits, the adjustment referred to in block would be $16\times2$ or 32 sequential pattern changes. Appendium C may be consulted for more details.

After the number of required pattern changes is calculated, the meter setting register must be updated (block 4506) to reflect the new setting of the print wheel before control is returned to the main program.

Figure 46:
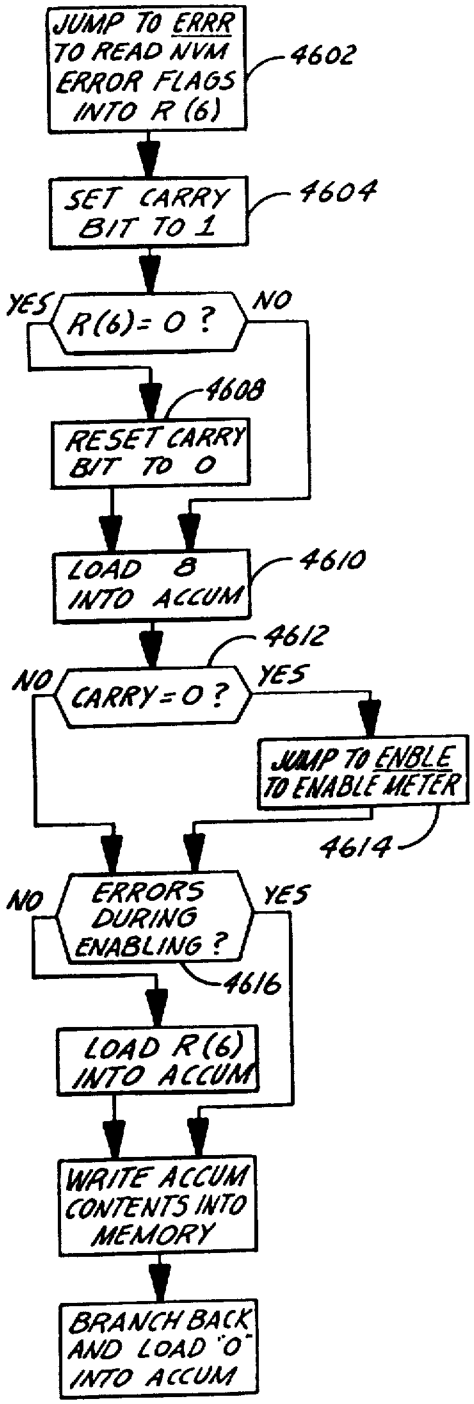
FIG. 46 is a flow chart of an ENABL subroutine which controls enabling of the printer.

FIG. 46 is a flow chart for an ENABL subroutine which provides an entry into and an exit from the subroutine which drives the printer yoke to the enabled position. The first operation of the ENABL subroutine (block 4602) is a jump to the ERRR subroutine which retrieves any error flags stored in nonvolatile memory and writes those flags into index register 6. The accumulator carry bit is set to 1 in operation 4604 before the contents of register R6 are read. If R6 equals zero, indicating there are no error flags stored in nonvolatile memory, the accumulated carry bit is reset or cleared to zero in operation 4608. If R6 is not equal to zero, indicating that error flags do exist, operation 4608 is bypassed. In either event, the next operation in the sequence (block 4610) is to load an 8 into the accumulator, followed by a check 4612 as to whether the carry bit equals zero. If it does equal zero, indicating no error flags, a jump is made (block 4614) to an ENBLE subroutine actually employed to drive the printer to its enabled position.

Whether or not check 4612 shows that the carry equals zero, a further check 4616 is made as to whether any errors have arisen either during the execution of the ENBLE subroutine or otherwise. If no errors have occurred, the contents of the error code-containing index register R6 are loaded into the accumulator. If errors have occurred, the accumulator will already be set to 8 because of operation 4610. The accumulator contents are written into an error message location in the data message block of register zero in random access memory 38. Control is returned to the main program after the write operation.

Figure 47:
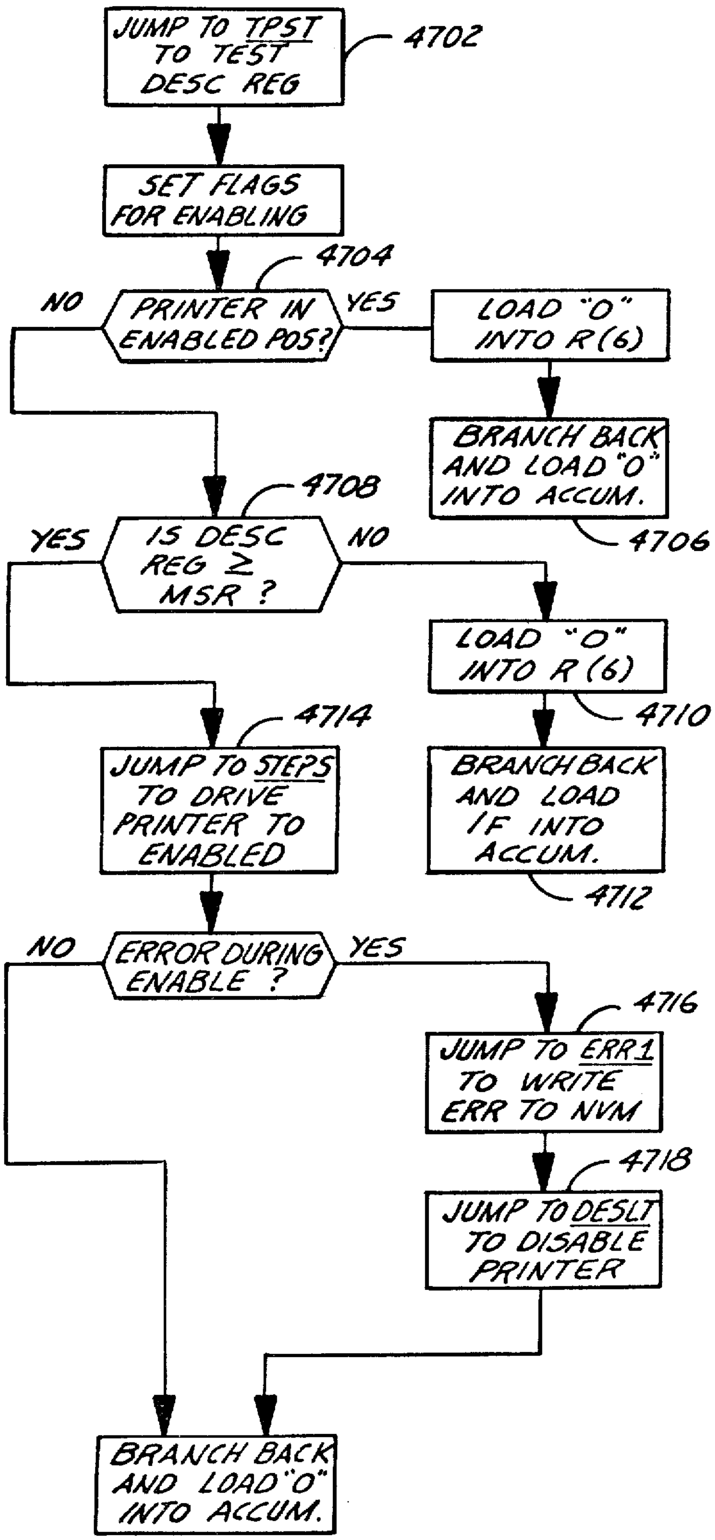
FIG. 47 is a flow chart of an ENBLE subroutine for driving the printer to an enabled position when there is sufficient postage.

FIG. 47 is a flow chart of the ENBLE subroutine called by the previously described ENABL subroutine to actually drive the printer into its enabled position.

The TPST subroutine is called (block 4702) to determine whether the descending register is less than $100 or less than the meter setting register. Step down and enabled flags are then written into SC0 and SC1 respectively of register one in random access memory 38. The third status character in that register is read to determine whether the printer is sitting in the enabled position. If it is, index register 6 is loaded with a zero and control is returned (block 4706) to the main program. If the printer is not sitting in the enabled position at the time of check 4704, another decision 4708 is made as to whether the contents of the descending register are greater than or equal to the meter setting register. If the meter setting register shows the greater amount, indicating that there is insufficient postage to print the requested amount, a zero is loaded into index register 6 in operation 4710. Then, control is returned to the main program with a hexadecimal F being loaded (block 4712) into the accumulator.

If decision block 4708 indicates that the descending register contains sufficient postage, the STEPS subroutine is called (block 4714) to drive the printer into its enabled position. If any errors occur during the execution of the STEPS subroutine, the ERR1 subroutine is called (block 4716) to write error codes into nonvolatile memory. A DESLT subroutine, to be described in more detail later, is called (block 4718) to disable the printer. Control is then returned to the main program. If no errors are detected during the enabling step, control is returned immediately.

Figure 48:
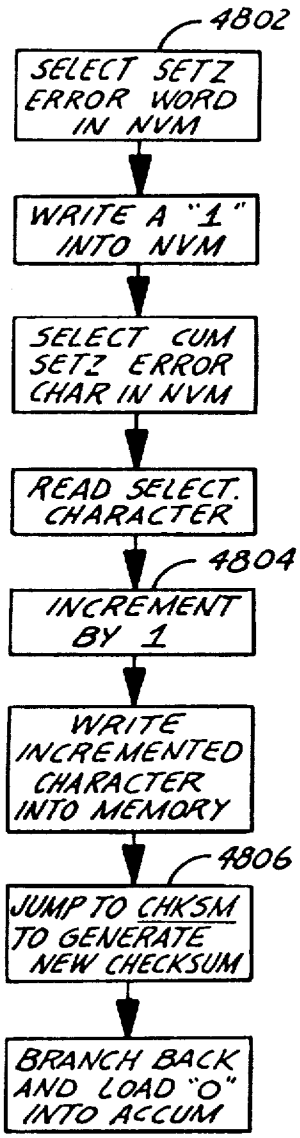
FIG. 48 is a flow chart of an ERR1 subroutine for incrementing cumulative error indicators associated with the setting of the printer.

The ERR1 subroutine flowcharted in FIG. 48 is used to write error messages into nonvolatile memory. The SETZ error word or NVM location 24, for the memory assignment (shown in FIG. 14) is first selected in an operation 4802. A 1 is written into that location. The cumulative SETZ error word, or NVM location 25, is selected and read into central processor. The value is incremented by 1 in operation 4804 and the result written back into nonvolatile memory. A jump 4806 is made to the CHKSM subroutine to generate a new check sum for nonvolatile memory register No. 2. Control is then returned to the main program.

Figure 49:
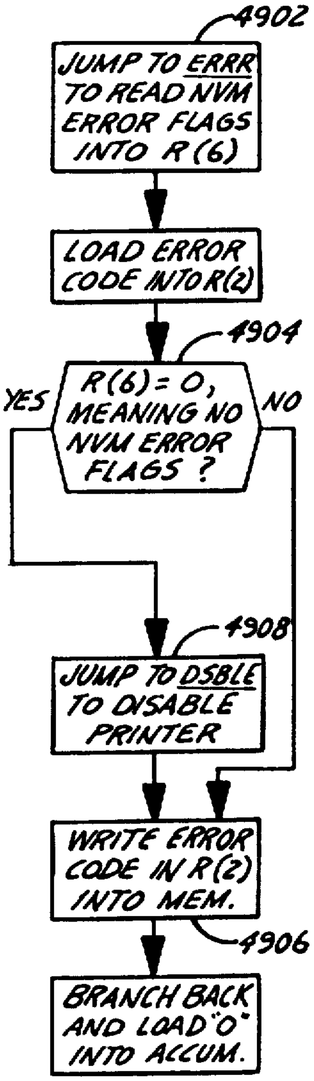
FIG. 49 is a flow chart of a DISAB routine for calling a printer disabling subroutine and for generating error indicators.

A DISAB subroutine, which is the calling routine for the DSBLE subroutine, is shown in flow chart form in FIG. 49. Nonvolatile memory error flags are first read into index register 6 by jumping to the ERRR subroutine in operation 4902. A predetermined error code or value is loaded into a specified index register, after which a check 4904 is made as to whether index register 6 is equal to 0, meaning there are no error flags stored in nonvolatile memory, the predetermined error code stored in index register 2 is written (block 4906) into the data message block of random access memory 38. But if the contents of index register 6 are not equal to 0, indicating that error flags were stored in the nonvolatile memory, a jump is first made (block 4908) to the DSBLE subroutine to disable the printer. After the predetermined error code has been loaded into memory, control is returned to the main program.

Figure 50:
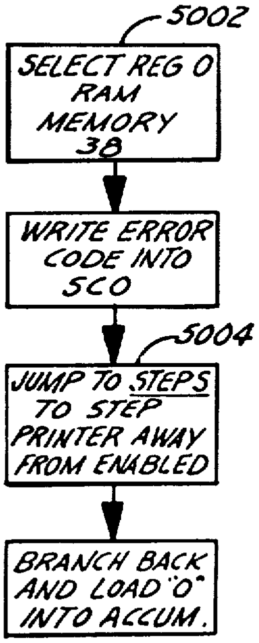
FIG. 50 is a flow chart of a DESLT subroutine called to disable the meter when problems occur during reading or setting.

A special subroutine DESLT is called to disable the meter when problems occur during setting or reading of photocells. This subroutine is flowcharted in FIG. 50. When the DSLT subroutine is called, register 0 of random access memory 38 is selected (block 5002) and a predetermined error code (hexadecimal/F) is written into SCO of that register. A jump is then made to the STEPS subroutine (block 5004) to step the printer away from the enabled position and control is returned to the main program.

Figure 51:
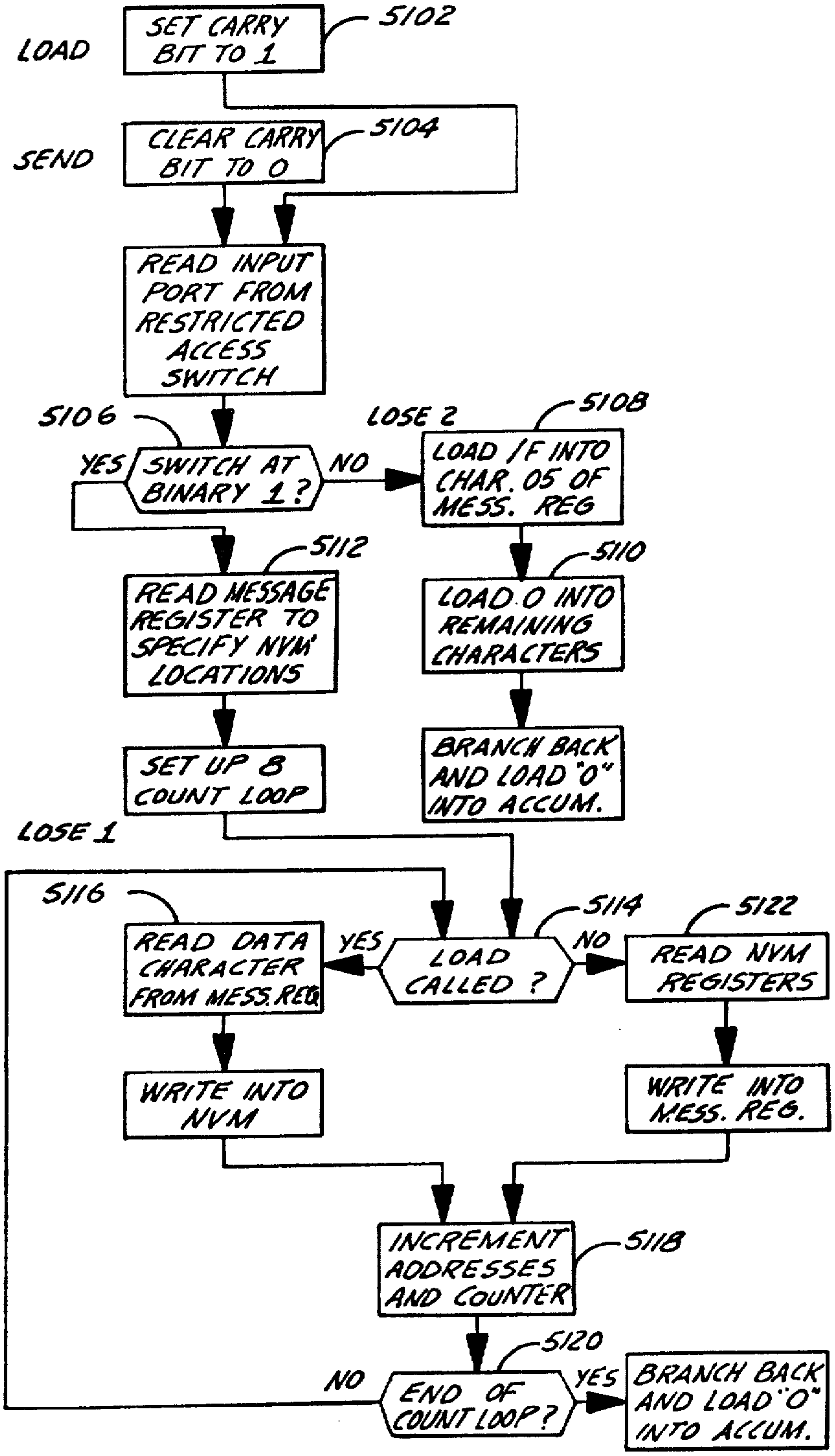
FIG. 51 is a flow chart of a LOAD/SEND subroutine which provides restricted access to the nonvolatile memory.

Since meter security requires that the user be kept unaware of the RMRS seed number stored in nonvolatile memory, it is necessary to provide restricted access to that register. The switch 75 at one input to input buffer 76 can be connected by the manufacturer or an authorized serviceman to a −15 volt source. When the switch is set this way, the nonvolatile memory registers can be read out or written into using a LOAD/SEND subroutine described in flow chart form in FIG. 51.

If the LOAD (or write) subroutine is called, the accumulator carry bit is set (block 5102) to 1. If the SEND (or read) subroutine is called, the accumulator carry bit is cleared (block 5104) to 0. The input port connected to switch 75 is read and a decision (block 5106) is made whether the switch is at binary 1; i.e., connected to the −15 volt source. If the switch is not at binary 1 when either the LOAD or SEND subroutine is called, an error code/F is loaded (block 5108) into word 5 of register 0 and random access memory 38. In consequent operation 5110, zeros are loaded into the remaining words of the register, after which control is returned to the main program.

If decision block 5106 shows that switch 75 was set to a binary 1 level, the data message register in random access memory 38 is read (block 5112) to determine which NVM locations are to be accessed. An eight-count loop is set up and a decision 5114 is made as to whether the LOAD subroutine or the SEND subroutine was called. If the LOAD subroutine was called, the data characters to be loaded into the specified nonvolatile memory location are read from the data message register in operation 5116 and then written into the specified NVM location. The addresses between which data is being transferred and the loop count are incremented in operation 5118 and a check 5120 is made as to whether the end of the count loop has been reached. If it has not, program control returns to block 5114.

When block 5114 indicates that the SEND subroutine, rather than the LOAD subroutine was called, the specified nonvolatile memory registers are read in operation 5122 and then written into the data message register of random access memory 38. The addresses and loop counter are incremented in operation 5118 whether the LOAD subroutine or the SEND subroutine was called.

When decision block 5120 shows that the end of the count loop has been reached, control branches back to the main program.

The system described above was developed specifically to control a mechanical postage printer since such a printer already has received the necessary Governmental approvals to permit commercial use. A considerable amount of hardware and software is required to service this mechanical printer. For example, the printer setting elements 26 and the printer setting detector array 30 are needed in the hardware primarily to service the mechanical printer. Similarly, subroutines such as INITS, DSBLE, SETZ, SETS, STEPS, STEPD, and others are dedicated almost exclusively to servicing the mechanical aspects of the printer operation. It is certainly considered to be within the scope of the present invention to use the hardware and software to control nonmechanical printers such as ink jet printers, dot-matrix printers and other such printers.

Although the RMRS subroutine has been referred to in a number of places throughout the specification and drawings, the details of the subroutine and supporting subroutines have not been included herewith as these are auxiliary to the present invention. Moreover, the security of postal meters manufactured by the assignee of the present invention would be unnecessarily jeopardized by providing detailed flow charts and descriptions of the RMRS subroutine.

In general terms, a RMRS subroutine permits a user to re-fund the meter himself while his account at a funding center is debited by the proper amount. U.S. Pat. No. 3,792,446 to McFiggans et al described one such system. In accordance with that patent, a user establishes communications with a funding center computer and identifies himself and the meter to be funded. After the funding center verifies the identity of the user, a stored seed number is operated on in accordance with a predetermined algorithm to generate a pseudo-random number. The pseudo-random number is furnished to the user, preferably via a voice answer-back unit.

When the user receives the generated pseudo-random number, he enters it into the meter, which has already operated on a stored seed number in accordance with the same algorithm employed by the funding center computer to generate what should be the same pseudo-random number. If the meter-generated number matches the number entered by the user, indicating the user has properly accessed the funding center computer, the descending register and control sum register of the meter are incremented by a fixed amount. The user's account at the funding center computer will have already been debited by the fixed amount.

The seed numbers which are stored in the meter and in the funding center computer are altered in the same manner during each funding operation to provide new, pseudo-random seed numbers for the next funding operation.

In the TNVM subroutine of FIG. 30, a direct comparison was made between the stored checksum and data stored in the nonvolatile memory. In the event that all data have been lost during a shut-down period, then this checking operation would proceed normally. In order to avoid this, in accordance with a modification of the invention, the complement of the checksum may be stored in rows zero and one of the NVM register. This modification is illustrated in the subroutine of FIG. 52, wherein the generator checksum derived from the register contents is complemented and subtracted from the complemented stored checksum in rows zero and one of the register. If the data in the register has been lost during the shut-down period, this comparison of the complements of the checksum will reveal the error.

The routine in accordance with FIG. 52 therefore overcomes an additional source of possible error in the system.

In order to implement the routine of FIG. 52, it is, of course, necessary to complement the stored checksum. This may be effected by the routine illustrated in FIG. 53, which shows the necessary modification of the routine of FIG. 34. Thus, before writing $R_a$ and $R_b$ in the NVM checksum location, these values must be complemented. While FIGS. 52 and 53 illustrate this modification as being software modification, it is, of course, apparent that they may also constitute a part of the hardware of the system in accordance with the invention.

The modification of the routine illustrated in FIGS. 52 and 53 may also be indicated in the attached program printout by the insertion of CMA instructions between program steps 1512 and 1513; 151A and 151B; 15E2 and 15E3; and 15E7 and 15E8.

This modification, in accordance with the invention, assures that logic ones and zeros are in each register, so that in the event of total loss of stored data wherein all locations would appear as either zeros or ones, the complemented checksum routine will ensure recognition of the error.

While there has been described what is considered to be a preferred embodiment of the present invention, variations and modifications therein will occur to those skilled in the art once they become acquainted with the basic concepts of the invention. Therefore, it is intended that the appended claims shall be construed to include the disclosed embodiment and all such variations and modifications as fall within the true spirit and scope of the invention.

COMMENTS ON PROGRAM PRINTOUT

APPENDIUM A

The representation of some of the instructions has been slightly altered from those representations Intel uses in their Programming Manual (copyright 1974). Double instructions are printed on two lines, rather than one. The second line contains data or an address associated with the double word instruction. Data, numbers, and addresses are generally given in hexadecimal notation. The various columns and the formats for comments are identified below.

The program listing of this Appendium A appears in full as Appendium A in copending application Ser. No. 950,302, now U.S. Pat. No. 4,251,874.

APPENDIUM B

Instruction Set

Most of the instructions employed are single word instructions which are expressed on a single line of the printout. Such instructions can include a mnemonic LABEL which serves as an instruction address, a mnemonic CODE which identifies the particular machine operation to be performed and an OPERAND which is used in conjunction with the CODE to define precisely the operation to be performed by the instruction.

The OPERAND can represent a single four bit index register, a pair of such registers, data, a twelve bit memory address or a condition code. Which of these is represented depends entirely upon the CODE with which the OPERAND appears.

Some instructions are double word instructions. These are the FIM, ISZ and JCN instructions. These instructions occupy two lines in the program printout with the CODE and part of the OPERAND appearing on the first line. The remainder of the OPERAND, either data or an address depending on the CODE, appears on the second line.

| LABEL | CODE | OPERAND | EXPLANATION |
|---|---|---|---|
| | ADD | reg. | Adds register contents to accumulator. Set carry bit if necessary. |
| | ADM | | Adds last specified data RAM character, plus carry bit, to accumulator. Carry bit is set if carry results but is otherwise reset. |
| | AN6 | | The contents of index register 6 are logically ANDed with the accumulator on a bit-by-bit basis; carry bit is not affected. |

-continued

| LABEL | CODE | OPERAND | EXPLANATION |
|---|---|---|---|
| | AN7 | | The contents of index register 7 are logically ANDED with the accumulator on a bit-by-bit basis. Carry bit is not affected. |
| | BBL | data | Used following JMS to resume execution at last address saved. Four bits of data are loaded into the accumulator. |
| | CLB | | Clear accumulator and reset carry bit to 0. |
| | CLC | | Reset carry bit to zero. |
| | CMA | | Complement each bit of the accumulator. Carry bit is not affected. |
| | CMC | | Complement the accumulator carry bit. |
| | DAA | | Decimal adjust of accumulator. If accumulator contents > 9 or if carry bit = 1, increment accumulator by 6. Set carry bit only if incrementing produces carry out of high order position. |
| | DAC | | Decrement accumulator by 1. Set carry bit if there is no borrow out of high order bit position; reset otherwise. |
| XXXX | EQU | expression | XXXX is assigned the value set in the expression. |
| | FIM + data | reg. pair | The data is loaded into the specified pair of four bit registers. |
| | FIN + | reg. pair | The contents of register pair 0 form the lower 8 bits of an address in the page of memory in which this instruction is located. Data at the address is loaded into the register pair specified in this instruction. |
| | IAC | | Increment accumulator by 1. Set carry bit if there is a carry out of the high order bit; reset otherwise. |
| | INC | reg. | Increment specified register by 1. Carry bit not affected. |
| | ISZ+ address | reg. | Increment specified register by 1. If result ≠ 0, jump to specified address. If result = 0, continue with next instruction in sequence. |
| | JCN+ address | cond. | If cond. is true, jump to address. If cond. is not true, go to next instruction in sequence. cond. may be: CN - carry bit ≠ 0 CZ - carry bit =0 AN - accumulator ≠ 0 AZ - accumulator =0 |
| | JIN | reg. pair | The contents of the specified register pair are transferred to the program counter. The carry bit is not affected. |
| | JMS | address | Jump to the subroutine which begins at the specified address. Instruction address which follows JMS is saved for return. |
| | JUN | address | Jump unconditionally to the specified address. |
| | LD | reg. | Load register contents into accumulator; carry bit is not affected. |
| | LDM | data | Load data into accumulator. Carry bit is not affected. |
| | NOP | | No operation. Program counter incremented by one. |
| | ORG | address | Assembly instruction. Sets location counter to specified address. Assembly continues from that location. |
| | OR4 | | Contents of index register 4 are OR'd with accumulator on a bit by bit basis. Carry bit is not affected. |
| | OR5 | | Contents of index register 5 are OR'd with accumulator on a bit by bit basis. Carry bit is not affected. |

-continued

| LABEL | CODE | OPERAND | EXPLANATION |
|---|---|---|---|
| | RAL | | Shift accumulator left through carry. Carry bit goes to LSB of accumulator. |
| | RAR | | Shift accumulator right. Carry bit goes to MSB position. LSB goes to carry position.. |
| | RDM | | Read data bus. Character from last RAM specified by SRC instruction is loaded into accumulator. |
| | RDn | | n=0,1,2,3. Read into accumulator status character n of last RAM specified by SRC instruction. |
| | RDR | | Read data bus into accumulator. Last input port specified by SRC instruction is accessed. |
| | RPM | | Reads ½ byte(4 bits) of program memory into accumulator. Need two RPM instructions in sequence. |
| | SBM | | Subtract contents of data bus from accumulator. If the result generates no borrow, the carry bit is set; otherwise, the carry bit is set. |
| | SRC | reg. pair | Accesses the RAM, ROM, input port or output port having the address specified in the register pair. |
| | STC | | Set carry bit equal to 1. |
| | SUB | reg. | Subtract contents of specified register from accumulator. Set carry bit to 1 if there is no borrow out of high order bit position; otherwise, reset carry bit to zero. |
| | TCS | | If carry bit =0, accumulator set to 9. If carry bit =1, accumulator set to 10. Carry bit then reset in either case. |
| | WMP | | Writes contents of accumulator to last output port specified by an SRC instruction. |
| | WPM | | Write contents of accumulator in program RAM specified by last SRC instruction. Need two WPM instructions to transfer 1 byte. |
| | WRM | | Writes accumulator contents into last DATA RAM specified by an SRC instruction. |
| | WRn | | n=0,1,2,3. Contents of accumulator are written into status character n of the last DATA RAM register specified by an SRC instruction. |
| | XCH | reg. | The contents of the accumulator are exchanged with the contents of the specified register. The carry bit is not affected. |

APPENDIUM C

Description of Stepping Motor Operation

The stepping motors 84 and 86 which select the digits on the print wheels and the bank to be set each have four driving coils, a maximum of two of which are energized at a time. In a preferred embodiment, each motor shaft rotates through a predetermined angular increment (called a half step) when the patterns of energization for the coils changes a certain number of times. The patterns of energization must occur in a predetermined sequence in order to establish smooth rotation in the correct direction. A preferred sequence for the energization patterns is shown below where a "1" indicates a coil is energized while a "0" indicates the coil is de-energized:

| PATTERN NUMBER | COIL 1 | 2 | 3 | 4 |
|---|---|---|---|---|
| 0 | 1 | 0 | 0 | 0 |
| 1 | 1 | 1 | 0 | 0 |
| 3 | 0 | 1 | 1 | 0 |
| 4 | 0 | 0 | 1 | 0 |
| 5 | 0 | 0 | 1 | 1 |
| 6 | 0 | 0 | 0 | 1 |
| 7 | 1 | 0 | 0 | 1 |

During execution of the STEPS subroutine, pattern numbers 1,2,3,4,5,6,7,0 are employed in sequence to cause stepping motor 86 to drive the main gear 120 to the next more significant bank. Conversely, pattern numbers 7,6,5,4,3,2,1,0 are employed sequentially to drive the main gear from one bank to the next less significant bank.

During execution of the STEPD subroutine, the entire sequence of pattern numbers must be used twice to move from one digit on the print wheel to the next. Specifically, stepping from one digit to the next greater digit requires the following sequence of patterns:

1,2,3,4,5,6,7,0,1,2,3,4,5,6,7,0.

Conversely, stepping from a digit to the next lower digit requires the reverse sequence or:

7,6,5,4,3,2,1,0,7,6,5,4,3,2,1,0.

APPENDIUM D

Format of Messages Sent to and From Control Unit 12

MESSAGE—SET POSTAGE

From Control Unit: $C_0C_1 \emptyset D_0D_1D_2D_3S0000$ - - - 0

To Control Unit: $C_0C_1 \emptyset D_0D_1D_2D_3SBE_1E_20$ - - - 0

$C_0C_1$: Checksum (as transmitted or received)

$\emptyset$: Operation Code $D_0$–$D_3$: Amount of Postage to be sent

S:

=1 if printer disabled

B:

=8 if descending register less than Postage

=4 if descending register less than $100.

=/C if both $E_1E_2$:

=1X for error during disabling

=2X for error in stepping to high order bank

=3X for error in setting digits to zero

=4X for error in stepping toward disabled

=5X for error in enabling steps

=60 for improper BCD values in data

=70 where setting is inhibited by previous error

MESSAGE—READ REGISTERS

From Control Unit: $C_0C_1 1S0$ - - - 0

To Control Unit: $C_0C_1 1SD_0$ - - - $D_7 0$ - - - 0

$C_0C_1$: Checksum

1: Op Code

S: Specific register to be read

=0 for ascending register

=1 for descending register

=2 for control sum

=3 for piece count

MESSAGE—READ REGISTERS (Continued)

=4 for machine status register

=5 for meter setting

MESSAGE—PRINT POSTAGE

From Control Unit: None

To Control Unit: $C_0C_1 4D_0$–$D_3SB0$–0

$C_0C_1$: Checksum

4: Op Code $D_0D_3$: Amount of postage to be printed.

S: Indicates whether printer was enabled (S=0) or disabled (S=1).

B: Indicates descending register status.

=4 if descending register will be less than $100.

=8 if descending register will be less than the setting.

=/C if both conditions.

MESSAGE—SET PRINTER TO ZERO

From Control Unit: $C_0C_1 60$ - - - 0

To Control Unit: $C_0C_1 6E_1E_2 0$ - - - 0

$C_0C_1$: Checksum

6: Op Code $E_1$: Type of error which occurs during setting.

=0 for no error.

=1 where too many steps are required to reach the most significant digit

=2 where too many steps are required to reach $\emptyset$

=3 where the fifth step photocell is not seen

=4 for a stepping error in going to a lower bank

=5 for a zero photocell that doesn't turn off upon step past zero

=6 for a zero photocell that doesn't turn on upon step back to zero

MESSAGE—SET PRINTER TO ZERO (continued)

=7 for error during STEPD subroutine $E_2$: Data associated with error message.

MESSAGE—LOAD NVM MEMORY (RESTRICTED ACCESS)

From Control Unit: $C_0C_1 7R_0R_1D_0$–$D_7 000$

To Control Unit: $C_0C_1 7R_0R_1D_0$–$D_7 000$ $C_0C_1$: Checksum

7: Op Code $R_0R_1$: Address of NVM register into which data is to be written.

$D_0$–$D_7$: Data to be loaded:

MESSAGE—READ NVM MEMORY (RESTRICTED ACCESS)

From Control Unit: $C_0C_1 8R_0R_1 0$ - - - 0

To Control Unit: $C_0C_1 8R_0R_1D_0$ - - - $D_7 000$ $C_0C_1$: Checksum

8: Op Code $R_0R_1$: Address of register to be read.

$D_0$–$D_7$: Data in register being read.

MESSAGE—ENABLE PRINTER

From Control Unit: $C_0C_1 90$ - - - 0

To Control Unit: $C_0C_1 9E0$ - - - 0

$C_0C_1$: Checksum

9: Op Code

E: Error during enabling.

=0 if no error

=8 if enabling inhibited

=F if printer not enabled due to insufficient postage

=any other value for error occurring during setting

MESSAGE—DISABLE PRINTER

From Control Unit: $C_0C_1 A0$ - - - 0

To Control Unit: $C_0C_1 AE0$ - - - 0

$C_0C_1$: Checksum

A: Op Code

E: Error during disabling.

=0 for no error $\neq$0 for error

MESSAGE—ERROR IN MESSAGE

To Control Unit: $C_0C_1 3E0$ - - - 0

$C_0C_1$: Checksum

3: Op Code
E: Error in Message
$\neq$ for error

MESSAGE—RECHARGE METER

From Control Unit $C_0C_12D_0$–$D_{12}$
To Control Unit $C_0C_12D_0$–$D_3EX$ - - - 00
$C_0C_1$: Checksum
2: OP Code
$D_0$–$D_3$: Dollar Amount to be entered
$D_4$–$D_{12}$: Remote Meter Resetting Combination
E: Error Message
=/F Incorrect Combination
=/E Non BCD Data in Message
=/DX Error in Disabling Meter
=/C Inhibited
=/A Postage amount not accepted because if would result in overflow of descending register

What is claimed is:

1. In an electronic postal meter having an electronic accounting system connected to control a postage printing device, wherein means are provided for applying data and control signals to said electronic accounting system; the improvements wherein said electronic accounting system incorporates a computer, said computer having a first routine for initializing said meter, a second routine for detecting the occurrence of errors of a first type and instituting said first routine in response thereto for clearing only errors of said first type, and a third routine for detecting errors of a second type and inhibiting operation of said meter in response to errors of said second type.

2. The postal meter of claim 1 wherein a low supply voltage to said postal meter comprises an error of said second type.

3. The postal meter of claim 1 wherein said postage printing device comprises means for sending a print signal to said electronic accounting system responsive to the commencement of a printing cycle, the absence of said print signal comprising an error of said second type.

4. In an electronic postal meter having an electronic accounting system connected to control a postage printing device, said accounting system comprising a computer having a plurality of routines for controlling the operation of said meter, and wherein said meter further comprises means for applying data and control signals to said electronic accounting system; the improvement wherein said computer has a first routine responsive to error conditions of a first type for reinitializing said meter, said computer having a second routine responsive to errors of a second type for inhibiting further operation of said meter independently of any reinitialization procedures.

5. The electronic postal meter of claim 4 wherein said means for applying data and control signals to the electronic accounting system comprises a keyboard, and wherein errors in messages from said keyboard are of said first type.

6. The electronic postal meter of claim 4 wherein errors in said initialization procedure are errors of said first type.

7. The electronic postal meter of claim 4 further comprising sensing means for sensing the positions of mechanical elements in said meter, errors in positions sensed by said sensing means and errors in the reading of said sensing means comprising errors of said second type.

8. The electronic postal meter of claim 4 wherein a reduction of operating power for said meter comprises an error of said second type.

9. The electronic postal meter of claim 4 wherein said electronic accounting system has a register for storing amounts of postage which said meter is authorized to print, and wherein a command to print a greater amount of postage than stored in said register comprises an error of said second type.

10. The electronic postage meter of claim 4 wherein errors detected in the driving of said printing device comprise errors of said second type.

11. The electronic postal meter of claim 4 wherein errors detected in the said positions of said printing device comprise errors of said second type.

* * * * *